US012637558B2

(12) United States Patent
Zhang et al.

(10) Patent No.: US 12,637,558 B2
(45) Date of Patent: May 26, 2026

(54) SYNDIOTACTIC PROPYLENE-BASED ETHYLENE-PROPYLENE COPOLYMERS

(71) Applicant: EXXONMOBIL CHEMICAL PATENTS INC., Houston, TX (US)

(72) Inventors: Jingwen Zhang, Houston, TX (US); Jo Ann M. Canich, Houston, TX (US); Peijun Jiang, Katy, TX (US); John R. Hagadorn, Houston, TX (US); Chase A. Eckert, Houston, TX (US); Sarah J. Mattler, League City, TX (US); Shuhui Kang, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 837 days.

(21) Appl. No.: 18/052,591

(22) Filed: Nov. 4, 2022

(65) Prior Publication Data

US 2023/0148328 A1 May 11, 2023

Related U.S. Application Data

(60) Provisional application No. 63/276,012, filed on Nov. 5, 2021.

(51) Int. Cl.
*C08L 23/14* (2006.01)

(52) U.S. Cl.
CPC ....... *C08L 23/142* (2013.01); *C08L 2205/025* (2013.01); *C08L 2207/12* (2013.01)

(58) Field of Classification Search
None
See application file for complete search history.

(56) References Cited

U.S. PATENT DOCUMENTS

| | | | |
|---|---|---|---|
| 4,804,749 | A | 2/1989 | Fijiwara et al. |
| 5,041,584 | A | 8/1991 | Crapo et al. |
| 5,066,741 | A | 11/1991 | Campbell, Jr. |
| 5,153,157 | A | 10/1992 | Hlatky et al. |
| 5,198,401 | A | 3/1993 | Turner et al. |
| 5,206,197 | A | 4/1993 | Campbell, Jr. |
| 5,241,025 | A | 8/1993 | Hlatky et al. |
| 5,384,299 | A | 1/1995 | Turner et al. |
| 5,391,617 | A | 2/1995 | Olivier et al. |
| 5,486,632 | A | 1/1996 | Devore et al. |
| 5,502,124 | A | 3/1996 | Crowther et al. |
| 5,527,929 | A | 6/1996 | Timmers et al. |
| 5,624,878 | A | 4/1997 | Devore et al. |
| 5,972,823 | A | 10/1999 | Walzer, Jr. |
| 6,150,483 | A | 11/2000 | Renkema et al. |
| 8,404,880 | B2 | 3/2013 | Kaji et al. |
| 8,975,209 | B2 | 3/2015 | Kaji et al. |
| 9,340,630 | B2 | 5/2016 | Kaji et al. |
| 2002/0058765 | A1 | 5/2002 | Becke et al. |
| 2006/0020067 | A1* | 1/2006 | Brant ..................... C09J 123/10 524/270 |
| 2012/0028865 | A1 | 2/2012 | Datta et al. |
| 2014/0163183 | A1 | 6/2014 | Jiang et al. |
| 2015/0073157 | A1 | 3/2015 | Souza et al. |
| 2016/0280819 | A1* | 9/2016 | Tohi ........................ C08L 23/14 |
| 2019/0330169 | A1 | 10/2019 | Van Duzer et al. |
| 2019/0330392 | A1 | 10/2019 | Faler et al. |
| 2021/0079537 | A1 | 3/2021 | Spurgeon |

FOREIGN PATENT DOCUMENTS

| | | | |
|---|---|---|---|
| EP | 0277003 | A1 | 8/1988 |
| EP | 0277004 | A1 | 8/1988 |
| EP | 0638611 | A1 | 2/1995 |
| EP | 0520732 | B1 | 12/1995 |
| EP | 0427697 | B1 | 5/1996 |
| EP | 0570982 | B1 | 1/1997 |
| EP | 0495375 | B1 | 2/1997 |
| EP | 0500944 | B1 | 10/1998 |
| EP | 1262498 | A2 | 12/2002 |
| JP | S6035009 | A | 2/1985 |
| JP | H01207309 | A | 8/1989 |
| JP | H0762170 | A | 3/1995 |
| JP | H07149963 | A | 6/1995 |
| JP | 2004505152 | A | 2/2004 |
| JP | 2012525471 | A | 10/2012 |
| JP | 2013536278 | A | 9/2013 |
| JP | 2016540848 | A | 12/2016 |
| JP | 2017511396 | A | 4/2017 |
| WO | 2009101936 | A1 | 8/2009 |
| WO | 2021086467 | A1 | 5/2021 |

OTHER PUBLICATIONS

Chemical and Engineering News, 63(5), 27 (1985).
E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).
J. Vladimir Oliveira, C. Dariva and J. C. Pinto, Ind. Eng. Chem. Res. 29, 2000, 4627.
J. Randall in Polymer Sequence Determination, 13C-NMR Method (Academic Press, New York, 1977).
Randall in "A Review of High Resolution Liquid Carbon Nuclear Magnetic Resonance Characterization of Ethylene-Based Polymers", Polymer Reviews, 29:2,201-5 317 (1989).
T. Sun, P. Brant, R. R. Chance, and W. W. Graessley, in Macromolecules, vol. 34, No. 19, pp. 6812-6820, (2001).

* cited by examiner

*Primary Examiner* — Christopher M Rodd
(74) *Attorney, Agent, or Firm* — Eric D. Babych; Barnes & Thornburg LLP

(57) ABSTRACT

Provided is syndiotactic polypropylene-based ethylene-propylene copolymers comprising a) 5 to 15% by weight of ethylene and 85 to 95% by weight of propylene; b) 60 to 90% rr triads; c) Mw (LS) of 10 to 250 kg/mol; and d) no substantial melting peak, wherein the heat of fusion of the peak is 5 J/g or less as determined by differential scanning calorimetry at a scan rate of 10° C./min (ASTM D3418-03).

8 Claims, 5 Drawing Sheets

SYNDIOTACTIC PROPYLENE-BASED ETHYLENE-PROPYLENE COPOLYMERS

CROSS-REFERENCE TO RELATED APPLICATIONS

This application claims the benefit under 35 U.S.C. § 119(e) of the filing date of U.S. Provisional Patent Application No. 63/276,012, entitled SYNDIOTACTIC PROPYLENE-BASED ETHYLENE-PROPYLENE COPOLYMERS filed Nov. 5, 2021, disclosure of which is incorporated herein by reference.

TECHNICAL FIELD

The present disclosure relates to syndiotactic-rich propylene-based ethylene-propylene copolymers.

BACKGROUND

Olefin polymers and oligomers ("polyolefins" or "polyolefin polymers"), in general, and in particular poly-alpha-olefin polymers comprising propylene or other C3 or higher alpha-olefin monomers, comprise hydrocarbyl groups that are pendant from the polymer backbone chain. The pendant hydrocarbyl groups may be arranged in different stereochemical configurations determined relative to the polymer backbone chain. These arrangements include atactic, isotactic, and/or syndiotactic configurations.

Tacticity may be related to the degree of crystallinity that an olefin polymer, in particular a poly-alpha-olefin polymer, is capable of obtaining. As used herein, the tacticity of a polymer reflects the stereochemical regularity of hydrocarbyl groups, which are pendent to the polymer molecule backbone (i.e., the tacticity of the polymer). Four types of tacticity have been described in poly-alpha-olefins: atactic, normal isotactic, isotactic stereoblock, and syndiotactic.

Atactic poly-olefins are those wherein the hydrocarbyl groups pendent to the polymer molecule backbone assume no regular order with reference to the backbone. This random, or atactic, structure is represented by a polymer backbone of alternating methylene and methine carbons, with randomly oriented branches substituting the methine carbons. The methine carbons randomly have R and S configurations, creating adjacent pairs either of like configuration (a "meso" or "m" dyad) or of unlike configuration (a "racemic" or "r" dyad).

The atactic form of a polymer contains approximately equal fractions of meso and racemic dyads. Importantly, atactic poly-alpha-olefins, particularly atactic polypropylene, may be characterized by being soluble in aliphatic and aromatic solvents at ambient temperature. Since atactic polymers exhibit no regular order or repeating unit configurations in the polymer chain, such atactic polymers may be referred to as amorphous materials. As an amorphous material, atactic polymers tend to lack a molecular lattice structure and may have poorly defined melting points. Accordingly, atactic poly-alpha-olefins are amorphous, typically have no measurable melting point, and thus exhibit little if any crystallinity.

Isotactic poly-olefins are characterized as having pendent hydrocarbyl groups ordered in space to the same side or plane of the polymer backbone chain. Using isotactic polypropylene as an example, the isotactic structure is typically described as having the pendent methyl groups attached to the ternary carbon atoms of successive monomeric units on the same side of a hypothetical plane through the carbon backbone chain of the polymer, e.g., the methyl groups are all above or below the plane.

The isotactic stereoblock form of poly-olefin may result from "site chirality exchange" and/or "chain end control" mechanisms during formation of an isotactic stereoblock poly-alpha-olefin polymer. Deviation or inversion in the regularity of the structure of the chains lowers the degree of isotacticity and hence the crystallinity of which the polymer is capable.

Syndiotactic poly-alpha-olefins are those wherein the hydrocarbyl groups pendent to the polymer molecular backbone alternate sequentially in order from one side or plane to the opposite side or plane relative to the polymer backbone. The percentage of r dyads in the chain determines the degree of syndiotacticity of the polymer, and is related to the crystallinity of the polymer.

The molecular chain backbone of a syndiotactic polymer can be considered to be a copolymer of olefins with alternating stereochemical configurations. Highly syndiotactic polymers may be highly crystalline and thus may have defined melting points similar to their isotactic polymorphs and thus may be characterized in part by their melting point temperature.

The triad tacticity of a polymer is the relative tacticity of a sequence of three adjacent propylene units, a chain consisting of head to tail bonds, expressed as a binary combination of m and r sequences. It is usually expressed for the propylene-based polymers described as the ratio of the number of units of the specified tacticity to all of the propylene triads in the polymer.

Ethylene-propylene copolymers with a backbone that has syndiotactic sequences are softer but have better impact strength, and are tougher and more durable than PP homopolymers. The syndiotactic ethylene-propylene copolymers tend to have better stress crack resistance and low temperature toughness than PP homopolymer. The main potential applications include impact modifiers, viscosity modifiers, packaging, textiles, healthcare, pipes, automotive, construction and electrical applications.

SUMMARY OF DISCLOSURE

The present disclosure is concerned with syndiotactic propylene-based ethylene-propylene copolymers comprising a) 5 to 15% by weight of ethylene, b) 60 to 90% rr triads, c) Mw (DRI) 10 to 200 kg/mol, and d) no substantial melting peak, wherein the heat of fusion of the peak is 5 J/g or less as determined by differential scanning calorimetry at a scan rate of 10° C./min (ASTM D3418-03).

The syndiotactic polypropylene-based ethylene-propylene copolymers (srPP/C2) according to the present disclosure show high syndiotacticity as indicated by % rr triads as measured by $^{13}C$ NMR.

DETAILED DESCRIPTION

Figure 1:
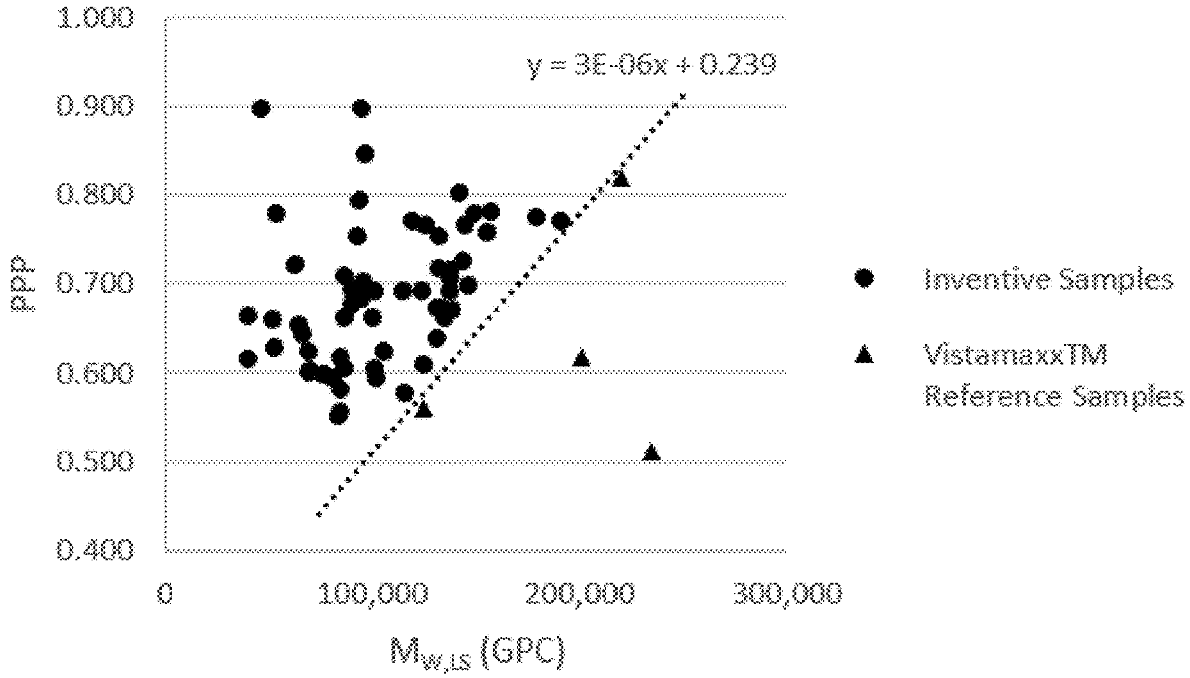
FIG. 1 shows the [PPP] from $^{13}C$ NMR vs $M_w$,LS from GPC for inventive srPP/C2 EP copolymers, commercial EPs and non-syndio-rich EP reference samples, respectively.

As used herein, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, the numbering scheme for the Periodic Table of the Elements is used as set out in CHEMICAL AND ENGINEERING NEWS, 63(5), 27 (1985).

For purposes of the present disclosure, when a polymer is referred to as comprising an olefin, the olefin present in the polymer is the polymerized form of the olefin, respectively. Likewise, the use of the term polymer is meant to encompass homopolymers and copolymers, where copolymers include any polymer having two or more chemically distinct monomers.

For the purposes of this disclosure, the term "polypropylene" as used herein means polymers containing propylene as monomers, it can be homopolypropylene or copolymer of propylene and α-olefin comonomers.

A "catalyst system" is a combination of at least one catalyst compound, at least one activator, an optional coactivator, and an optional support material. The terms "catalyst compound", "catalyst complex", "transition metal complex", "transition metal compound", "precatalyst compound", and "precatalyst complex" are used interchangeably. When "catalyst system" is used to describe such a pair before activation, it means the unactivated catalyst complex (precatalyst) together with an activator and, optionally, a coactivator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure and the claims thereto, when catalyst systems are described as including neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein are intended to embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "Lewis base" is a neutrally charged ligand which donates one or more pairs of electrons to a metal ion. Examples of Lewis bases include ethylether, trimethylamine, pyridine, tetrahydrofuran, dimethylsulfide, and triphenylphosphine. The term "heterocyclic Lewis base" refers to Lewis bases that are also heterocycles. Examples of heterocylic Lewis bases include pyridine, imidazole, thiazole, and furan.

A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound.

Noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. A Lewis acid is defined to be a compound or element that can react with an electron donor to form a bond. An NCA coordinates weakly enough that a Lewis base, such as an olefin monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon.

As used herein, Mn is number average molecular weight, Mw is weight average molecular weight, and Mz is z average molecular weight, wt. % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Olefin polymers and oligomers ("polyolefins" or "polyolefin polymers"), in general, and in particular poly-alpha-olefin polymers comprising propylene or other C3 or higher alpha-olefin monomers, comprise hydrocarbyl groups that are pendent from the polymer backbone chain. The pendent hydrocarbyl groups may be arranged in different stereochemical configurations determined relative to the polymer backbone chain. These arrangements include atactic, isotactic, and/or syndiotactic configurations.

As used herein, "tacticity" of a polymer reflects the stereochemical regularity of hydrocarbyl groups, which are pendent to the polymer molecule backbone. Tacticity may be related to the degree of crystallinity that an olefin polymer, in particular a poly-alpha-olefin polymer, is capable of obtaining. Three main types of tacticity have been described in poly-alpha-olefins: atactic, isotactic, and syndiotactic.

Atactic polyolefins are those wherein the hydrocarbyl groups pendent to the polymer molecule backbone assume no regular order with reference to the backbone. This random, or atactic, structure is represented by a polymer backbone of alternating methylene and methine carbons, with randomly oriented branches substituting the methine carbons. The methine carbons randomly have Rectus ("R") and Sinister ("S") configurations, creating adjacent pairs either of like configuration (a "meso" or "m" dyad) or of unlike configuration (a "racemic" or "r" dyad).

Isotactic polyolefins are characterized as having pendent hydrocarbyl groups ordered in space to the same side or plane of the polymer backbone chain. Using isotactic polypropylene as an example, the isotactic structure is typically described as having the pendent methyl groups attached to the ternary carbon atoms of successive monomeric units on the same side of a hypothetical plane through the carbon backbone chain of the polymer, e.g., the methyl groups are all above or below the plane. The percentage of m dyads in the chain determines the degree of isotacticity of the polymer, and is related to the crystallinity of the polymer.

Syndiotactic polyolefins are those wherein the hydrocarbyl groups pendent to the polymer molecular backbone alternate sequentially in order from one side or plane to the opposite side or plane relative to the polymer backbone. The percentage of r dyads in the chain determines the degree of syndiotacticity of the polymer, and is related to the crystallinity of the polymer.

The molecular chain backbone of a syndiotactic polymer can be considered to be a copolymer of olefins with alternating stereochemical configurations. Highly syndiotactic polymers may be highly crystalline and thus may have defined melting points similar to their isotactic polymorphs and thus may be characterized in part by their melting point temperature.

The triad tacticity of a polymer is the relative tacticity of a sequence of three adjacent propylene units, a chain consisting of head to tail bonds, expressed as a binary combination of m and r sequences. It is usually expressed for the propylene-based polymers described as the ratio of the number of units of the specified tacticity to all of the propylene triads in the polymer. For example, an rr triad indicates 3 adjacent propylene units, wherein the stereochemistry of propylene units are alternating (e.g., RSR, SRS).

According to an embodiment, the syndiotactic-rich propylene copolymer of the present disclosure includes ethylene-propylene copolymers having:

a) 5 to 15% by weight of ethylene and 85 to 95% by weight of propylene,
b) 60 to 90% of rr triads,
c) Mw (LS) of 10 to 250 kg/mol, and
d) no substantial melting peak, wherein the heat of fusion of the peak is 5 J/g or less as determined by differential scanning calorimetry at a scan rate of 10° C./min (ASTM D3418-03).

In an embodiment, the syndiotactic-rich ethylene-propylene copolymers produced herein have syndiotactic stereoregular propylene crystallinity. The term "stereo-regular" as used herein means that the predominant number, i.e. greater than 50%, of the propylene residues in the polypropylene segments in a polymer chain exclusive of any other monomer such as ethylene, has the same 1,2 insertion and the stereo-chemical orientation of the pendant methyl groups is the same, either meso or racemic.

The tacticity of ethylene-propylene copolymer is measured by $^{13}C$ NMR including the concentration of isotactic and syndiotactic diads ([m] and [r]), and triads ([mm], [mr] and [rr]). The designation "m" or "r" describes the stereochemistry of pairs of contiguous propylene groups, "m" referring to meso and "r" to racemic. Calculations involved in the characterization of polymers by NMR are described by F. A. Bovey in *Polymer Conformation and Configuration* (Academic Press, New York 1969) and J. Randall in *Polymer Sequence Determination, 13C-NMR Method* (Academic Press, New York, 1977).

The "rr triad tacticity index" of a polymer is a measure of the relative syndiotacticity of a sequence of three adjacent propylene units connected in a head-to-tail configuration. More specifically, in the present invention, the rr triad tacticity index (also referred to as the "rr Fraction") of a polypropylene copolymer is expressed as the ratio of the number of units of racemic tacticity to all of the methyl triads in the copolymer:

$$rr \text{ Fraction} = \frac{[PP + EP(rr)]}{[PP + EP(rr)] + [PP + EP(mm)] + [PP + EP(mr)]}$$

The regions for PP+EP(mm), PP+EP(mr), and PP+EP(rr) are defined as:

| | Chemical shift range (ppm) |
|---|---|
| PP + EP(mm) | 21.2-22.3 |
| PP + EP(mr) | 20.4-21.2 |
| PP + EP(rr) | 19.6-20.4 |

This triad tacticity calculation does not account for sequence, chain ends, or regio-defects present within these regions.

Similarly, m diads and r diads can be calculated as follows where mm, mr and rr are defined above:

$$m = mm + 1/2\ mr$$

$$r = rr + 1/2\ mr$$

Propylene copolymers produced herein may have an rr triad tacticity index of three propylene units, as measured by $^{13}C$ NMR, of 55% or greater, 60% or greater, 65% or greater, 70% or greater. In some embodiments, the syndiotactic-rich ethylene-propylene copolymer may range from 60 to 90% rr triads, 65 to 90% rr triads, 70 to 90% rr triads, 75 to 90% rr triads, and 75 to 85% rr triads. In other embodiments, the copolymer may range from 65 to 85% rr triads, and 75 to 85% rr triads.

A copolymerization between monomers "E" and "P" in the presence of catalyst "M" can be represented by the following reaction schemes and rate equations where $R_{11}$ is the rate of "E" insertion after "E", $R_{12}$ is the rate of "P" insertion after "E", $R_{21}$ is the rate of "E" insertion after "P", $R_{22}$ is the rate of "P" insertion after "P", and $k_{11}$, $k_{12}$, $k_{21}$, and $k_{22}$ are the corresponding rate constants for each. The reactions scheme and rate equations are illustrated below.

| | |
|---|---|
| M-E + E → M-E-E | $R_{11} = k_{11}$[M-E][E] |
| M-E + P → M-P-E | $R_{12} = k_{12}$[M-E][P] |
| M-P + E → M-E-P | $R_{21} = k_{21}$[M-P[E] |
| M-P + P → M-P-P | $R_{22} = k_{22}$[M-P[P]. |

The reactivity ratios $r_1$ and $r_2$ are:

$$r_1 = \frac{k_{11}}{k_{12}} \quad r_2 = \frac{k_{22}}{k_{21}}$$

$$r_1 r_2 = \frac{k_{11} k_{22}}{k_{12} k_{21}}.$$

The product of $r_1 \times r_2$ provides information on how the different monomers distribute themselves along the polymer chain. Below, are illustrations of alternating, random and blocky copolymers and how the product of $r_1 \times r_2$ relates to each:

| | | |
|---|---|---|
| $r_1r_2 = 0$ | alternating copolymerization | EPEPEPEPEPEPEPEPEPEP |
| $r_1r_2 = 1$ | random copolymerization | PPEPEPEPPEPPPEEPEEPE |
| $r_1r_2 > 1$ | blocky copolymerization | PPPPEEEEEEEPPPEEEEEPP |

$r_1$ and $r_2$ also represent the reactivity of ethylene and propylene in the copolymer, respectively, which are used to describe the characteristic of the catalyst system. $r_1r_2$, the product of $r_1$ and $r_2$, represents the distribution of monomers in the main chain of the copolymer. $^{13}$C NMR was used to determine monomer content and sequence distribution for the ethylene-propylene copolymers using the procedure adapted from J. C. Randall's paper: *Polymer Reviews,* 1989, vol. 29(2), pp. 201-317. Included in the paper are measurement and calculations for 1,2 propylene addition triad sequence distributions termed EEE, EEP, PEP, EPE, EPP and PPP and reported as mole fractions. The propylene content in mole %, run number, average sequence length, and diad/triad distributions were all calculated per the method established in the above paper.

For propylene-ethylene copolymers, the reactivity ratio ($r_1r_2$) is defined as follows $r_1r_2$=4*(EE*PP)/(EP)$^2$, where EE, PP and EP are diads where E=ethylene, P=propylene.

Calculations for propylene run # (also called P run # and P run length) were based on the equation P run #=([EPE]+0.5*[EPP])*100; where [EPE], [EPP] are the triad molar concentrations; E is ethylene, P is propylene.

The present disclosure includes a syndiotactic-rich ethylene-propylene copolymer having a $r_1r_2$ from less than 8, less than 6, less than 4, less than 2 or at least less than 1.4.

In some embodiments, the syndiotactic ethylene-propylene copolymer according to any one of claims 1-3, having a [EPP] from $^{13}$C NMR and C2 wt % from FTIR relationship of: 1.9833*C2 wt %−0.0818<[EPP]<1.3333*C2 wt %+0.09.

In some embodiments, the syndiotactic ethylene-propylene copolymer has a [EEP] from $^{13}$C NMR and C2 wt % from FTIR relationship of: 0.2931*C2 wt %−0.0187<[EEP]<0.303*C2 wt %−0.0045.

In some embodiments, the syndiotactic ethylene-propylene copolymer has a [PPP] from $^{13}$C NMR and C2 wt % from FTIR relationship of: −2.8*C2 wt %+0.878<[PPP]<−2.8154*C2 wt %+1.0451.

In some embodiments, the syndiotactic ethylene-propylene copolymer has a [PEP] from $^{13}$C NMR and C2 wt % from FTIR relationship of: 0.8923*C2 wt %−0.0021<[PEP]<0.9333*C2 wt %+0.03.

In some embodiments, the syndiotactic ethylene-propylene copolymer has an [EEE] from $^{13}$C NMR less than 0.008.

In some embodiments, the syndiotactic ethylene-propylene copolymer has a [EE] from $^{13}$C NMR and C2 wt % from FTIR relationship of: 0.2*C2 wt %−0.016<[EE]<0.1292*C2 wt %+0.0082.

In some embodiments, the syndiotactic ethylene-propylene copolymer has a propylene run # from $^{13}$C NMR and C2 wt % from FTIR relationship of: 110.67*C2 wt %−4.7<[P run #]<97.143*C2 wt %+4.7286.

In some embodiments, the syndiotactic ethylene-propylene copolymer has a Tg from DSC and C2 wt % from FTIR relationship of: −190*C2 wt %−9.15<Tg<−175*C2 wt %+1.725.

In some embodiments, the syndiotactic ethylene-propylene copolymer has a $g'_{vis}$ and MW,LS from GPC relationship of: $g'_{vis}$>2E-06*MW,LS+0.9703.

In some embodiments, the syndiotactic-rich ethylene-propylene copolymer may range from 5 to 15% by weight of ethylene, alternatively 5 to 12% by weight of ethylene, alternatively 5 to 10% by weight of ethylene.

In some embodiments, the Mw (LS) may range from 10 to 250 kg/mol, alternatively 20 to 200 kg/mol, alternatively 30 to 150 kg/mol, alternatively 30 to 120 kg/mol, and alternatively 30 to 100 kg/mol. In some embodiments, the MWD (or PDI) of syndiotactic-rich ethylene-propylene copolymer may range 1.2 to 5.0, alternatively from 1.2 to 2.5, alternatively from 1.2 to 2.0, alternatively from 1.4 to 2.0.

The present disclosure includes a syndiotactic-rich ethylene-propylene copolymer having MFR of 0.1 to 550 g/10 min. measured at 2.16 kg and 230° C. The MFR measured at 2.16 kg and 230° C. may range from 1 to 450 g/10 min., alternatively 5 to 300 g/10 min., alternatively 10 to 200 g/10 min., and alternatively 20 to 100 g/10 min. Alternatively, the MFR of the syndiotactic-rich ethylene-propylene copolymer is of at least 1 g/10 min., or at least 2 g/10 min., or at least 10 g/10 min.

In some embodiments, a syndiotactic polypropylene-ethylene copolymers has a complex viscosity (at 0.1 rad/s, 190° C.) of about 50000 Pa*s or less, such as about 300 Pa*s to about 50000 Pa*s, such as about 400 Pa*s to about 40000 Pa*s, alternatively about 500 Pa*s to about 10000 Pa*s, alternatively about 500 Pa*s to about 10000 Pa*s. The complex viscosity can be measured by dynamic frequency sweep (DFS) measurements. Complex viscosity can be determined using a TA Instruments model ARES-G2 rheometer via small amplitude oscillatory shear (SAOS) testing at 190° C. Testing specimens can be compression molded using a heated press at 190° C. The testing specimens can have a diameter of 25 mm and a thickness of about 2 mm. The specimens are loaded into the rheometer which has been preheated to 190° C. and are trimmed to a measurement gap of 1.5 mm. The loaded, trimmed specimen is equilibrated at the testing temperature of 190° C. for 5 minutes prior to testing. Testing angular frequency is from 0.01 to 628 rad/s.

In some embodiments, the syndiotactic-rich ethylene-propylene copolymer has a glass transition temperature of 20° C. or less, alternatively 10° C. or less, alternatively 0° C. or less, alternatively −5° C. or less, or alternatively −10° C. or less. In another embodiment, the syndiotactic ethylene-propylene copolymer has a $T_g$ (° C.) from DSC and ethylene content (C2 wt %) from FTIR relationship of: −0.5263*$T_g$−4.8158<C2 wt %<−0.5714*$T_g$+0.9857.

In some embodiments, the syndiotactic-rich ethylene-propylene copolymer displays no substantial melting peak, wherein the heat of fusion of the peak is 5 J/g or less as determined by differential scanning calorimetry at a scan rate of 10° C./min (ASTM D3418-03). In some embodiments, the syndiotactic-rich ethylene-propylene copolymer displays no endotherm peak during the second heating cycle of the DSC measurement at a scan rate of 10° C./min. Alternatively, the syndiotactic-rich ethylene-propylene copolymer has no melting peak in the second heating cycle of the DSC measurement according the procedure described herein.

In embodiments where the syndiotactic-rich ethylene-propylene copolymer is blended polymer. The rr triad tacticity index of the first polymer component may be 70% or less, 65% or less, or even 60% or less. The rr triad tacticity index of the second polymer component may be 70% or more, 75% or more, or even 80% or more.

In embodiments where the syndiotactic-rich ethylene-propylene copolymer is blended polymer, the ethylene content of the first syndiotactic-rich ethylene-propylene copolymer component may be less than 10 wt %, alternatively less than 7 wt %, alternatively less than 5 wt %, alternatively less than 3 wt % based upon the total weight of the first polymer component. The ethylene content of the second syndiotactic-rich ethylene-propylene copolymer component may be greater than 5 wt %, alternatively greater than 7 wt %, alternatively greater than 10 wt %, alternatively greater than 15 wt %, alternatively greater than 20 wt % with and upper limit of 25 wt % based upon the total weight of the second polymer component.

In embodiments, the weight average molecular weight of the first copolymer component is greater than that of the second copolymer component. In embodiments, the weight average molecular weight of the first copolymer component is greater than about 150,000 g/mol, or about 200,000 g/mol, or about 250,000 g/mol. Alternatively, the weight average molecular weight of the second copolymer component is less than about 150,000 g/mol, or about 100,000 g/mol, or about 50,000 g/mol to less than about 20,000 g/mol.

The syndiotactic-rich ethylene-propylene copolymers according to various embodiments can be a blend of at least two syndiotactic-rich ethylene-propylene copolymers. In one embodiment of the invention, the blend has a bimodal molecular weight distribution or wide molecular weight distribution with MWD>3.0. The blend can also have a bimodal composition distribution or wide composition distribution. Alternatively, one component has ethylene content in the range of 0.2 to 5 wt % and Mw in the range of 100,000 to 400,000 g/mol, and one component has ethylene content in the range of 2 to 15 wt % and Mw in the range of 10,000 to 150,000 g/mol.

The syndiotactic-rich ethylene-propylene copolymers are produced with a process in which the molar ratio of ethylene feed to propylene feed is from about 0.01 to about 0.2, about 0.02 to 0.15, about 0.03 to 0.1.

Catalyst

The syndiotactic-rich ethylene-propylene copolymers of the present disclosure can be prepared by any suitable catalysts known in the art. The catalyst compounds described herein are used to polymerize olefinic monomers including propylene and ethylene to form syndiotactic-rich copolymers. As used herein, the terms "hydrocarbyl radical," "hydrocarbyl," and "hydrocarbyl group" are used interchangeably throughout the present disclosure. Likewise, the terms "group," "radical," and "substituent" are also used interchangeably throughout the present disclosure. For purposes of this disclosure, "hydrocarbyl radical" is defined to be a C1-C100 radical and may be linear, branched, or cyclic. When cyclic, the hydrocarbyl radical may be aromatic or non-aromatic. "Hydrocarbyl radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, $—Si(R^*)_2—$, $—Ge(R^*)_2—$, $—Sn(R^*)_2—$, $—Pb(R^*)_2—$ and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, $—Si(R^*)_2—$, $—Ge(R^*)_2—$, $—Sn(R^*)_2—$, $—Pb(R^*)_2—$ and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Hydrocarbylsilyl groups, also referred to as silylcarbyl groups (also referred to as hydrocarbyl silyl groups), are radicals in which one or more hydrocarbyl hydrogen atoms have been substituted with at least one $SiR^*_3$ containing group or where at least one $—Si(R^*)_2—$ has been inserted within the hydrocarbyl radical where R* is independently a hydrogen, a hydrocarbyl or halocarbyl radical, and two or more R* may join together to form a substituted or unsubstituted saturated, partially unsaturated or aromatic cyclic or polycyclic ring structure. Silylcarbyl radicals can be bonded via a silicon atom or a carbon atom.

Substituted silylcarbyl radicals are silylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR^*_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, $—Ge(R^*)_2—$, $—Sn(R^*)_2—$, $—Pb(R^*)_2—$ and the like, where R* is independently a hydrogen, a hydrocarbyl or halocarbyl radical, and two or more R* may join together to form a substituted or unsubstituted saturated, partially unsaturated or aromatic cyclic or polycyclic ring structure.

Germylcarbyl radicals, also referred to as germylcarbyl groups (also referred to as hydrocarbyl germyl groups), are radicals in which one or more hydrocarbyl hydrogen atoms have been substituted with at least one $GeR^*_3$ containing group or where at least one $—Ge(R^*)_2—$ has been inserted within the hydrocarbyl radical where R* is independently a hydrogen, a hydrocarbyl or halocarbyl radical, and two or more R* may join together to form a substituted or unsubstituted saturated, partially unsaturated or aromatic cyclic or polycyclic ring structure. Germylcarbyl radicals can be bonded via a germanium atom or a carbon atom.

Substituted germylcarbyl radicals are germylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR^*_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, $—Ge(R^*)_2—$, $—Sn(R^*)_2—$, $—Pb(R^*)_2—$ and the like, where R* is independently a hydrogen, a hydrocarbyl or halocarbyl radical, and two or more R* may join together to form a substituted or unsubstituted saturated, partially unsaturated or aromatic cyclic or polycyclic ring structure.

"Polar radicals" (or "polar groups") are groups in which a heteroatom functionality is bonded directly to the indicated atom or atoms. Polar radicals include heteroatoms of groups 1-17 of the Periodic Table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands or heterotetrahydoindenyl ligands, each of which can additionally be substituted or unsubstituted.

The hydrocarbyl radical may be independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as anionic ligands. The ring numbering scheme is also illustrated. When a cyclopentadienyl ligand has one bridging substituent, the bridging substituent is in the one position. When a cyclopentadienyl ligand has two bridging substituents, the bridging substituents are in the one and two positions. When a fluorenyl ligand has a bridging substituent, the bridging substituent is in the nine position. When dibenzo[b,h]fluorene has a bridging substituent, the bridging substituent is in the twelve position.

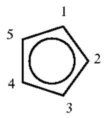

Cyclopentadienyl

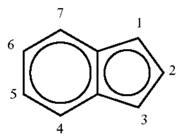

Indenyl

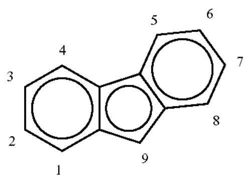

Fluorenyl

-continued

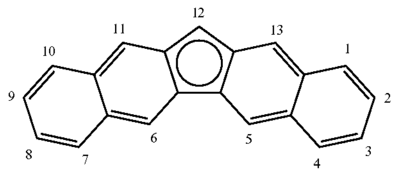

dibenzo[b,h]fluorenyl

A similar numbering and nomenclature scheme is used for heterocyclopentapentalenyls, heterofluorenyls, and the like, as illustrated below. Each structure illustrated is drawn as an anion.

Non-limiting examples of heterocyclopentapentalenyls include the following, where Q represents the heteroatoms O, S, Se, or Te, or heteroatom groups, NR, PR, AsR, or SbR where R** is hydrogen, or a hydrocarbyl, substituted hydrocarbyl, halocarbyl, substituted halocarbyl, silylcarbyl, or germylcarbyl substituent. When a heterocyclopentapentalenyl ligand has a bridging substituent, the bridging substituent is in the seven position.

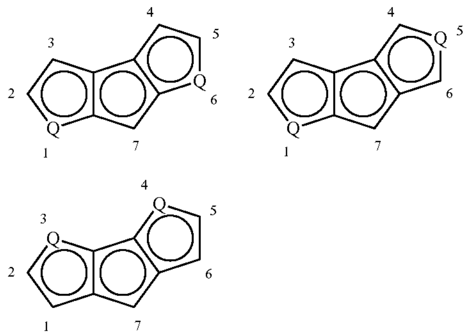

Non-limiting examples of heterofluorenyls where Z represents the heteroatoms N or P include the following. When a heterofluorenyl ligand has a bridging substituent, the bridging substituent is in the nine position.

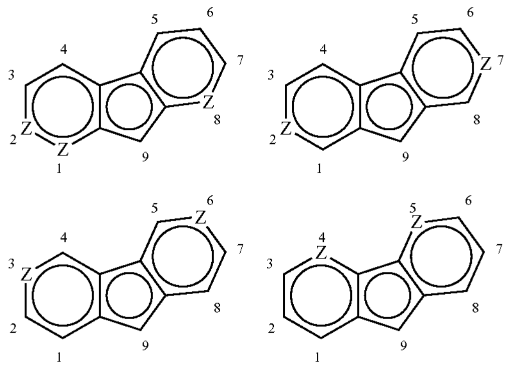

A "ring heteroatom" is a heteroatom that is within a cyclic ring structure. A "heteroatom substituent" is a heteroatom containing group that is directly bonded to a ring structure through the heteroatom. A "bridging heteroatom substituent" is a heteroatom or heteroatom group that is directly bonded to two different ring structures through the heteroatom. The terms "ring heteroatom", "heteroatom substituent", and "bridging heteroatom substituent" are illustrated below where Z and R' are as defined above.

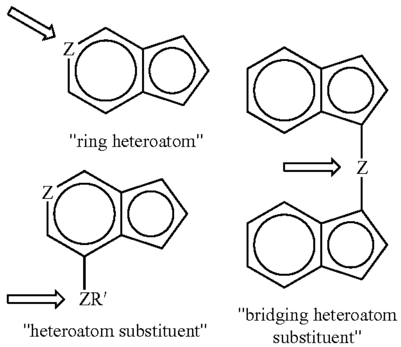

"ring heteroatom"

"heteroatom substituent"

"bridging heteroatom substituent"

A "ring carbon atom" is a carbon atom that is part of a cyclic ring structure. For example, an indenyl ligand has nine ring carbon atoms; a cyclopentadienyl ligand has five ring carbon atoms.

Transition metal compounds have symmetry elements and belong to symmetry groups. These elements and groups are well established and can be referenced from Chemical Applications of Group Theory (2nd Edition) by F. Albert Cotton, Wiley-Interscience, 1971. Compounds with $C_s$ symmetry possess a mirror plane. For example, the structure below has a $C_s$ symmetric plane that bisects the zirconium center, the carbon bridge and the cyclopentadienyl and fluorenyl ligands.

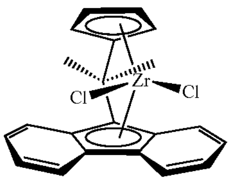

Symmetric substituents are substituents that retain the $C_s$ symmetry of the transition. For example, t-butyl groups substituted in the 2 and 7 positions of a fluorenyl ligand would be symmetric substituents.

Compounds with pseudo-$C_s$ symmetry are similar with the exception that the bridging group, the labile ligands, and distant substituents of similar size on the cyclopentadienyl ligand or fluorenyl ligand are not included in determining the symmetry of the compound. These compounds, while not truly $C_s$-symmetric, are considered to have $C_s$-symmetric active sites for olefin polymerization. Therefore, a compound, for example having a MeEtSi or MePhSi bridging ligand, is considered to have a pseudo $C_s$-plane of symmetry given the appropriate remaining ligand structure. Likewise, a compound, for example having one Me and one Cl labile ligand, is considered to have a pseudo $C_s$-plane of symmetry given the appropriate remaining ligand structure. Non-limiting examples of pseudo $C_s$ symmetric compounds are illustrated below:

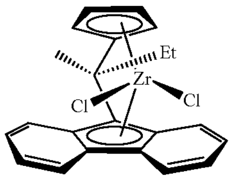

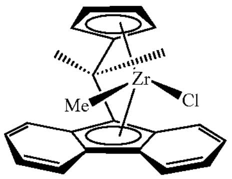

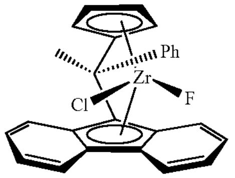

Compounds with pseudo-$C_s$ symmetry can also have unlike substituents on the non-labile ligands (i.e., cyclopentadienyl or fluorenyl ligands) if the substituents are distant from the active site. Substituents of this type, referred to as pseudo symmetric substituents, are typically adjacent to the bridging group and do not substantially differ in size from one another. Typically, the size difference of these substituents is within 2 non-hydrogen atoms of each other. Thus, a cyclopentadienyl substituted at the 2 and the 5 positions with methyl and ethyl, respectively, or a cyclopentadienyl substituted at the 2 position with methyl and not substituted in the 5 position, or a fluorenyl substituted at the 1 and the 8 positions with hexyl and octyl, respectively, would be considered to have pseudo-$C_s$ symmetry.

In general, those catalysts both capable of producing syndiotactic polypropylene and capable of reacting with hydrogen to terminate the growing polymer chain, are catalysts that are useful for producing the syndiotactic polypropylene homopolymers and syndiotactic propylene-rich ethylene-propylene copolymers described herein.

Catalysts useful for making the syndiotactic polypropylene homopolymers and syndiotactic propylene-rich ethylene-propylene copolymers include metallocene compounds (pre-catalysts) having the structure represented by formula (1) having $C_s$ or pseudo-$C_s$ symmetry:

(1)

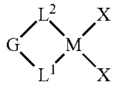

wherein:

M is zirconium or hafnium;

$L^1$ is a unsubstituted fluorenyl, heterocyclopentapentalenyl, or heterofluorenyl, or a substituted fluorenyl, heterocyclopentapentalenyl, or heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;

$L^2$ is a cyclopentadienyl ring or a substituted cyclopentadienyl ring with one or more symmetric or pseudo symmetric substituents in the 2 and 5 positions of the ring, each substituent group being, independently, a radical group which is a hydrocarbyl, substituted hydrocarbyl, halocarbyl, substituted halocarbyl, silylcarbyl or germylcarbyl; G is a bridging group;

each X is, independently, a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a dianionic chelating ligand.

In some embodiments of formula (1), $L^1$ is fluorenyl or substituted fluorenyl; such as fluorenyl, 2,7-dimethylfluorenyl, 2,7-diethylfluorenyl, 2,7-dipropylfluorenyl, 2,7-dibutylfluorenyl, 2,7-diphenylfluorenyl, 2,7-dichlorofluorenyl, 2,7-dibromofluorenyl, 3,6-dimethylfluorenyl, 3,6-diethylfluorenyl, 3,6-dipropylfluorenyl, 3,6-dibutylfluorenyl, 3,6-diphenylfluorenyl, 3,6-dichlorofluorenyl, 3,6-dibromofluorenyl, 2,7-di-tertbutyl fluorenyl, or 1,1,4,4,7,7,10,10-octamethyl-octahydrodibenzofluorenyl. Most preferably 2,7-di-tert-butylfluorenyl or fluorenyl. In some embodiments, $L^2$ is cyclopentadienyl. In some embodiments, G is methylene, dimethylmethylene, diphenylmethylene, dimethylsilylene, diphenylsilylene, di(4-triethylsilylphenyl)silylene, ethylene, or di(para-triethylsilylphenyl)methylene, most preferably dimethylmethylene, diphenylmethylene or di(para-triethylsilylphenyl)methylene. In some embodiments, each X is, independently, hydrocarbyl or halo, such as methyl, benzyl, fluoro or chloro. In some embodiments, M is preferably zirconium. In alternative embodiments, M is hafnium.

A subset of the metallocene compounds (pre-catalysts) represented by formula (1) having $C_s$ or pseudo-$C_s$ symmetry that may be used are represented by formula (1a):

(1a)

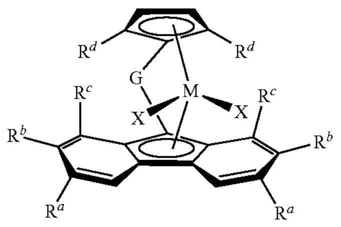

wherein M, G and X are defined as in formula (1);

each $R^a$ and $R^b$ is, independently, selected from hydrogen, halogen, hydrocarbyl, substituted hydrocarbyl, halocarbyl, substituted halocarbyl, silylcarbyl, germylcarbyl or polar radicals, and optionally two or more adjacent substituents may join to form a substituted or unsubstituted, saturated, partially unsaturated or aromatic, cyclic or polycyclic substituent, with the proviso that each $R^a$ is the same and each $R^b$ is the same allowing the compound to be $C_s$-symmetric or pseudo $C_s$-symmetric;

each $R^c$ is, independently, a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals;

each $R^d$ is a symmetric or pseudo symmetric substituent with respect to the other and is, independently, selected from hydrogen or a hydrocarbyl, substituted hydrocarbyl, halocarbyl, substituted halocarbyl, silylcarbyl or germylcarbyl radicals.

In some embodiments of formula (1a), each $R^d$, $R^a$ and $R^c$ are hydrogen, and each $R^b$ is a hydrogen, hydrocarbyl, halogen, silylcarbyl, or polar radical; such as hydrogen, methyl, ethyl, propyl, butyl, phenyl, mesityl, fluoro, chloro, bromo, dimethylamido, diethylamido or methoxy; such as hydrogen or butyl; such as hydrogen or tert-butyl; such as tert-butyl.

In other embodiments of formula (1a), each $R^d$, $R^b$ and $R^c$ is hydrogen, and each $R^a$ is, independently, a hydrogen, hydrocarbyl, halogen, or silylcarbyl; such as hydrogen, methyl, ethyl, propyl, butyl, fluoro, chloro, or bromo; such as hydrogen or butyl; such as hydrogen or tert-butyl; such as hydrogen.

Still, in other embodiments of formula (1a), each $R^d$ and $R^c$ is hydrogen, and each $R^a$ and $R^b$ are joined together to form a fused partially saturated six-membered carbon ring, each such fused ring may be substituted with four methyl substituents. Such ligand structure is illustrated in formula (1b):

(1b)

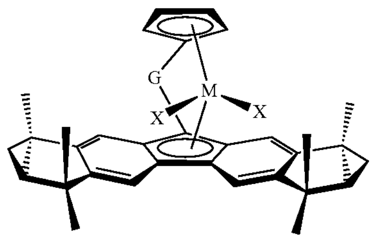

Still in other embodiments of formula (1a) $R^c$ and $R^d$ are hydrogen; each $R^a$ and $R^b$ are independently hydrogen, bromine, chlorine, methyl, ethyl, propyl, butyl or phenyl, such as $R^a$ is hydrogen and $R^b$ is hydrogen, methyl, ethyl, propyl, or butyl, or $R^b$ is hydrogen and $R^a$ is hydrogen, methyl, ethyl, propyl, or butyl. In some embodiments, $R^a$ is hydrogen and $R^b$ is tert-butyl or hydrogen. G can be methylene, dimethylmethylene, diphenylmethylene, dimethylsilylene, diphenylsilylene, di(4-triethylsilylphenyl)silylene, ethylene, di(para-triethylsilylphenyl)methylene such as diphenylmethylene, dimethylmethylene, diphenylsilylene, and dimethylsilylene; such as diphenylmethylene. Each X is independently hydrocarbyl or halo, such as methyl, benzyl, fluoro or chloro, such as methyl or chloro. In some embodiments, M is zirconium. In other embodiments, M is hafnium.

In some preferred embodiments of the invention, for the metallocene compounds of formula (1), (1a) and/or (1b), M is zirconium.

In some preferred embodiments of the invention, for the metallocene compounds of formula (1), (1a) and/or (1b), X is methyl.

In some embodiments of formula (1a), each $R^d$, $R^a$ and $R^c$ are hydrogen, and each $R^b$ is a methyl, ethyl, propyl, butyl, with tert-butyl being most preferred.

In some preferred embodiments of the invention, for the metallocene compounds of formula (1a) and/or (1b) G is di(para-triethylsilylphenyl)methylene.

Examples of pre-catalysts represented by formula (1) may include: diphenylmethylene(cyclopentadienyl)(9-fluorenyl)zirconium dichloride, methylene-(cyclopentadienyl)(9-fluorenyl)zirconium dichloride, dimethylmethylene(cyclopentadienyl) (9-fluorenyl)zirconium dichloride, dimethylsilylene (cyclopentadienyl)(9-fluorenyl)zirconium dichloride, diphenylsilylene(cyclopentadienyl)(9-fluorenyl)zirconium dichloride, ethylene-(cyclopentadienyl)(9-fluorenyl)zirconium dichloride, diphenylmethylene(cyclopentadienyl)(9-fluorenyl)zirconium dimethyl, methylene(cyclopentadienyl)(9-fluorenyl)zirconium dimethyl, dimethylmethylene (cyclopentadienyl)(9-fluorenyl)zirconium dimethyl, dimethyl-silylene(cyclopentadienyl)(9-fluorenyl)zirconium dimethyl, diphenylsilylene-(cyclopentadienyl)(9-fluorenyl) zirconium dimethyl, ethylene(cyclopentadienyl)(9-fluorenyl)zirconium dimethyl, di(para-triethylsilylphenyl)methylene(2,7-di-tertbutyl fluorenyl)(cyclopentadienyl)zirconium dimethyl, diphenylmethylene(cyclopentadienyl)(9-fluorenyl)hafnium dichloride, methylene-(cyclopentadienyl)(9-fluorenyl)hafnium dichloride, dimethylmethylene(cyclopentadienyl) (9-fluorenyl)hafnium dichloride, dimethylsilylene (cyclopentadienyl)(9-fluorenyl)hafnium dichloride, diphenylsilylene(cyclopentadienyl)(9-fluorenyl)hafnium dichloride, ethylene-(cyclopentadienyl)(9-fluorenyl)hafnium dichloride, diphenylmethylene(cyclopentadienyl)(9-fluorenyl)hafnium dimethyl, methylene(cyclopentadienyl)(9-fluorenyl)hafnium dimethyl, dimethylmethylene (cyclopentadienyl)(9-fluorenyl)hafnium dimethyl, dimethyl-silylene(cyclopentadienyl)(9-fluorenyl)hafnium dimethyl, diphenylsilylene-(cyclopentadienyl)(9-fluorenyl) hafnium dimethyl, ethylene(cyclopentadienyl)(9-fluorenyl) hafnium dimethyl, and di(para-triethylsilylphenyl)methylene(2,7-di-tertbutyl fluorenyl)(cyclopentadienyl)hafnium dimethyl. In some embodiments, pre-catalysts represented by formula (1) can be diphenylmethylene(cyclopentadienyl)(9-fluorenyl)hafnium dimethyl, diphenylmethylene(cyclopentadienyl)(9-fluorenyl)hafnium dimethyl, di(para-triethylsilylphenyl)methylene(2,7-di-tertbutylfluorenyl)(cyclopentadienyl)hafnium dimethyl, diphenylmethylene (cyclopentadienyl)(9-fluorenyl)zirconium dimethyl, diphenylmethylene(cyclopentadienyl)(9-fluorenyl)zirconium dimethyl, or di(para-triethylsilylphenyl)methylene(2,7-di-tertbutylfluorenyl)(cyclopentadienyl)zirconium dimethyl. In some embodiments, zirconium based catalysts of formula 1, 1a and 1b are preferred such as, for example diphenylmethylene(cyclopentadienyl)(9-fluorenyl)zirconium dimethyl, or di(para-triethylsilylphenyl)methylene(2,7-di-tertbutylfluorenyl)(cyclopentadienyl)zirconium dimethyl.

Catalysts capable of making the syndiotactic polypropylene homopolymers and syndiotactic propylene-rich ethylene-propylene copolymers can also include metallocene compounds (pre-catalysts) having the structure represented by formula (2) having $C_s$ or pseudo-$C_s$ symmetry:

(2)

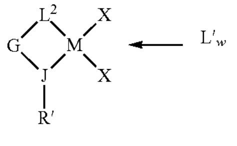

wherein:

M is hafnium, zirconium or titanium;

$L^1$ is a unsubstituted fluorenyl, heterocyclopentapentalenyl, or heterofluorenyl, or a substituted fluorenyl, heterocyclopentapentalenyl, or heterofluorenyl ligand with one or more symmetric or pseudo symmetric substituents, each substituent group being, independently, a radical group which is a hydrocarbyl, substituted hydrocarbyl, halocarbyl, substituted halocarbyl, silylcarbyl or germylcarbyl, and optionally two or more adjacent substituents may join to form a substituted or unsubstituted, saturated, partially unsaturated or aromatic, cyclic or polycyclic substituent;

G is a bridging group;

J is a heteroatom from group 15, such as N or P, such as N;

R' is a radical group which is a hydrocarbyl, substituted hydrocarbyl, halocarbyl, or substituted halocarbyl;

L' is a neutral Lewis base and w represents the number of L' bonded to M where w is 0, 1, or 2, and optionally any L' and any X may be bonded to one another;

each X is independently hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a dianionic chelating ligand.

In some embodiments of formula (2), $L^1$ is fluorenyl or substituted fluorenyl, such as fluorenyl, 2,7-dimethylfluorenyl, 2,7-diethylfluorenyl, 2,7-dipropylfluorenyl, 2,7-dibutylfluorenyl, 2,7-diphenylfluorenyl, 2,7-dichlorofluorenyl, 2,7-dibromofluorenyl, 3,6-dimethylfluorenyl, 3,6-diethylfluorenyl, 3,6-dipropylfluorenyl, 3,6-dibutylfluorenyl, 3,6-diphenylfluorenyl, 3,6-dichlorofluorenyl, 3,6-dibromofluorenyl or 1,1,4,4,7,7,10,10-octamethyl-octahydrodibenzofluorenyl. In some embodiments, G is methylene, dimethylmethylene, diphenylmethylene, dimethylsilylene, methylphenylsilylene, diphenylsilylene, di(4-triethylsilylphenyl)silylene, ethylene, such as diphenylmethylene, diphenylsilylene, methylphenylsilylene, and dimethylsilylene; such as dimethylsilylene. In some embodiments, J is nitrogen. In some embodiments, R' is hydrocarbyl or halocarbyl, such as $C_3$-$C_{20}$ hydrocarbyl, such as all isomers (including cyclics and polycyclics) of propyl, butyl, pentyl, hexyl, heptyl, octyl, nonyl, decyl, undecyl, dodecyl, benzyl, phenyl and substituted phenyl, such as tert-butyl, neopentyl, benzyl, phenyl, diisopropylphenyl, adamantyl, norbornyl, cyclohexyl, cyclooctyl, cyclodecyl, and cyclododecyl, such as tert-butyl, adamant-1-yl, norborn-2-yl, cyclohexyl, cyclooctyl, and cyclododecyl. In some embodiments, X is hydrocarbyl or halo, such as methyl, benzyl, fluoro or chloro, such as methyl or chloro. In some embodiments, w is zero (L' being absent) and M is zirconium or titanium.

In some embodiments, a catalyst of Formula (2) is:

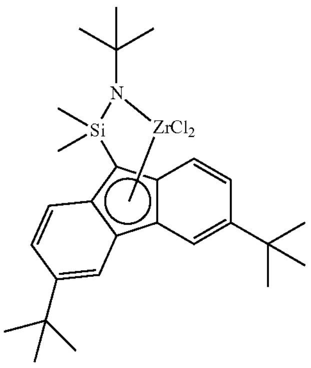

Catalysts useful for making the syndiotactic polypropylene homopolymers and syndiotactic propylene-rich ethylene-propylene copolymers can also include metallocene compounds (pre-catalysts) having a structure represented by formula (3) having $C_s$ or pseudo-$C_s$ symmetry:

(3)

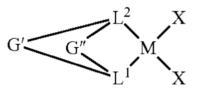

wherein:

M is hafnium or zirconium;

$L^3$ is a cyclopentadienyl ring optionally substituted in the 4 position of the ring, the substituent group being chosen from a radical group which is a hydrocarbyl, substituted hydrocarbyl, halocarbyl, substituted halocarbyl, silylcarbyl or germylcarbyl;

$L^4$ is a substituted cyclopentadienyl ring with symmetric or pseudo symmetric substituents in the 3 and 5 positions of the ring, each substituent group being, independently, a radical group which is a hydrocarbyl, substituted hydrocarbyl, halocarbyl, substituted halocarbyl, silylcarbyl or germylcarbyl;

G' and G" are bridging groups;

each X is independently a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; both X may, independently, be a halogen, alkoxide, aryloxide, amide, phosphide or other univalent anionic ligand or both X can also be joined to form a dianionic chelating ligand.

In formula (3), $L^3$ is cyclopentadienyl, or hydrocarbyl or silylcarbyl substituted cyclopentadienyl with the substitution on the 4-position of the cyclopentadienyl ring, such as cyclopentadienyl, 4-methylcyclopentadienyl, 4-ethylcyclopentadienyl, 4-propylcyclopentadienyl, 4-butylcyclopentadienyl, 4-pentylcyclopentadienyl, 4-hexylcyclopentadienyl, 4-heptylcyclopentadienyl, 3-octylcyclopentadienyl, or 4-trimethylsilylcyclopentadieyl, such as cyclopentadienyl, 4-isopropylcyclopentadienyl, 4-tert-butylcyclopentadienyl, 4-(2,2-dimethylpent-3-yl)cyclopentadienyl, 4-(2,2-dimethylbut-3-yl)cyclopentadienyl or 4-trimethylsilylcyclopentadienyl, such as cyclopentadienyl, 4-isopropylcyclopentadienyl, or 4-trimethylsilylcyclopentadienyl. In some embodiments, $L^4$ is hydrocarbyl or silylcarbyl substituted cyclopentadienyl with the substitutions on the 3- and 5-positions of the cyclopentadienyl ring, such as 3,5-dimethylcyclopentadienyl, 3,5-diethylcyclopentadienyl, 3,5-dipropylcyclopentadienyl, 3,5-dibutylcyclopentadienyl, 3,5-dipentylcyclopentadienyl, 3,5-dihexylcylopentadienyl, 3,5-dibenzylcyclopentadienyl, or 3,5-bis(trimethylsilyl) cyclopentadieyl, such as 3,5-dimethylcyclopentadienyl, 3,5-diisopropylcyclopentadienyl, 3,5-di-tert-butylcyclopentadienyl, 3,5-dicyclopentylcyclopentadienyl, 3,5-dipent-3-ylcyclopentadienyl, 3,5-dicyclohexylcylopentadienyl, 3,5-dibenzylcyclopentadienyl, or 3,5-bis(trimethylsilyl)cyclopentadienyl, such as 3,5-dimethylcyclopentadienyl, 3,5-diisopropylcyclopentadienyl, 3,5-di-tert-butylcyclopentadienyl, 3,5-dibenzylcyclopentadienyl, or 3,5-bis(trimethylsilyl)cyclopentadieyl. In some embodiments, each G' and G" are methylene, dimethylmethylene, dimethylsilylene, such as dimethylmethylene or dimethylsilylene; such as dimethylsilylene. In some embodiments, each X is hydrocarbyl or halo, such as methyl, benzyl, fluoro or chloro, such as methyl or chloro. In some embodiments, M is zirconium. In alternative embodiments, M is hafnium.

A subset of the metallocene compounds (pre-catalysts) represented by formula (3) that may be used include those having $C_s$ or pseudo-$C_s$ symmetry are represented by formula (3a):

(3a)

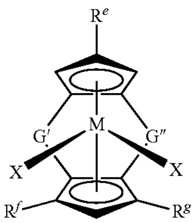

wherein M, G', G", and X are defined as in formula (3);

$R^e$ is selected from hydrogen or a hydrocarbyl, substituted hydrocarbyl, halocarbyl, substituted halocarbyl, silylcarbyl or germylcarbyl radicals;

each $R^f$ and $R^g$ are selected from hydrocarbyl, substituted hydrocarbyl, halocarbyl, substituted halocarbyl, silylcarbyl, or germylcarbyl, with the proviso that each $R^f$ and $R^g$ are chosen to allow the compound to be $C_s$-symmetric or pseudo $C_s$-symmetric.

In some embodiments of formula (3a), each $R^f$ and $R^g$ are independently hydrocarbyl or silylcarbyl, such as methyl, ethyl, propyl, butyl, pentyl, hexyl, benzyl, or trimethylsilyl, such as methyl, isopropyl, tert-butyl, cyclopentyl, pent-3-yl, cyclohexyl, benzyl, or trimethylsilyl, such as methyl, isopropyl, tert-butyl, benzyl or trimethylsilyl. In some embodiments, $R^e$ is hydrogen, hydrocarbyl or silylcarbyl, such as methyl, ethyl, propyl, butyl, pentyl, hexyl, heptyl, octyl, or trimethylsilyl; such as hydrogen, isopropyl, tert-butyl, 2,2-dimethylpent-3-yl, 2,2-dimethylbut-3-yl, or trimethylsilyl, such as hydrogen, isopropyl or trimethylsilyl.

In some embodiments, a catalyst of formula (3) is:

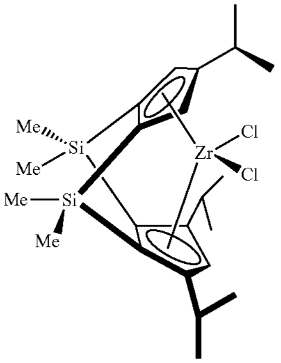

In some embodiments of formulas 1, 1a, 1b, 2, 3, or 3a, G, G' and G" are selected from $R^*_2C$, $R^*_2Si$, $R^*_2Ge$, $R^*_2CCR^*_2$, $R^*C{=}CR^*$, $R^*_2CSiR^*_2$, $R^*_2SiSiR^*_2$, $R^*B$, $R^*_2C{-}BR^*$, $R^*N$, $R^*P$, O, S, and Se, where each R* is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated, cyclic or polycyclic substituent. In some embodiments, G, G' and G" are selected from $R^*_2C$, $R^*_2Si$, $R^*_2Ge$, $R^*_2CCR^*_2$, $R^*B$, $R^*N$, $R^*P$, O, S, and Se, where each R* is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated, cyclic or polycyclic substituent. In some embodiments, G, G' and G" are independently selected from $R^*_2C$, $R^*_2Si$, and $R^*_2CCR^*_2$ where each R* is independently selected from hydrogen, $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated, cyclic or polycyclic substituent.

Catalysts capable of making the syndiotactic polypropylene polymers and syndiotactic propylene-rich ethylene-propylene copolymers described herein may also include compounds (pre-catalysts) having a structure represented by formula (4) having $C_2$ symmetry:

(4)

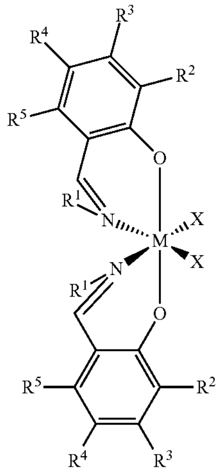

wherein:

M is zirconium or titanium;

O is oxygen;

N is nitrogen;

$R^1$ is hydrocarbyl, substituted hydrocarbyl, halocarbyl, substituted halocarbyl, silylcarbyl or germylcarbyl, such as $R^1$ is halocarbyl;

$R^2$ is hydrocarbyl, substituted hydrocarbyl, halocarbyl, substituted halocarbyl, silylcarbyl or germylcarbyl, such as $R^2$ is hydrocarbyl having three or more carbon atoms or silylcarbyl having three or more carbon atoms;

each of $R^3$, $R^4$, and $R^5$ is independently hydrogen or a hydrocarbyl, substituted hydrocarbyl, halocarbyl, substituted halocarbyl, silylcarbyl or germylcarbyl, such as $R^3$, $R^4$ and $R^5$ are hydrogen;

each X is independently a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; both X may independently be a halogen, alkoxide, aryloxide, amide, phosphide or other univalent anionic ligand or both X can also be joined to form a dianionic chelating ligand.

In some embodiments of formula (4), $R^1$ is hydrocarbyl or halocarbyl radical, such as methyl, ethyl, propyl, butyl, pentyl, hexyl, benzyl, phenyl, methylphenyl, dimethylphenyl, ethylphenyl, diethylphenyl, propylphenyl, dipropylphenyl, perfluorophenyl, trifluorophenyl, difluorophenyl, or fluorophenyl, such as phenyl, 2-methylphenyl, 2,6-dimethylphenyl, 2-isopropylphenyl, perfluorophenyl, 2,4,6-trifluorophenyl, 2,6-difluorophenyl, 3,5-difluorophenyl or 4-fluorophenyl, such as perfluorophenyl. In some embodiments, $R^2$ is hydrocarbyl or silylcarbyl radicals, such as $C_3$-$C_{12}$ hydrocarbyl or $C_3$-$C_{12}$ silylcarbyl, such as propyl, butyl, pentyl, hexyl, heptyl, octyl, cumyl, or trimethylsilyl, such as isopropyl, tert-butyl, cumyl, or trimethylsilyl, such as tert-butyl or trimethylsilyl. In some embodiments, $R^3$, $R^4$, and $R^5$ are independently hydrogen or hydrocarbyl radicals. In some embodiments, each X is hydrocarbyl or halo, such as methyl, benzyl, fluoro or chloro, such as methyl or chloro. In some embodiments, M is titanium.

In some embodiments, a catalyst compound of formula (4) is:

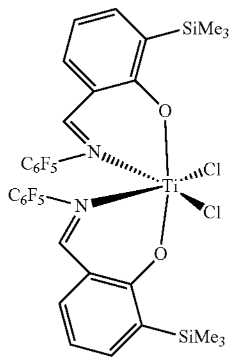

Activators and Catalyst Activation

The terms "cocatalyst" and "activator" are used herein interchangeably and are defined to be any compound which can activate any one of the pre-catalyst compounds described above by converting the neutral pre-catalyst compound to a catalytically active cationic compound. Non-limiting activators, for example, include alumoxanes, aluminum alkyls, ionizing activators, which may be neutral (Lewis acid activators) or ionic (ionic activators), and conventional-type cocatalysts. Activators may include alumoxane compounds, modified alumoxane compounds, or ionizing anion precursor compounds that abstract a reactive, σ-bound, metal ligand making the metal complex cationic and providing a charge-balancing noncoordinating or weakly coordinating anion.

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane can be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), at least one embodiment selects the maximum amount of activator typically at up to a 5000-fold molar excess Al/M over the catalyst compound (per metal catalytic site). The minimum activator-to-catalyst-compound is a 1:1 molar ratio. Alternative suitable ranges include from 1:1 to 500:1, alternatively from 1:1 to 200:1, alternatively from 1:1 to 100:1, or alternatively from 1:1 to 50:1.

In an alternative embodiment, little or no alumoxane is used in the polymerization processes described herein. For example, alumoxane is present at zero mole %, alternatively the alumoxane is present at a molar ratio of aluminum to catalyst compound transition metal less than 500:1, such as less than 300:1, such as less than 100:1, such as less than 1:1.

Lewis acid activators include triphenylboron, tris-perfluorophenylboron, tris-perfluorophenylaluminum, but exclude the class of activators referred to as alumoxanes. Ionic activators include dimethylanilinium tetrakisperfluorophenylborate, triphenylcarbonium tetrakisperfluorophenylborate, dimethylanilinium tetrakisperfluorophenylaluminate. Lewis acid activators and ionic activators are referred to as stoichiometric activators since relatively low molar ratios of activator to transition metal compound are needed as compared to alumoxane activators that require large excess of activator relative to transition metal compound.

Neutral or ionic activators such as tri(n-butyl)ammonium tetrakis(pentafluorophenylborate), trisperfluorophenylboron, trisperfluoronaphthylboron, polyhalogenated heteroborane anions, boric acid, or combinations thereof may also be used.

Stoichiometric activators (at times used in combination with a co-activator) may be used in producing the syndiotactic polypropylene homopolymers and syndiotactic propylene-rich ethylene-propylene copolymers described herein.

For example, activators such as trialkylammonium tetrakis(pentafluorophenyl)borate, N,N-dialkylanilinium tetrakis (pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl) borate, N,N-dialkylanilinium tetrakis(perfluoronaphthyl) borate, trialkylammonium tetrakis(perfluorobiphenyl) borate, N,N-dialkylanilinium tetrakis(perfluorobiphenyl) borate, trialkylammonium tetrakis(3,5-bis(trifluoromethyl) phenyl)borate, N,N-dialkylanilinium tetrakis(3,5-bis (trifluoromethyl)phenyl)borate, N,N-dialkyl-(2,4,6-trimethylanilinium) tetrakis(3,5-bis(trifluoromethyl)phenyl) borate, di-(i-propyl)ammonium tetrakis(pentafluorophenyl) borate, (where alkyl is methyl, ethyl, propyl, n-butyl, isobutyl, or t-butyl) are used.

In at least one embodiment, the activator is one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl) phenyl)borate, triphenylcarbenium tetrakis(perfluoronaphthyl)borate, triphenylcarbenium tetrakis(perfluorobiphenyl)

borate, triphenylcarbenium tetrakis(3,5-bis(trifluoromethyl) phenyl)borate, triphenylcarbenium tetra(perfluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(t-butyl)ammonium tetrakis(perfluoronaphthyl) borate, N,N-diethylanilinium tetrakis(perfluoronaphthyl) borate, N,N-dimethyl-(2,4,6-trimethylanilinium) tetrakis (perfluoronaphthyl)borate, tropillium tetrakis (perfluoronaphthyl)borate, di(hydrogenated tallow) methylamonium tetrakis(perfluorophenyl)borate, di(hydrogenated tallow)methylamonium tetrakis(perfluoronaphthyl)borate, dioctadecylmethylammonium tetrakis (perfluorophenyl)borate, and dioctadecylmethylammonium tetrakis(perfluoronaphthyl)borate. Additional useful activators include: N-methyl-4-nonadecyl-N-octadecylanilinium [tetrakis(perfluorophenyl)borate], N-methyl-4-hexadecyl-N-octadecylanilinium [tetrakis(perfluorophenyl)borate], N-methyl-4-tetradecyl-N-octadecylanilinium [tetrakis(perfluorophenyl)borate], N-methyl-4-dodecyl-N-octadecylanilinium [tetrakis(perfluorophenyl)borate], N-methyl-4-decyl-N-octadecylanilinium [tetrakis(perfluorophenyl) borate], N-methyl-4-octyl-N-octadecylanilinium [tetrakis (perfluorophenyl)borate], N-methyl-4-hexyl-N-octadecylanilinium [tetrakis(perfluorophenyl)borate], N-methyl-4-butyl-N-octadecylanilinium [tetrakis(perfluorophenyl)borate], N-methyl-4-octadecyl-N-decylanilinium [tetrakis(perfluorophenyl)borate], N-methyl-4-nonadecyl-N-dodecylanilinium [tetrakis(perfluorophenyl)borate], N-methyl-4-nonadecyl-N-tetradecylanilinium [tetrakis(perfluorophenyl)borate], N-methyl-4-nonadecyl-N-hexadecylanilinium [tetrakis(perfluorophenyl)borate], N-ethyl-4-nonadecyl-N-octadecylanilinium [tetrakis(perfluorophenyl) borate], N-methyl-N,N-dioctadecylammonium [tetrakis (perfluorophenyl)borate], N-methyl-N,N-dihexadecylammonium [tetrakis(perfluorophenyl)borate], N-methyl-N,N-ditetradecylammonium [tetrakis(perfluorophenyl)borate], N-methyl-N,N-didodecylammonium [tetrakis(perfluorophenyl)borate], N-methyl-N,N-didecylammonium [tetrakis(perfluorophenyl)borate], N-methyl-N,N-dioctylammonium [tetrakis(perfluorophenyl)borate], N-ethyl-N,N-dioctadecylammonium [tetrakis(perfluorophenyl)borate], N,N-di(octadecyl)tolylammonium [tetrakis(perfluorophenyl)borate], N,N-di(hexadecyl)tolylammonium [tetrakis(perfluorophenyl)borate], N,N-di(tetradecyl)tolylammonium [tetrakis (perfluorophenyl)borate], N,N-di(dodecyl)tolylammonium [tetrakis(perfluorophenyl)borate], N-octadecyl-N-hexadecyl-tolylammonium [tetrakis(perfluorophenyl)borate], N-octadecyl-N-hexadecyl-tolylammonium [tetrakis(perfluorophenyl)borate], N-octadecyl-N-tetradecyl-tolylammonium [tetrakis(perfluorophenyl)borate], N-octadecyl-N-dodecyl-tolylammonium [tetrakis(perfluorophenyl)borate], N-octadecyl-N-decyl-tolylammonium [tetrakis(perfluorophenyl)borate], N-hexadecyl-N-tetradecyl-tolylammonium [tetrakis(perfluorophenyl)borate], N-hexadecyl-N-dodecyl-tolylammonium [tetrakis(perfluorophenyl)borate], N-hexadecyl-N-decyl-tolylammonium [tetrakis(perfluorophenyl) borate], N-tetradecyl-N-dodecyl-tolylammonium [tetrakis (perfluorophenyl)borate], N-tetradecyl-N-decyl-tolylammonium [tetrakis(perfluorophenyl)borate], N-dodecyl-N-decyl-tolylammonium [tetrakis(perfluorophenyl)borate], N-methyl-N-octadecylanilinium [tetrakis(perfluorophenyl)borate], N-methyl-N-hexadecylanilinium [tetrakis(perfluorophenyl)borate], N-methyl-N-tetradecylanilinium [tetrakis(perfluorophenyl)borate], N-methyl-N-dodecylanilinium [tetrakis(perfluorophenyl) borate], N-methyl-N-decylanilinium [tetrakis(perfluorophenyl)borate], and N-methyl-N-octylanilinium [tetrakis(perfluorophenyl)borate]

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. For example, the three substituent groups are independently selected from halogen, mono or multicyclic (including halo-substituted) aryls, alkyls, and alkenyl compounds and mixtures thereof, for example can be alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). In some embodiments, the three substituent groups are alkyls having 1 to 4 carbon groups, phenyl, naphthyl or mixtures thereof. In some embodiments, the three substituent groups are halogenated, such as fluorinated aryl groups. In some embodiments, the neutral stoichiometric activator is tris (perfluorophenyl)boron or tris(perfluoronaphthyl)boron.

Ionic stoichiometric activator compounds may contain an active proton, or some other cation associated with, but not coordinated to, or only loosely coordinated to, the remaining ion of the ionizing compound. Such compounds are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, US2021079537, WO2021/086467, US2019/0330169, US2019/0330392, and U.S. Pat. No. 5,972,823, all of which are herein incorporated by reference.

Ionic catalysts can be prepared by reacting a transition metal compound with an activator, such as $B(C_6F_6)_3$, which upon reaction with the hydrolyzable ligand (X') of the transition metal compound forms an anion, such as ($[B(C_6F_5)_3(X')]^-$), which stabilizes the cationic transition metal species generated by the reaction. The catalysts can be prepared with activator components which are ionic compounds or compositions. However, preparation of activators utilizing neutral compounds is also contemplated.

Compounds useful as an activator component in the preparation of the ionic catalyst systems used in the process may comprise a cation, which can be a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In at least one embodiment, the ionic stoichiometric activators include a cation and an anion component, and may be represented by the following formula:

$$(L^{**}\text{-}H)_d{+}(A^{d-})$$

wherein L is an neutral Lewis base; H is hydrogen; (L-H)+ is a Brønsted acid, and $A^{d-}$ is a non-coordinating anion having the charge d-, and d is an integer from 1 to 3.

The cation component (($(L^{**}\text{-}H)_d^+$) may include Brønsted acids such as protons or protonated Lewis bases or reducible Lewis acids capable of protonating or abstracting a moiety, such as an alkyl or aryl, from the precatalyst after alkylation.

The activating cation $(L^{}\text{-}H)_d^+$ may be a Brønsted acid, capable of donating a proton to the alkylated transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene, and mixtures thereof. The activating cation $(L^{}\text{-}H)_d^+$ may also be a moiety such as silver, tropylium, carbeniums, ferroceniums and mixtures, such as carboniums and ferroceniums; such as triphenyl carbonium. The anion component $A^{d-}$ include those having the formula $[M^{k+}Q_n]^{d-}$ wherein k is an integer from 1 to 3; n is an integer from 2-6; n−k=d; M is an element selected from group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. For example, each Q is a fluorinated hydrocarbyl group having 1 to 20 carbon atoms, such as each Q is a fluorinated aryl group, such as each Q is a pentafluoryl aryl group. Examples of suitable $A^{d-}$ also include diboron compounds as disclosed in U.S. Pat. No. 5,447,895, which is fully incorporated herein by reference.

In some embodiments, boron compounds which may be used as a non-coordinating anion activator in combination with a co-activator in the preparation of the catalysts of this disclosure are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl (tert-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(tert-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis (trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl) borate, N,N-dimethylanilinium tetrakis(3,5-bis(trifluoromethyl)phenyl)borate, N,N-diethylanilinium tetrakis(3,5-bis (trifluoromethyl)phenyl)borate, N,N-dimethyl-(2,4,6-trimethylanilinium) tetrakis(3,5-bis(trifluoromethyl)phenyl) borate, and dialkyl ammonium salts such as: di-(isopropyl) ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyOborate, triphenylphosphonium tetrakis(pentafluorophenyl)borate, triethylsilylium tetrakis(pentafluorophenyl)borate, benzene(diazonium) tetrakis (pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, and benzene(diazonium) tetrakis(3,5-bis(trifluoromethyl)phenyl)borate.

In some embodiments, the non-coordinating anion activator, $(L^{**}\text{-}H)_d^+(A^{d-})$, is N,N-dimethylanilinium tetrakis (perfluorophenyl)borate, N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions, as described in U.S. Patent Publication 2002/0058765 A1, and for the instant disclosure, require the addition of a co-activator to the catalyst pre-cursor. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Example non-coordinating anions useful in accordance with this disclosure are those that are compatible, stabilize the transition metal complex cation in the sense of balancing its ionic charge at +1, and yet retain sufficient liability to permit displacement by an ethylenically or acetylenically unsaturated monomer during polymerization. These types of cocatalysts are sometimes used with scavengers such as but not limited to tri-iso-butylaluminum, tri-n-octylaluminum, tri-n-hexylaluminum, triethylaluminum or trimethylaluminum.

Disclosure processes also can employ cocatalyst compounds or activator compounds that are initially neutral Lewis acids but form a cationic metal complex and a non-coordinating anion, or a zwitterionic complex upon reaction with the alkylated transition metal compounds. The alkylated metallocene compound is formed from the reaction of the catalyst pre-cursor and the co-activator. For example, tris(pentafluorophenyl) boron or aluminum act to abstract a hydrocarbyl ligand to yield an disclosure cationic transition metal complex and stabilizing non-coordinating anion, see EP-A-0 427 697 and EP-A-0 520 732 for illustrations of analogous group-4 metallocene compounds. Also, see the methods and compounds of EP-A-0 495 375. For formation of zwitterionic complexes using analogous group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

When the cations of non-coordinating anion activators are Brønsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator (such as an NCA) is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

In some embodiments, activators and activator/co-activator combinations include dimethylanilinium tetrakis(pentafluorophenyl)borate or tris(pentafluorophenyl)boron, or mixtures of trialkyl aluminum with dimethylanilinium tetrakis(pentafluorophenyl)borate or tris(pentafluorophenyl) boron. In some embodiments, scavenging compounds are used with activators. Typical aluminum or boron alkyl components useful as scavengers are represented by the general formula $R^xJ'Z'_2$ where J' is aluminum or boron, $R^x$ is as previously defined above, and each Z' is independently $R^x$ or a different univalent anionic ligand such as halogen (Cl, Br, I), alkoxide ($OR^x$) and the like. Aluminum alkyls can include triethylaluminum, diethylaluminum chloride, tri-iso-butylaluminum, tri-n-octylaluminum, tri-n-hexylaluminum, trimethylaluminum and the like. Boron alkyls can include triethylboron. Scavenging compounds can be alumoxanes and modified alumoxanes including methylalumoxane and modified methylalumoxane.

In some embodiments, the precatalyst and or activator are combined with an alkylaluminum compound, such as a trialkylaluminum compound, prior to entering the reactor. For example, the alkylaluminum compound can be represented by the formula: $R_3Al$, where each R is independently a $C_1$ to $C_{20}$ alkyl group; such as the R groups are independently selected from methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-decyl, undecyl, isoundecyl, n-undecyl, dodecyl, isododecyl, and n-dodecyl, such as isobutyl, n-octyl, n-hexyl, and n-dodecyl. In some embodiments, the alkylaluminum compound is selected from tri-isobutyl aluminum, tri n-octyl aluminum, tri-n-hexyl aluminum, and tri-n-dodecyl aluminum.

Chain Transfer Agent

Polymerization processes of the present disclosure may include polymerization in the presence of a chain transfer agent or chain shuttling agent.

Chain transfer agents include alkylaluminum compounds represented by the formula: $R_3Al$, where each R is, independently, a $C_1$ to $C_{18}$ alkyl group, such as each R is, independently, selected from methyl, ethyl, n-propyl, isopropyl, iso-butyl, n-butyl, t-butyl, n-pentyl, iso-pentyl, neopentyl, n-hexyl, iso-hexyl, n-heptyl, iso-heptyl, n-octyl, isooctyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

In the process, hydrogen can also be used as a useful chain transfer agent in the reaction. In some embodiments, alternative chain transfer agents can be used in the processes described herein, reducing the need for hydrogen wherein hydrogen is absent or used in limited amounts. In some embodiments, chain transfer agents include diethylzinc, and trialkylaluminums such as triisobutylaluminum, tri-n-octylaluminum, triethylaluminum and the like, or mixtures thereof.

In some embodiment, the chain transfer agent can be used at a molar ratio of the chain transfer agent to the transition metal compound of from 1:1 to 150:1. In at least one embodiment, the molar ratio of chain transfer agent to the transition metal compound can be greater than 5:1, or greater than 10:1, or greater than 20. Likewise, the molar ratio of chain transfer agent to the transition metal compound can be less than 120:1, or less than 100:1, or less than 80:1.

Polymerization Process

The syndiotactic-rich ethylene-propylene copolymers can be produced by contacting ethylene and propylene with at least one catalyst in any manner known in the art. Any homogeneous, bulk, solution (including supercritical) phase, slurry- and gas-phase polymerization processes known in the art can be used. Such processes can be run in a batch, semi-batch, or continuous mode. Such processes can also be run in systems with single reactor or multiple reactors in series and/or parallel configuration. Homogeneous polymerization processes are preferred. A homogeneous polymerization process is defined to be a process where at least 90 wt % of the product is soluble in the reaction media at polymerization condition. The monomer itself can be also used as a solvent/diluent in a bulk polymerization process. A bulk process is typically a process where monomer concentration in all feeds to the reactor is 70 vol % or more. Alternately, no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; normal paraffins (such as Norpar solvents available for ExxonMobil Chemical Company, Houston, Texas), or isoparaffin solvents (such as Isopar solvents available for ExxonMobil Chemical Company, Houston, Texas) (Isopar™); cyclic and alicyclic hydrocarbons, such as cyclohexane, cycloheptane, methylcyclohexane, methylcycloheptane, and mixtures thereof; aromatic and alkyl substituted aromatic compounds such as toluene and or xylenes and or ethylbenzene; perhalogenated hydrocarbons, such as perfluorinated $C_{4-10}$ alkanes, chlorobenzene. Mixtures of any of the foregoing hydrocarbon solvents may also be used. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

Preferred polymerizations can be run at any temperature and/or pressure suitable to obtain the desired polymers. Typical temperatures and/or pressures include a temperature in the range of from about 50° C. to about 200° C., from about 55° C. to about 150° C., from about 58° C. to about 120° C., preferably from about 60° C. to about 110° C., preferably from about 60° C. to about 90° C.; and at a pressure in the range of from about 0.35 MPa to about 14 MPa, preferably from about 2 MPa to about 13 MPa, preferably from about 4 MPa to about 13 MPa, preferably from about 7 MPa to about 12 MPa, preferably from about 9 MPa to about 11.5 MPa, preferably from about 9 MPa to about 11 MPa. In some catalyst systems, the syndiotacticity of the ethylene-propylene copolymer varies with polymerization temperature, selection of temperature can be determined by the desirable level of the syndiotacticity of the ethylene-propylene copolymer. In one embodiment, the polymerization is conducted at a temperature of 60° C. or higher with an upper temperature limit of 120° C., and at a pressure of 9.5 MPa or higher.

In one embodiment, the polymerization occurs at a polymerization temperature of TP1 or higher, wherein TP1=0.9*EXP(−0.005*rr). Preferably, the polymerization temperature is at least of TP2, wherein TP2=1.15*EXP(−0.006*rr). The unit of TP1 and TP2 is ° C., and rr is triad tacticity index of the syndiotactic ethylene-propylene copolymers measured using $^{13}C$ NMR.

In some embodiments, hydrogen is present in the polymerization reactor at a partial pressure of 0.001 to 50 psig (0.007 to 345 kPa), preferably from 0.01 to 25 psig (0.07 to 172 kPa), more preferably from 0.1 to 10 psig (0.7 to 70 kPa). In some embodiments, hydrogen is not added the polymerization reactor, i.e., hydrogen may be present from other sources, such as a hydrogen generating catalyst, but none is added to the reactor. Alternatively, the hydrogen concentration is 10000 ppm or less in the feed, preferably 5000 ppm or less.

The catalysts typically have catalyst activity higher than 10,000 kg of polymer per kg of catalyst or more, 20,000 kg of polymer per kg of catalyst or more, 50,000 kg of polymer per kg of catalyst or more, 100,000 kg of polymer per kg of catalyst or more when polymerization occurs in a continuous process. Likewise, the conversion of olefin monomer is at least 10%, based upon polymer yield and the weight of the monomer entering the reaction zone, preferably 20% or more, preferably 30% or more, preferably 50% or more, preferably 80% or more.

The catalyst and activator may be delivered as a solution, neat liquid, suspension or slurry, either separately to the reactor, activated in-line just prior to the reactor, or preactivated and pumped as an activated solution or slurry to the reactor. In one embodiment, the catalyst and the activator can be fed into the polymerization reactor in form of dry powder or slurry without the need of preparing a homogenous catalyst solution by dissolving the catalyst into a carrying solvent.

The syndiotactic-rich ethylene-propylene copolymers can also include at least one other monomer and can be prepared by contacting ethylene, propylene and at least one other monomer with at least one catalyst in any manner known in the art. Suitable other monomers include substituted or unsubstituted C2 to C40 alpha olefins, preferably C2 to C20 alpha olefins, preferably C2 to C12 alpha olefins, preferably butene, pentene, hexene, heptene, octene, nonene, decene, undecene, dodecene and isomers thereof. In a preferred embodiment of the invention, the monomer comprises propylene and an optional comonomers comprising one or more of ethylene or C4 to C40 olefins, preferably C4 to C20 olefins, or preferably C6 to C12 olefins. The C4 to C40 olefin monomers may be linear, branched, or cyclic. The C4 to C40 cyclic olefins may be strained or unstrained, monocyclic or polycyclic, and may optionally include heteroatoms and/or one or more functional groups. Exemplary C2 to C40 olefin monomers and optional comonomers include butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene. Preferably, the polymer is a syndiotactic-rich ethylenepropylene-hexene terpolymers or syndiotactic-rich ethylene-propylene-octene terpolymers.

The polymerization can be carried out in multiple reactors in series and parallel configurations. In one embodiments, the copolymer is a reactor blend of a first polymer component and a second polymer component. Thus, the comonomer content of the copolymer can be adjusted by adjusting the comonomer content of the first polymer component, adjusting the comonomer content of second polymer component, and/or adjusting the ratio of the first polymer component to the second polymer component present in the copolymer.

The syndiotactic-rich ethylene-propylene copolymers according to various embodiments can be a blend of at least two syndiotactic-rich ethylene-propylene copolymers. The blend can be prepared using two or more reactors in series or parallel. Preferably, the blend has a bimodal molecular weight distribution or wide molecular weight distribution with MWD>3.0. The blend can also have a bimodal composition distribution or wide composition distribution. Preferably one component has ethylene content in the range of 0.2 to 5 wt %, and one component has ethylene content in the range of 2 to 15 wt %. Each of the blending component can be prepared in a different reactor when multiple reactors are used. This is accomplished by operating the reactor at different polymerization conditions and/or use different catalysts in each reactor. The syndiotactic-rich ethylene-propylene copolymer blend can also be made in a single reactor with multiple catalysts. In one embodiment, one component has Mw in the range of 10,000 to 30,000 g/mol and ethylene content in the range of 0.2 to 3 wt %, and one component has Mw in the range of 30,000 to 200,000 g/mol and ethylene content in the range of 2 to 10 wt %.

In one embodiment, solution polymerization process is preferred. Solution polymerization processes may be used to carry out the polymerization reactions disclosed herein in any suitable manner known to one having ordinary skill in the art. In particular embodiments, the polymerization processes may be carried out in continuous polymerization processes. The term "batch" refers to processes in which the complete reaction mixture is withdrawn from the polymerization reactor vessel at the conclusion of the polymerization reaction. In contrast, in a continuous polymerization process, one or more reactants are introduced continuously to the reactor vessel and a solution comprising the polymer product is withdrawn concurrently or near concurrently. A solution polymerization means a polymerization process in which the polymer produced is soluble in a liquid polymerization medium, such as an inert solvent or monomer(s) or their blends. A solution polymerization is typically homogeneous. Such systems are preferably not turbid as described in J. Vladimir Oliveira, C. Dariva and J. C. Pinto, Ind. Eng. Chem. Res. 29, 2000, 4627.

In a typical solution process, catalyst components, solvent, monomers and hydrogen (when used) are fed under pressure to one or more reactors. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The monomers are dissolved/dispersed in the solvent either prior to being fed to the first reactor or dissolve in the reaction mixture. The solvent and monomers are generally purified to remove potential catalyst poisons prior entering the reactor. The feedstock may be heated or cooled prior to feeding to the first reactor. Additional monomers and solvent may be added to the second reactor, and it may be heated or cooled. The catalysts/activators can be fed in the first reactor or split between two reactors. In solution polymerization, polymer produced is molten and remains dissolved in the solvent under reactor conditions, forming a polymer solution (also referred as to effluent).

The solution polymerization process of this invention uses stirred tank reactor system comprising one or more stirred polymerization reactors. Generally, the reactors should be operated under conditions to achieve a thorough mixing of the reactants. In a multiple reactor system, the first polymerization reactor preferably operates at lower temperature. The residence time in each reactor will depend on the design and the capacity of the reactor. The catalysts/activators can be fed into the first reactor only or split between two reactors. In an alternative embodiment, a loop reactor and plug flow reactors can be employed for current invention.

The polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. The lean phase and volatiles removed downstream of the liquid phase separation can be recycled to be part of the polymerization feed.

A polymer can be recovered from the effluent of either reactor or the combined effluent, by separating the polymer from other constituents of the effluent. Conventional separation means may be employed. For example, polymer can be recovered from effluent by coagulation with a non-solvent such as isopropyl alcohol, acetone, or n-butyl alcohol, or the polymer can be recovered by heat and vacuum stripping the solvent or other media with heat or steam. One or more conventional additives such as antioxidants can be incorporated in the polymer during the recovery procedure. Other methods of recovery such as by the use of lower critical solution temperature (LCST) followed by devolatilization are also envisioned.

In a an embodiment, the polymerization: 1) is conducted in a solution process at temperatures of 50° C. or higher (preferably 60° C. or higher, preferably 65° C. or higher) with an upper temperature limit of 120° C. or lower, alternatively 110° C. or lower, alternatively 100° C. or lower; 2) is conducted at a pressure of atmospheric pressure to 15 MPa (preferably from 1 to 15 MPa, preferably from 2 to 14 MPa, preferably from 4 to 13 MPa); 3) is conducted in an aliphatic hydrocarbon solvent (such as, isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics (such as toluene) are preferably present in the solvent at less than 1 wt %, preferably less than 0.5 wt %, preferably at 0 wt % based upon the weight of the solvents); 4) ethylene is present in the polymerization reactor at a concentration of 2 mole/liter or less); 5) the polymerization preferably occurs in one reaction zone; 6) the productivity of the catalyst compound is 5,000 kg of polymer per kg of catalyst or more (preferably 10,000 kg of polymer per kg of catalyst or more, such as 20,000 kg of polymer per kg of catalyst or more, such as 40,000 kg of polymer per kg of catalyst or more, such as 50,000 kg of polymer per kg of catalyst or more, such as the catalyst efficiency can be of from about 10,000 kg of polymer per kg of catalyst to about 500,000 kg of polymer per kg of catalyst).

The composition of the syndiotactic-rich ethylene-propylene copolymers according to various embodiments varies with feed compositions and concentrations of monomers in the polymerization reactor. In one embodiment, the molar ratio of ethylene to propylene in the feed is of 0.29 or less, preferably 0.25 or less, preferably 0.20 or less, preferably 0.15 or less preferably 0.10 or less. In another embodiment, the molar ratio of ethylene to propylene in the feed is of 0.03 or above, preferable 0.035 or above.

In a preferred embodiment, the polymerization is conducted in a solution process at a pressure of 9 MPa or higher and a temperature of 60° C. or above with an upper temperature limit of 120° C., and with catalyst efficiency 50,000 kg of polymer per kg of catalyst to about 600,000 kg of polymer per kg of catalyst.

Preferably, the polymerization is conducted in a solution process at a pressure of 9 MPa or higher and with a feed molar ratio of ethylene to propylene of 0.03 or above and with catalyst efficiency 50,000 kg of polymer per kg of catalyst to about 600,000 kg of polymer per kg of catalyst.

The syndiotactic ethylene-propylene copolymers may be used in a variety of end-use applications. Such end uses may be produced by methods known in the art. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags. End uses also include thermoplastic polyolefin (TPO) roof sheeting, foam, nonwovens, 3D printing, and recycling solutions. The syndiotactic ethylene-propylene copolymers may also be used as viscosity index modifiers for lubricants.

Gel Permeation Chromotography with Three Detectors (GPC-3D)

Molecular weights (number average molecular weight (Mn), weight average molecular weight (Mw), and z-average molecular weight (Mz)) are determined using an Agilent PL220 high temperature GPC (gel permeation chromatograph) equipped with on-line differential refractive index (DRI), light scattering (LS), and viscometer (VIS) detectors. It uses three Polymer Laboratories PLgel 10 μm Mixed-B columns for separation with a nominal flow rate of 0.5 ml/min and a nominal injection volume of 300 microliter. The detectors and columns were contained in an oven maintained at 145° C. The details of these detectors as well as their calibrations have been described by, for example, T. Sun, P. Brant, R. R. Chance, and W. W. Graessley, in Macromolecules, Volume 34, Number 19, pp. 6812-6820, (2001), incorporated herein by reference.

Solvent for the GPC tests was prepared by dissolving 6 grams of butylated hydroxy toluene as an antioxidant in 4 liters of Aldrich reagent grade 1,2,4-trichlorobenzene (TCB). The TCB mixture was then filtered through a 0.1 micrometer Teflon filter. The TCB was then degassed with an online degasser before entering the GPC. Polymer solutions were prepared by placing dry polymer in a glass container, adding the desired amount of TCB, then heating the mixture at 160° C. with continuous agitation for about 2 hours. All quantities were measured gravimetrically. The injection concentration was from 1.0 to 2.0 mg/mL, with lower concentrations being used for higher molecular weight samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI with a series of mono-dispersed polystyrene standards with molecular weight ranging from around 600 to 11M, and (dn/dc) is the refractive index increment for the system. For purposes of this invention and the claims thereto (dn/dc) =0.1048 for all ethylene-propylene copolymers and homopolymers. Units of parameters used throughout this description of the GPC method are: concentration is expressed in g/cm$^3$, molecular weight is expressed in g/mol, and intrinsic viscosity is expressed in dL/g.

The light scattering detector was a high temperature 18-angle Dawn Heleos (Wyatt Technology, Inc.). The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=657 nm. A high temperature Agilent viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_S = c[\eta] + 0.3(c[\eta])^2$$

where c is concentration and was determined from the DRI output.

$g'_{vis}$ is defined as the ratio of the intrinsic viscosity of the syndiotactic propylene-ethylene copolymer to the intrinsic viscosity of an isotactic-rich polypropylene-ethylene copolymer of equal molecular weight and composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits.

$g'_{vis}$ is defined as:

$$g'_{vis} = \frac{[\eta]_{avg}}{K M_v^{\alpha}}$$

$M_V$ is the viscosity-average molecular weight based on molecular weights determined by LS analysis, while a and K are calculated in the published literature (T. Sun, P. Brant, R. R. Chance, and W. W. Graessley, Macromolecules, Volume 34, Number 19, pp. 6812-6820, (2001)), except that for purposes of this invention and claims thereto, α=0.695+TRUNC(10*C3 wt)/1000 and K=0.000579*(1−0.48601*C3 wt−0.068989*C3 wt^2)*(200000)^(−TRUNC(10*C3 wt)/1000) for the ethylene-propylene copolymers. C3 wt is propylene content of the copolymer in weight percent, concentrations are expressed in g/cm$^3$, molecular weight is expressed in g/mole, and intrinsic viscosity (hence K in the Mark-Houwink equation) is expressed in dL/g unless otherwise noted.

Differential Scanning Calorimetry (DSC)

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (J/g)/B (J/g)]*100, where B is the heat of fusion for the 100% crystalline homopolymer of the major monomer component. These values for B are to be obtained from the *Polymer Handbook*, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

Carbon NMR

The comonomer content and sequence distribution of the polymers can be measured using $^{13}C$ nuclear magnetic resonance (NMR) by methods well known to those skilled in the art. Unless otherwise indicated the polymer samples for $^{13}C$ NMR spectroscopy were dissolved in 1,1,2,2-tetrachloroethane-d2 at 140° C. with a concentration of 67 mg/mL and the samples were recorded at 120° C. using a Bruker NMR spectrometer with a $^{13}C$ NMR frequency of 125 MHz or greater with a 10 mm cryoprobe using a 900 pulse and gated decoupling with at least 512 scans. Chemical shift of solvent-1,1,2,2-tetrachloroethane-d2 was referenced to 74.24 ppm so that main isotactic peak of the methyl would be at 21.83 ppm. Calculations involved in the characterization of polymers by NMR follow the work of Bovey, F. A. (1969) in Polymer Conformation and Configuration, Academic Press, New York and Randall, J. (1977) in Polymer Sequence Determination, Carbon-13 NMR Method, Academic Press, New York.

| Region Intensity | Chemical Shift Range (ppm) | Assignments | Contributing Sequences |
|---|---|---|---|
| A | 45-48.0 | αα ($CH_2$) | [PPP] + 0.5*[PPE] |
| B | 36-39.5 | αY, αδ$^+$ | [EPE] + 0.5*[PPE] + [PEP] + 0.5*[EEP] |
| C | 32.9-33.4 | CH (EPE) | [EPE] |
| D | 30.4-31.5 | CH (EPP), YY | [EPP] + [PEEP] |
| E | 30.2-30.4 | Yδ$^+$ | [PEEE] |
| F | 29.8-30 | δ$^+$δ$^+$ | [EEE]n |
| G | 27.9-29.0 | CH (PPP) | [PPP] |
| H | 24.2-24.9 | ββ | [PEP] |
| I1 | 21.2-22.30 | $CH_3$ (PPP) | [PPP] |
| I2 | 20.51-21.19 | $CH_3$ (PPE) | [PPP] + [PPE] |
| I3 | 19.77-20.19 | $CH_3$ (EPE) | [PPP] + [EPE] |

The system of equations is solved using the linest function in excel with outputs being the triad area, assuming the constant is 0. Y is defined as the area of the chemical shift regions and X being the triad contribution for each region. This can then be converted to mole fraction of triads by taking the individual area divided by the total, eg. PPP (area) from linest/(PPP+PPE+EPE+PEP+EEP+EEE).

% rr (PP+EP) is calculated as follows using the $CH_3$ region of the propylene:

| Assignment | Chemical Shift (ppm) | Calculations |
|---|---|---|
| % mm (PP + EP) | 21.2-22.3 | mm*100/total |
| % mr (PP + EP) | 20.4-21.2 | mr*100/total |
| % rr (PP + EP) | 19.6-20.4 | rr*100/total |
| Total | mm + mr + rr | |

Chemical shift assignments for the ethylene-propylene copolymers are described by Randall in "A Review Of High Resolution Liquid Carbon Nuclear Magnetic Resonance Characterization of Ethylene-Based Polymers", Polymer Reviews, 29:2, 201-5 317 (1989). The copolymer content, mole and weight %, triad sequencing, and diad calculations are also calculated and described in the method established by Randall in this paper.

Calculations for $r_1r_2$ were based on the equation $r_1r_2$=4*[EE]*[PP]/[EP]$^2$; where [EE], [EP], [PP] are the diad molar concentrations; E is ethylene, P is propylene. Calculations for P run length (also call propylene run # and P run #) were based on the equation P run #=([EPE]+0.5*[EPP])*100; where [EPE], [EPP] are the triad molar concentrations; E is ethylene, P is propylene.

Unless stated otherwise, ethylene content of ethylene-propylene copolymers was determined using FTIR according ASTM D3900. The composition of other polymers may be obtained using $^{13}C$ NMR by methods well known to those in the art. For the claim herein, ethylene content from FTIR is used.

Small Amplitude Oscillatory Shear (SAOS): Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin (polymer composition) onto the parallel plates. To determine the samples' viscoelastic behavior, frequency sweeps in the range from 0.01 to 385 rad/s were carried out at a temperature of 190° C. under constant strain of 10%. A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting stress will also oscillate sinusoidally at the same frequency but will be shifted by a phase angle δ with respect to the strain wave. For purely elastic materials δ=0 degree (stress is in phase with strain) and for purely viscous materials, δ=90 degree. For viscoelastic materials, 0<δ<90. Complex viscosity, loss modulus (G") and storage modulus (G') as function of frequency are provided by the small amplitude oscillatory shear test. Dynamic viscosity is also referred to as complex viscosity or dynamic shear viscosity. The phase or the loss angle δ, is the inverse tangent of the ratio of G" (shear loss modulus) to G' (shear storage modulus).

The melt flow rate (MFR) is measured in accordance with ASTM D1238-13 at 230° C. and 2.16 kg load. The high load melt flow rate (MFR HL) is measured in accordance with ASTM D1238 at 230° C. and 21.6 kg load.

Additional Embodiments

The following further embodiments are contemplated as within the scope of the present disclosure.

Embodiment A: A syndiotactic ethylene-propylene copolymer comprising: a) 5 to 15% by weight of ethylene and 85 to 95% by weight of propylene; b) 60 to 90% rr triads; c) Mw (LS) of 10 to 250 kg/mol; and d) no substantial melting peak, wherein the heat of fusion of the peak is 5 J/g or less as determined by differential scanning calorimetry at a scan rate of 10° C./min (ASTM D3418-03).

Embodiment B: The syndiotactic ethylene-propylene copolymer according to Embodiment A, having 5 to 10 wt. % ethylene.

Embodiment C: The syndiotactic ethylene-propylene copolymer according to Embodiment A or B, having 75 to 85% rr triads.

Embodiment D: The syndiotactic ethylene-propylene copolymer to according to any one of Embodiments A to C that does not exhibit a melting point in the second heating cycle as measured by differential scanning calorimetry at a scan rate of 10° C./min.

Embodiment E: The syndiotactic ethylene-propylene copolymer according to any one of Embodiments A to D, having a MFR of 0.1 to 650 g/10 min. measured at 2.16 kg and 230° C.

Embodiment F: The syndiotactic ethylene-propylene copolymer according to any one of Embodiments A to E, having a glass transition temperature of 0° C. or less.

Embodiment G: The syndiotactic ethylene-propylene copolymer according to any one of Embodiments A to F, having a weight-averaged molecular weight from light scattering ($M_{W,LS}$) of 10 to 120 kg/mol.

Embodiment H: The syndiotactic ethylene-propylene copolymer according to any one of Embodiments A to G, having a molecular weight distribution (Mw,DRI/Mn,DRI) of 1.2 to 2.5.

Embodiment I: The syndiotactic ethylene-propylene copolymer according to any one of Embodiments A to H, having a [EPP] from $^{13}$C NMR and C2 wt % from FTIR relationship of: 1.9833*C2 wt %−0.0818<[EPP]<1.3333*C2 wt %+0.09.

Embodiment J: The syndiotactic ethylene-propylene copolymer according to any one of Embodiments A to I, having a [EEP] from $^{13}$C NMR and C2 wt % from FTIR relationship of: 0.2931*C2 wt %−0.0187<[EEP]<0.303*C2 wt %−0.0045.

Embodiment K: The syndiotactic ethylene-propylene copolymer according to any one of Embodiments A to J having a [PPP] from $^{13}$C NMR and C2 wt % from FTIR relationship of: −2.8*C2 wt %+0.878<[PPP]<−2.8154*C2 wt %+1.0451.

Embodiment L: The syndiotactic ethylene-propylene copolymer according to any one of Embodiments A to K, having a [PEP] from $^{13}$C NMR and C2 wt % from FTIR relationship of: 0.8923*C2 wt %−0.0021<[PEP]<0.9333*C2 wt %+0.03.

Embodiment M: The syndiotactic ethylene-propylene copolymer according to any one of Embodiments A to L, having an [EEE] from $^{13}$C NMR less than 0.008.

Embodiment N: The syndiotactic ethylene-propylene copolymer according to any one of Embodiments A to M, having a [EE] from $^{13}$C NMR and C2 wt % from FTIR relationship of: 0.2*C2 wt %−0.016<[EE]<0.1292*C2 wt %+0.0082.

Embodiment O: The syndiotactic ethylene-propylene copolymer according to any one of Embodiments A to N, having a propylene run # from $^{13}$C NMR and C2 wt % from FTIR relationship of: 110.67*C2 wt %−4.7<[P run #]<97.143*C2 wt %+4.7286.

Embodiment P: The syndiotactic ethylene-propylene copolymer according to any one of Embodiments A to O, having a $r_1r_2$ from $^{13}$C NMR less than 8.0.

Embodiment Q: The syndiotactic ethylene-propylene copolymer according to any one of Embodiments A to P, having a Tg from DSC and C2 wt % from FTIR relationship of: −190*C2 wt %−9.15<Tg<−175*C2 wt %+1.725.

Embodiment R: The syndiotactic ethylene-propylene copolymer according to any one of Embodiments A to Q, having a $g'_{vis}$ and MW,LS from GPC relationship of: $g'_{vis}$>2E-06*MW,LS+0.9703.

Embodiment 5: The syndiotactic ethylene-propylene copolymer according to any one of Embodiments A to R, exhibiting pellet stability after aging at 40° C. and 1 psig for 3 months.

Embodiment T: A process to produce syndiotactic propylene copolymers comprising contacting in a homogeneous phase propylene and ethylene with a catalyst system comprising activator and catalyst compound; and obtaining a syndiotactic propylene copolymers comprising (a) from 85 to 95 weight % of propylene, based upon the weight of the polymer; (b) 60 to 90% rr triads; (c) Mw (LS) of 10 to 250 kg/mol; and (d) no substantial melting peak, wherein the heat of fusion of the peak is 5 J/g or less as determined by differential scanning calorimetry at a scan rate of 10° C./min (ASTM D3418-03).

Embodiment U: The process of Embodiment T wherein the process occurs at a temperature of from about 50° C. to about 110° C., at a pressure in the range of from about 1 MPa to about 14 MPa.

Embodiment V: The process of Embodiment T wherein the process occurs at a temperature of from about 50° C. to about 110° C., at a pressure in the range of from about 3 MPa to about 14 MPa.

Embodiment W: The process of any one of Embodiments T to V wherein the process occurs at a polymerization temperature of TP1 or higher, wherein TP1=0.9*EXP(−0.005*rr), where the unit of TP1 is ° C., and rr is triad tacticity index measured using $^{13}$C NMR.

Embodiment X: The process of any one of Embodiments T to W wherein the polymerization is conducted in a solution process at a pressure of 9 MPa or higher and at a temperature from about 50° C. to about 120° C., and with catalyst efficiency of 50,000 kg of polymer per kg of catalyst or more.

Embodiment Y: The process of any one of Embodiments T to X wherein the polymerization is conducted in a solution process at a pressure of 9 MPa or higher and with a molar ratio of ethylene feed to propylene feed from about 0.01 to about 0.2 and with catalyst efficiency of 50,000 kg of polymer per kg of catalyst or more.

Embodiment Z: The process of any one of Embodiments T to Y wherein the catalyst system comprises a catalyst compound represented by formula (1a):

(1a)

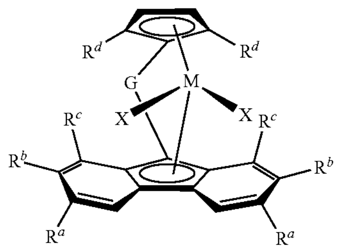

wherein:

M is zirconium or hafnium;

G is a bridging group;

each X is, independently, a hydride radical, hydrocarbyl, substituted hydrocarbyl, halocarbyl, substituted halocarbyl, silylcarbyl or germylcarbyl; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a dianionic chelating ligand;

each $R^a$ and $R^b$ is, independently, selected from hydrogen, halogen, hydrocarbyl, substituted hydrocarbyl, halocarbyl, substituted halocarbyl, silylcarbyl, germylcarbyl or polar radicals, and optionally two or more adjacent substituents may join to form a substituted or unsubstituted, saturated, partially unsaturated or aromatic, cyclic or polycyclic substituent, with the proviso that each $R^a$ is the same and each $R^b$ is the same allowing the compound to be $C_s$-symmetric or pseudo $C_s$-symmetric;

each $R^c$ is, independently, a symmetric or pseudo symmetric substituent with respect to the other and is selected from hydrogen or a hydrocarbyl, substituted hydrocarbyl, halocarbyl, substituted halocarbyl, silylcarbyl or germylcarbyl radicals;

each $R^d$ is a symmetric or pseudo symmetric substituent with respect to the other and is, independently, selected from hydrogen or a hydrocarbyl, substituted hydrocarbyl, halocarbyl, substituted halocarbyl, silylcarbyl or germylcarbyl radicals.

Embodiment AA: The process of any one of Embodiments T to Z wherein M is zirconium, X is methyl or chloro, G is di(para-triethylsilylphenyl)methylene or diphenylmethylene, and each $R^d$, $R^a$ and $R^c$ are hydrogen, and each $R^b$ is a methyl, ethyl, propyl, or butyl.

Embodiment BB: The process of any one of Embodiments T to AA wherein X is methyl, G is di(para-triethylsilylphenyl)methylene, and each $R^d$, $R^a$ and R' are hydrogen, and each $R^b$ is tert-butyl.

Embodiment CC: The process of any one of Embodiments T to BB wherein the activator is selected from one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, tri(n-butyl)ammonium tetrakis(perfluoronaphthyl)borate, N-methyl-4-nonadecyl-N-octadecylanilinium [tetrakis(perfluorophenyl)borate], di(hydrogenated tallow)methylamonium tetrakis(perfluorophenyl)borate, di(hydrogenated tallow)methylamonium tetrakis(perfluoronaphthyl)borate, dioctadecylmethylammonium tetrakis(perfluorophenyl)borate, and dioctadecylmethylammonium tetrakis(perfluoronaphthyl)borate.

Examples

The syndiotactic ethylene-propylene copolymers were made in continuous solution polymerization processes. The polymerization for Examples G1 to G20 listed in Table 1 were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. Ethylene and $H_2$ flowed as a gas under their own pressure through a Brooks flow controller. Ethylene, propylene and $H_2$ feeds were combined into one stream and then mixed with a pre-chilled isohexane stream that had been cooled to at least 0° C. The mixture was then fed to the reactor through a single line. Scavenger solution (an isohexane solution of tri-n-octylaluminum (TNOA) (25 wt % in hexane, Sigma Aldrich) was also added to the combined solvent and monomer stream just before it entered the reactor to further reduce any catalyst poisons. Catalyst solution was fed to the reactor using an ISCO syringe pump through a separated line. Isohexane (used as solvent), and monomers (e.g., ethylene and propylene) were purified over beds of alumina and molecular sieves. Toluene for preparing catalyst solutions was purified by the same technique. The reactor pressure for all examples was about 350 psig.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

Catalysts was premixed with the activator at a molar ratio of about 1:1 in toluene. For all of Examples G1 to G20, diphenylmethylene(2,7-di-tert-butylfluorenyl)(cyclopentadienyl)zirconium dimethyl (Catalyst #1) was used. This catalyst was preactivated with N,N-dimethylanilinium tetrakis(pentafluorophenyl) borate (activator A). The detailed process conditions and some characterization data are listed in Table 1. The catalyst and TONA feed rates can be adjusted to achieve the targeted conversion. The Chemical structure of Catalyst #1 and Catalyst #2 are illustrated below:

Catalyst #1

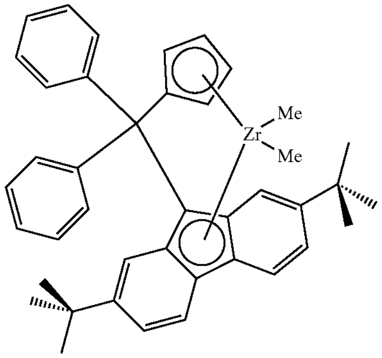

Catalyst #2

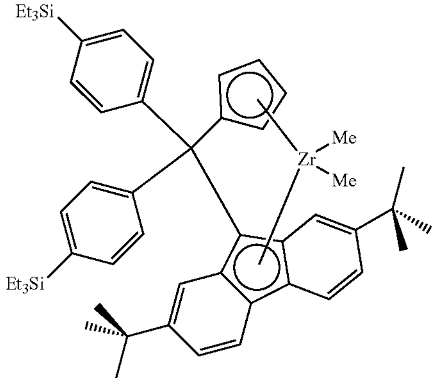

TABLE 1

| Polymerization Summary using a 1-liter Autoclave reactor | | | | | |
|---|---|---|---|---|---|
| Example # | G1 | G2 | G3 | G4 | G5 |
| Polymerization temperature (° C.) | 60 | 70 | 70 | 70 | 70 |
| Ethylene feed rate (g/min) | 0.68 | 0.23 | 0.68 | 0.79 | 0.90 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #1 feed rate (mol/min) | 1.034E−07 | 1.034E−07 | 1.379E−07 | 1.379E−07 | 1.379E−07 |
| TNOA feed rate (mol/min) | 7.385E−06 | 7.385E−06 | 7.385E−06 | 7.385E−06 | 7.385E−06 |
| Yield (g/min) | 8.6 | 9.5 | 11.8 | 12.9 | 13.4 |
| Conversion (%) | 31.2% | 34.2% | 42.7% | 46.5% | 47.9% |
| Catalyst efficiency (kg polymer/kg catalyst) | 161,671 | 177,655 | 166,318 | 181,572 | 187,793 |
| Complex viscosity at 0.1 rad/sec and 190° C. (Pa · s) | — | 6,065 | 5,597 | 6,104 | 5,396 |
| Complex viscosity at 100 rad/sec and 190° C. (Pa · s) | — | 1,613 | 1,521 | 1,614 | 1,516 |
| MFR (g/10 min) | 1.89 | 4.82 | 6.15 | 6.05 | 6.06 |
| MFR HL (g/10 min) | — | — | 155.44 | — | — |
| Mn_DRI (g/mol) | 121,854 | 106,938 | 75,687 | 100,509 | 94,164 |
| Mw_DRI (g/mol) | 266,769 | 202,085 | 177,696 | 181,736 | 177,443 |
| Mz_DRI (g/mol) | 454,270 | 318,739 | 287,869 | 287,721 | 287,478 |
| MWD (—) | 2.19 | 1.89 | 2.35 | 1.81 | 1.88 |
| Mn_LS (g/mol) | 108,211 | 96,456 | 74,419 | 89,008 | 85,672 |
| Mw_LS (g/mol) | 190,620 | 156,993 | 141,768 | 148,825 | 144,211 |
| Mz_LS (g/mol) | 275,176 | 236,101 | 215,271 | 222,309 | 216,111 |
| $g'_{vis}$ (—) | 1.38 | 1.37 | 1.37 | 1.37 | 1.36 |
| Tg (° C.) | −11.1 | −12.9 | −15.9 | −12.6 | −14.9 |
| Ethylene content (wt %) | 5.1% | 6.1% | 6.7% | 6.4% | 6.9% |

TABLE 1-continued

Polymerization Summary using a 1-liter Autoclave reactor

| Diad and triad sequence distributions ($^{13}C$ NMR) | | | | | |
|---|---|---|---|---|---|
| EEE | 0.001 | 0.001 | 0.002 | 0.004 | 0.000 |
| EEP | 0.007 | 0.007 | 0.008 | 0.007 | 0.006 |
| PEP | 0.074 | 0.069 | 0.063 | 0.070 | 0.075 |
| EPE | 0.011 | 0.010 | 0.006 | 0.010 | 0.009 |
| EPP | 0.136 | 0.132 | 0.120 | 0.129 | 0.141 |
| PPP | 0.771 | 0.781 | 0.802 | 0.780 | 0.768 |
| EE | 0.004 | 0.004 | 0.005 | 0.007 | 0.004 |
| EP + PE | 0.156 | 0.148 | 0.133 | 0.148 | 0.158 |
| PP | 0.839 | 0.847 | 0.862 | 0.844 | 0.838 |
| Tacticity diad and triads | | | | | |
| mm(PP + EP) | 2.95% | 2.31% | 3.65% | 4.07% | 3.27% |
| rr (PP + EP) | 85.20% | 83.68% | 80.33% | 79.40% | 80.83% |
| r (PP + EP) | 91.13% | 90.69% | 88.34% | 87.66% | 88.78% |
| Propylene run # | 7.9 | 7.6 | 6.6 | 7.5 | 8.0 |
| Regio defect (mol %) | 0.463 | 0.393 | 0.592 | 0.635 | 0.359 |
| $r_1r_2$ (—) | 0.58 | 0.65 | 1.06 | 1.14 | 0.50 |

| Example # | G6 | G7 | G8 | G9 | G10 |
|---|---|---|---|---|---|
| Polymerization temperature (° C.) | 70 | 70 | 70 | 70 | 70 |
| Ethylene feed rate (g/min) | 1.02 | 0.68 | 0.79 | 0.90 | 1.02 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #1 feed rate (mol/min) | 1.206E−07 | 1.034E−07 | 1.034E−07 | 1.034E−07 | 9.047E−08 |
| TNOA feed rate (mol/min) | 7.385E−06 | 7.385E−06 | 7.385E−06 | 7.385E−06 | 7.385E−06 |
| Yield (g/min) | 13.0 | 6.3 | 8.4 | 10.2 | 9.6 |
| Conversion (%) | 46.3% | 22.8% | 30.2% | 36.6% | 34.3% |
| Catalyst efficiency (kg polymer/kg catalyst) | 208,703 | 118,171 | 157,311 | 191,624 | 205,885 |
| Complex viscosity at 0.1 rad/sec and 190° C. (Pa · s) | 5,115 | 3,805 | 4,842 | 4,763 | 3,943 |
| Complex viscosity at 100 rad/sec and 190° C. (Pa · s) | 1,455 | 1,371 | 1,513 | 1,469 | 1,303 |
| MFR (g/10 min) | 5.05 | 5.66 | 5.46 | 6.72 | 6.87 |
| Mn_DRI (g/mol) | 85,916 | 86,970 | 83,406 | 83,713 | 79,289 |
| Mw_DRI (g/mol) | 178,433 | 167,039 | 172,555 | 164,247 | 161,722 |
| Mz_DRI (g/mol) | 292,180 | 273,318 | 317,225 | 270,301 | 269,648 |
| MWD (—) | 2.08 | 1.92 | 2.07 | 1.96 | 2.04 |
| Mn_LS (g/mol) | 80,850 | 82,120 | 76,915 | 76,171 | 72,645 |
| Mw_LS (g/mol) | 143,725 | 137,058 | 137,060 | 137,521 | 130,952 |
| Mz_LS (g/mol) | 214,665 | 201,750 | 200,852 | 203,868 | 194,027 |
| $g'_{vis}$ (—) | 1.35 | 1.36 | 1.36 | 1.36 | 1.34 |
| Tg (° C.) | −12.7 | −15.2 | −13.9 | −15.6 | −17.3 |
| Ethylene content (wt %) | 6.6% | 7.8% | 8.0% | 8.5% | 8.5% |
| Diad and triad sequence distributions ($^{13}C$ NMR) | | | | | |
| EEE | 0.004 | 0.002 | 0.002 | 0.001 | 0.003 |
| EEP | 0.014 | 0.013 | 0.014 | 0.013 | 0.016 |
| PEP | 0.086 | 0.099 | 0.094 | 0.090 | 0.105 |
| EPE | 0.016 | 0.019 | 0.016 | 0.017 | 0.022 |
| EPP | 0.154 | 0.175 | 0.167 | 0.164 | 0.182 |
| PPP | 0.726 | 0.693 | 0.708 | 0.715 | 0.672 |
| EE | 0.011 | 0.009 | 0.009 | 0.008 | 0.011 |
| EP + PE | 0.186 | 0.211 | 0.200 | 0.195 | 0.226 |
| PP | 0.803 | 0.780 | 0.791 | 0.797 | 0.763 |
| Tacticity diad and triads | | | | | |
| mm(PP + EP) | 3.96% | 3.64% | 2.84% | 2.46% | 3.12% |
| rr (PP + EP) | 80.40% | 81.33% | 82.96% | 83.16% | 81.92% |
| r (PP + EP) | 88.22% | 88.85% | 90.06% | 90.35% | 89.40% |
| Propylene run # | 9.3 | 10.6 | 10.0 | 9.9 | 11.3 |
| Regio defect (mol %) | 0.625 | 0.376 | 0.417 | 0.453 | 0.422 |
| $r_1r_2$ (—) | 1.03 | 0.60 | 0.68 | 0.65 | 0.64 |

| Example # | G11 | G12 | G13 | G14 | G15 |
|---|---|---|---|---|---|
| Polymerization temperature (° C.) | 70 | 70 | 70 | 70 | 77 |

TABLE 1-continued

| Polymerization Summary using a 1-liter Autoclave reactor | | | | | |
|---|---|---|---|---|---|
| Ethylene feed rate (g/min) | 0.90 | 1.02 | 1.13 | 1.24 | 0.79 |
| Propylene feed rate (g/min) | 27 | 27 | 27 | 27 | 27 |
| Isohexane feed rate (g/min) | 56.7 | 56.7 | 56.1 | 56.7 | 56.7 |
| Catalyst #1 feed rate (mol/min) | 9.047E−08 | 9.047E−08 | 9.047E−08 | 9.047E−08 | 1.379E−07 |
| TNOA feed rate (mol/min) | 7.385E−06 | 7.385E−06 | 7.385E−06 | 7.385E−06 | 7.385E−06 |
| Yield (g/min) | 7.2 | 9.7 | 11.0 | 11.8 | 11.7 |
| Conversion (%) | 25.9% | 34.5% | 39.2% | 41.7% | 42.0% |
| Catalyst efficiency (kg polymer/kg catalyst) | 155,043 | 207,064 | 236,476 | 252,280 | 163,975 |
| Complex viscosity at 0.1 rad/sec and 190° C. (Pa · s) | 3,833 | 4,251 | 4,250 | 4,093 | 2,935 |
| Complex viscosity at 100 rad/sec and 190° C. (Pa · s) | 1,318 | 1,402 | 1,397 | 1,282 | 1,084 |
| MFR (g/10 min) | 7.35 | 6.58 | 6.32 | 7.54 | 8.55 |
| MFR HL (g/10 min) | — | — | — | — | 191.72 |
| Mn_DRI (g/mol) | 78,869 | 85,692 | 84,084 | 81,603 | 73,161 |
| Mw_DRI (g/mol) | 159,636 | 166,198 | 163,498 | 161,560 | 164,273 |
| Mz_DRI (g/mol) | 272,308 | 272,619 | 271,096 | 263,341 | 278,705 |
| MWD (—) | 2.02 | 1.94 | 1.94 | 1.98 | 2.25 |
| Mn_LS (g/mol) | 74,475 | 79,474 | 78,505 | 75,639 | 72,188 |
| Mw_LS (g/mol) | 131,157 | 138,330 | 132,822 | 134,315 | 131,868 |
| Mz_LS (g/mol) | 192,082 | 204,036 | 193,564 | 203,430 | 196,305 |
| $g'_{vis}$ (—) | 1.33 | 1.34 | 1.35 | 1.34 | 1.31 |
| Tg (° C.) | −16.6 | −15.0 | −15.5 | −15.8 | −17.8 |
| Ethylene content (wt %) | 9.4% | 8.0% | 8.4% | 9.0% | 7.9% |
| Diad and triad sequence distributions ($^{13}C$ NMR) | | | | | |
| EEE | 0.003 | 0.004 | 0.003 | 0.002 | 0.003 |
| EEP | 0.021 | 0.016 | 0.014 | 0.017 | 0.011 |
| PEP | 0.115 | 0.106 | 0.105 | 0.107 | 0.078 |
| EPE | 0.027 | 0.022 | 0.021 | 0.024 | 0.010 |
| EPP | 0.195 | 0.181 | 0.183 | 0.188 | 0.144 |
| PPP | 0.640 | 0.671 | 0.674 | 0.663 | 0.754 |
| EE | 0.013 | 0.012 | 0.010 | 0.010 | 0.008 |
| EP + PE | 0.249 | 0.226 | 0.225 | 0.233 | 0.166 |
| PP | 0.738 | 0.762 | 0.766 | 0.757 | 0.826 |
| Tacticity diad and triads | | | | | |
| mm(PP + EP) | 2.50% | 3.58% | 3.46% | 2.64% | 3.80% |
| rr (PP + EP) | 83.91% | 81.51% | 81.41% | 82.82% | 80.13% |
| r (PP + EP) | 90.71% | 88.96% | 88.97% | 90.09% | 88.17% |
| Propylene run # | 12.4 | 11.2 | 11.3 | 11.7 | 8.2 |
| Regio defect (mol %) | 0.446 | 0.463 | 0.313 | 0.355 | 0.511 |
| $r_1r_2$ (—) | 0.62 | 0.72 | 0.59 | 0.55 | 0.96 |

| Example # | G16 | G17 | G18 | G19 | G20 |
|---|---|---|---|---|---|
| Polymerization temperature (° C.) | 74 | 70 | 70 | 65 | 70 |
| Ethylene feed rate (g/min) | 1.02 | 0.79 | 1.02 | 0.68 | 0.79 |
| Propylene feed rate (g/min) | 27 | 27 | 27 | 27 | 27 |
| Isohexane feed rate (g/min) | 56.7 | 56.7 | 56.7 | 59.4 | 60 |
| H2 feed rate (cc/min) | — | — | — | — | 2.41 |
| Catalyst #1 feed rate (mol/min) | 1.206E−07 | 1.206E−07 | 1.034E−07 | 1.206E−07 | 4.308E−08 |
| TNOA feed rate (mol/min) | 7.385E−06 | 7.385E−06 | 7.385E−06 | 7.407E−06 | 8.230E−06 |
| Yield (g/min) | 12.5 | 11.2 | 11.2 | 10.6 | 12.6 |
| Conversion (%) | 44.8% | 40.2% | 40.0% | 38.4% | 45.4% |
| Catalyst efficiency (kg polymer/kg catalyst) | 201,677 | 179,794 | 210,288 | 170,838 | 567,246 |
| Complex viscosity at 0.1 rad/sec and 190° C. (Pa · s) | 3,082 | 3,949 | 3,119 | — | — |
| Complex viscosity at 100 rad/sec and 190° C. (Pa · s) | 1,114 | 1,164 | 1,082 | — | — |
| MFR (g/10 min) | 6.94 | 5.83 | 5.84 | 3.38 | 7.89 |
| MFR HL (g/10 min) | 176.67 | 134.87 | 151.66 | 62.52 | 201.39 |
| Mn_DRI (g/mol) | 81,772 | 97,189 | 94,757 | 112,221 | 76,688 |
| Mw_DRI (g/mol) | 156,347 | 184,545 | 174,860 | 206,879 | 148,219 |
| Mz_DRI (g/mol) | 248,168 | 294,914 | 274,584 | 326,608 | 230,870 |

TABLE 1-continued

| Polymerization Summary using a 1-liter Autoclave reactor | | | | | |
|---|---|---|---|---|---|
| MWD (—) | 1.91 | 1.90 | 1.85 | 1.84 | 1.93 |
| Mn_LS (g/mol) | 75,117 | 90,218 | 85,109 | 105,051 | 68,297 |
| Mw_LS (g/mol) | 131,728 | 155,095 | 146,239 | 179,130 | 124,910 |
| Mz_LS (g/mol) | 197,958 | 232,005 | 217,764 | 268,304 | 195,933 |
| $g'_{vis}$ (—) | 1.29 | 1.33 | 1.31 | 1.38 | 1.37 |
| Tg (° C.) | −18.8 | −16.3 | −21.4 | −16.7 | −17.3 |
| Ethylene content (wt %) | 9.6% | 7.9% | 9.4% | 6.5% | 5.7% |
| Diad and triad sequence distributions ($^{13}$C NMR) | | | | | |
| EEE | 0.003 | 0.002 | 0.004 | 0.002 | 0.004 |
| EEP | 0.015 | 0.009 | 0.013 | 0.008 | 0.011 |
| PEP | 0.091 | 0.077 | 0.096 | 0.072 | 0.073 |
| EPE | 0.013 | 0.009 | 0.018 | 0.010 | 0.009 |
| EPP | 0.161 | 0.145 | 0.170 | 0.132 | 0.136 |
| PPP | 0.718 | 0.757 | 0.699 | 0.776 | 0.766 |
| EE | 0.011 | 0.007 | 0.010 | 0.006 | 0.010 |
| EP + PE | 0.191 | 0.164 | 0.206 | 0.152 | 0.156 |
| PP | 0.798 | 0.830 | 0.784 | 0.842 | 0.834 |
| Tacticity diad and triads | | | | | |
| mm(PP + EP) | 3.63% | 3.31% | 3.79% | 3.06% | 4.11% |
| rr (PP + EP) | 79.80% | 81.39% | 80.47% | 84.26% | 78.53% |
| r (PP + EP) | 88.08% | 89.04% | 88.34% | 90.60% | 87.21% |
| Propylene run # | 9.3 | 8.2 | 10.3 | 7.6 | 7.8 |
| Regio defect (mol %) | 0.590 | 0.555 | 0.569 | 0.528 | 0.696 |
| $r_1r_2$ (—) | 0.92 | 0.83 | 0.75 | 0.86 | 1.31 |

Example G21 to G44 were made by following the same procedure used for producing Examples of G1 to G20 except that the catalyst used was di(para-triethylsilylphenyl)methylene(2,7-di-tert-butylfluorenyl)(cyclopentadienyl)zirconium dimethyl (Catalyst #2). This catalyst was preactivated with N,N-dimethylanilinium tetrakis(pentafluorophenyl) borate (activator A). The detailed process conditions and some characterization data are listed in Table 2. The catalyst and TONA feed rates can be adjusted to achieve the targeted conversion.

TABLE 2

| Example # | G21 | G22 | G23 | G24 |
|---|---|---|---|---|
| Polymerization temperature (° C.) | 80 | 80 | 80 | 80 |
| Ethylene feed rate (g/min) | 0.23 | 0.45 | 0.68 | 0.90 |
| Propylene feed rate (g/min) | 27 | 27 | 27 | 27 |
| Isohexane feed rate (g/min) | 56.7 | 56.7 | 56.7 | 56.7 |
| Catalyst #2 feed rate (mol/min) | 2.335E−07 | 2.335E−07 | 2.024E−07 | 2.024E−07 |
| TNOA feed rate (mol/min) | 3.703E−06 | 3.703E−06 | 3.703E−06 | 3.703E−06 |
| Yield (g/min) | 8.3 | 11.3 | 14.6 | 13.4 |
| Conversion (%) | 30.3% | 41.1% | 52.8% | 48.2% |
| Catalyst efficiency (kg polymer/kg catalyst) | 41,314 | 56,427 | 84,292 | 77,514 |
| MFR (g/10 min) | 32.88 | 37.64 | 34.80 | 34.08 |
| Mn_DRI (g/mol) | 63,482 | 64,668 | 63,618 | 63,536 |
| Mw_DRI (g/mol) | 118,710 | 118,662 | 116,845 | 116,181 |
| Mz_DRI (g/mol) | 189,869 | 185,502 | 187,072 | 186,605 |
| MWD (—) | 1.87 | 1.83 | 1.84 | 1.83 |
| Mn_LS (g/mol) | 53,405 | 58,104 | 58,403 | 57,304 |
| Mw_LS (g/mol) | 94,810 | 96,090 | 93,373 | 92,675 |
| Mz_LS (g/mol) | 136,117 | 141,135 | 131,995 | 131,837 |
| $g'_{vis}$ (—) | 1.29 | 1.28 | 1.26 | 1.26 |
| Tg (° C.) | −11.7 | −16.3 | −16.3 | −18.5 |
| Ethylene content (wt %) | 5.7% | 6.0% | 6.9% | 6.9% |
| Diad and triad sequence distributions ($^{13}$C NMR) | | | | |
| EEE | 0.003 | 0.003 | 0.004 | 0.003 |
| EEP | 0.006 | 0.005 | 0.008 | 0.010 |
| PEP | 0.027 | 0.047 | 0.065 | 0.077 |
| EPE | −0.001 | 0.005 | 0.010 | 0.016 |
| EPP | 0.066 | 0.093 | 0.119 | 0.141 |
| PPP | 0.899 | 0.848 | 0.794 | 0.754 |
| EE | 0.006 | 0.005 | 0.008 | 0.008 |
| EP + PE | 0.062 | 0.101 | 0.139 | 0.168 |
| PP | 0.932 | 0.894 | 0.853 | 0.824 |
| Tacticity diad and triads | | | | |
| mm(PP + EP) | 4.08% | 4.24% | 4.29% | 3.59% |
| rr (PP + EP) | 74.86% | 74.41% | 73.85% | 75.00% |

TABLE 2-continued

| | | | | | |
|---|---|---|---|---|---|
| r (PP + EP) | 85.39% | 85.08% | 84.78% | 85.70% | |
| Propylene run # | 3.2 | 5.2 | 7.0 | 8.6 | |
| Regio defect (mol %) | 1.501 | 1.442 | 1.642 | 1.511 | |
| $r_1r_2$ (—) | 5.35 | 1.81 | 1.37 | 0.95 | |

| Example # | G25 | G26 | G27 | G28 | G29 |
|---|---|---|---|---|---|
| Polymerization temperature (° C.) | 80 | 80 | 70 | 70 | 70 |
| Ethylene feed rate (g/min) | 1.13 | 1.36 | 0.90 | 1.13 | 1.36 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #2 feed rate (mol/min) | 1.712E−07 | 1.712E−07 | 2.024E−07 | 1.712E−07 | 1.712E−07 |
| TNOA feed rate (mol/min) | 3.703E−06 | 3.703E−06 | 3.703E−06 | 3.703E−06 | 3.703E−06 |
| Yield (g/min) | 13.6 | 15.0 | 13.7 | 14.0 | 14.7 |
| Conversion (%) | 48.5% | 53.0% | 49.0% | 49.9% | 52.0% |
| Catalyst efficiency (kg polymer/kg catalyst) | 92,953 | 102,467 | 78,899 | 95,715 | 100,523 |
| MFR (g/10 min) | 29.67 | 37.45 | 10.52 | 60.52 | 33.83 |
| Mn_DRI (g/mol) | 61,413 | 62,487 | 79,996 | 37,039 | 64,826 |
| Mw_DRI (g/mol) | 112,487 | 112,629 | 149,223 | 83,128 | 125,118 |
| Mz_DRI (g/mol) | 174,899 | 176,885 | 237,705 | 152,136 | 197,996 |
| MWD (—) | 1.83 | 1.80 | 1.87 | 2.24 | 1.93 |
| Mn_LS (g/mol) | 57,770 | 56,133 | 70,992 | 27,377 | 57,520 |
| Mw_LS (g/mol) | 95,259 | 90,257 | 118,605 | 62,873 | 100,469 |
| Mz_LS (g/mol) | 141,349 | 129,614 | 173,643 | 108,030 | 152,190 |
| $g'_{vis}$ (—) | 1.27 | 1.24 | 1.33 | 1.31 | 1.30 |
| Tg (° C.) | −17.6 | −19.6 | −13.8 | −14.5 | −16.9 |
| Ethylene content (wt %) | 8.3% | 9.3% | 6.5% | 7.3% | 7.9% |
| Diad and triad sequence distributions ($^{13}$C NMR) | | | | | |
| EEE | 0.005 | 0.006 | 0.003 | 0.003 | 0.003 |
| EEP | 0.014 | 0.015 | 0.009 | 0.013 | 0.015 |
| PEP | 0.095 | 0.103 | 0.072 | 0.088 | 0.098 |
| EPE | 0.022 | 0.025 | 0.010 | 0.018 | 0.022 |
| EPP | 0.161 | 0.173 | 0.135 | 0.156 | 0.169 |
| PPP | 0.704 | 0.678 | 0.770 | 0.722 | 0.693 |
| EE | 0.012 | 0.013 | 0.008 | 0.009 | 0.011 |
| EP + PE | 0.204 | 0.222 | 0.155 | 0.191 | 0.212 |
| PP | 0.784 | 0.765 | 0.837 | 0.800 | 0.777 |
| Tacticity diad and triads | | | | | |
| mm(PP + EP) | 3.71% | 4.04% | 3.24% | 2.86% | 2.80% |
| rr (PP + EP) | 74.91% | 73.62% | 79.74% | 81.10% | 80.81% |
| r (PP + EP) | 85.60% | 84.79% | 88.25% | 89.12% | 89.00% |
| Propylene run # | 10.2% | 11.1 | 7.8 | 9.6 | 10.6 |
| Regio defect (mol %) | 1.626 | 1.647 | 1.002 | 0.903 | 0.925 |
| $r_1r_2$ (—) | 0.89 | 0.83 | 1.08 | 0.81 | 0.75 |

| Example # | G30 | G31 | G32 | G33 | G34 |
|---|---|---|---|---|---|
| Polymerization temperature (° C.) | 100 | 100 | 60 | 70 | 80 |
| Ethylene feed rate (g/min) | 0.23 | 0.45 | 1.36 | 1.36 | 1.36 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #2 feed rate (mol/min) | 2.569E−07 | 3.503E−07 | 1.168E−07 | 1.401E−07 | 1.635E−07 |
| TNOA feed rate (mol/min) | 3.703E−06 | 3.703E−06 | 3.703E−06 | 3.703E−06 | 3.703E−06 |
| Yield (g/min) | 9.3 | 6.9 | 13.0 | 14.3 | 15.1 |
| Conversion (%) | 34.2% | 25.3% | 45.9% | 50.6% | 53.3% |
| Catalyst efficiency (kg polymer/kg catalyst) | 42,277 | 23,114 | 130,199 | 119,504 | 107,846 |
| MFR (g/10 min) | 769.28 | >800 | 7.21 | 11.00 | 32.77 |
| Mn_DRI (g/mol) | 28,213 | 33,843 | 96,818 | 72,937 | 54,056 |
| Mw_DRI (g/mol) | 58,032 | 66,863 | 183,061 | 145,667 | 111,602 |
| Mz_DRI (g/mol) | 94,585 | 108,737 | 349,374 | 241,589 | 183,798 |
| MWD (—) | 2.06 | 1.98 | 1.89 | 2.00 | 2.06 |
| Mn_LS (g/mol) | 25,040 | 33,159 | 80,656 | 70,001 | 51,229 |
| Mw_LS (g/mol) | 46,077 | 53,680 | 123,401 | 114,706 | 89,759 |
| Mz_LS (g/mol) | 69,246 | 78,363 | 167,408 | 166,516 | 134,633 |
| $g'_{vis}$ (—) | 1.18 | 1.19 | 1.29 | 1.28 | 1.24 |
| Tg (° C.) | −11.4 | −17.2 | −16.9 | −15.2 | −15.5 |
| Ethylene content (wt %) | 6.8% | 8.7% | 9.5% | 8.4% | 9.1% |
| Diad and triad sequence distributions ($^{13}$C NMR) | | | | | |
| EEE | 0.002 | 0.002 | 0.004 | 0.004 | 0.003 |
| EEP | 0.003 | 0.010 | 0.014 | 0.015 | 0.014 |
| PEP | 0.027 | 0.066 | 0.105 | 0.104 | 0.097 |

TABLE 2-continued

| | | | | | |
|---|---|---|---|---|---|
| EPE | 0.002 | 0.010 | 0.026 | 0.024 | 0.021 |
| EPP | 0.067 | 0.132 | 0.160 | 0.160 | 0.169 |
| PPP | 0.899 | 0.779 | 0.692 | 0.693 | 0.695 |
| EE | 0.003 | 0.007 | 0.011 | 0.011 | 0.010 |
| EP + PE | 0.064 | 0.147 | 0.217 | 0.216 | 0.210 |
| PP | 0.932 | 0.845 | 0.772 | 0.773 | 0.780 |
| Tacticity diad and triads | | | | | |
| mm(PP + EP) | 6.00% | 6.06% | 3.28% | 3.32% | 3.42% |
| rr (PP + EP) | 63.19% | 64.25% | 80.08% | 79.87% | 76.04% |
| r (PP + EP) | 78.60% | 79.10% | 88.40% | 88.27% | 86.31% |
| Propylene run # | 3.5 | 7.6 | 10.5 | 10.5 | 10.6 |
| Regio defect (mol %) | 1.105 | 1.292 | 1.043 | 1.042 | 1.105 |
| $r_1r_2$ (—) | 3.06 | 1.14 | 0.71 | 0.73 | 0.74 |

| Example # | G35 | G36 | G37 | G38 | G39 |
|---|---|---|---|---|---|
| Polymerization temperature (° C.) | 90 | 100 | 80 | 80 | 80 |
| Ethylene feed rate (g/min) | 1.36 | 1.36 | 2.38 | 2.38 | 2.38 |
| Propylene feed rate (g/min) | 27 | 27 | 27 | 27 | 27 |
| H2 feed rate (cc/min) | 0 | 0 | 1.21 | 2.41 | 3.62 |
| Isohexane feed rate (g/min) | 56.7 | 56.7 | 56.7 | 56.7 | 56.7 |
| Catalyst #2 feed rate (mol/min) | 1.868E−07 | 2.802E−07 | 1.168E−07 | 1.168E−07 | 1.168E−07 |
| TNOA feed rate (mol/min) | 3.703E−06 | 3.703E−06 | 3.703E−06 | 3.703E−06 | 3.703E−06 |
| Yield (g/min) | 11.5 | 13.1 | 16.9 | 18.5 | 19.0 |
| Conversion (%) | 40.4% | 46.3% | 57.6% | 62.9% | 64.6% |
| Catalyst efficiency (kg polymer/kg catalyst) | 71,581 | 54,731 | 169,134 | 184,803 | 189,651 |
| MFR (g/10 min) | 82.69 | 305.62 | 41.58 | 37.39 | 46.36 |
| Mn_DRI (g/mol) | 38,118 | 30,824 | 54,589 | 53,105 | 51,843 |
| Mw_DRI (g/mol) | 83,153 | 62,581 | 101,843 | 101,635 | 98,972 |
| Mz_DRI (g/mol) | 134,340 | 102,023 | 162,541 | 163,295 | 159,184 |
| MWD (—) | 2.18 | 2.03 | 1.87 | 1.91 | 1.91 |
| Mn_LS (g/mol) | 40,564 | 28,816 | 50,221 | 50,577 | 46,030 |
| Mw_LS (g/mol) | 68,780 | 51,567 | 84,673 | 84,791 | 80,948 |
| Mz_LS (g/mol) | 103,297 | 75,498 | 127,325 | 129,308 | 123,051 |
| $g'_{vis}$ (—) | 1.18 | 1.14 | 1.21 | 1.21 | 1.21 |
| Tg (° C.) | −20.9 | −20.5 | −26.0 | −25.4 | −24.3 |
| Ethylene content (wt %) | 12.0% | 12.0% | 12.6% | 12.9% | 11.8% |
| Diad and triad sequence distributions ($^{13}$C NMR) | | | | | |
| EEE | 0.005 | 0.004 | 0.005 | 0.005 | 0.004 |
| EEP | 0.023 | 0.020 | 0.030 | 0.027 | 0.024 |
| PEP | 0.118 | 0.105 | 0.140 | 0.133 | 0.128 |
| EPE | 0.033 | 0.026 | 0.048 | 0.042 | 0.038 |
| EPP | 0.196 | 0.184 | 0.221 | 0.213 | 0.211 |
| PPP | 0.625 | 0.661 | 0.556 | 0.581 | 0.594 |
| EE | 0.016 | 0.014 | 0.020 | 0.018 | 0.016 |
| EP + PE | 0.260 | 0.234 | 0.313 | 0.295 | 0.284 |
| PP | 0.723 | 0.753 | 0.666 | 0.687 | 0.700 |
| Tacticity diad and triads | | | | | |
| mm(PP + EP) | 4.75% | 5.35% | 3.27% | 2.99% | 2.88% |
| rr (PP + EP) | 71.02% | 65.51% | 77.23% | 76.88% | 76.36% |
| r (PP + EP) | 83.14% | 80.08% | 86.98% | 86.95% | 86.74% |
| Propylene run # | 13.1 | 11.8 | 15.9 | 14.8 | 14.4 |
| Regio defect (mol %) | 1.102 | 1.135 | 1.063 | 1.038 | 0.902 |
| $r_1r_2$ (—) | 0.68 | 0.76 | 0.55 | 0.57 | 0.55 |

| Example # | G40 | G41 | G42 | G43 | G44 |
|---|---|---|---|---|---|
| Polymerization temperature (° C.) | 80 | 80 | 80 | 80 | 80 |
| Ethylene feed rate (g/min) | 2.38 | 1.36 | 1.70 | 2.04 | 2.38 |
| Propylene feed rate (g/min) | 27 | 27 | 27 | 27 | 27 |
| H2 feed rate (cc/min) | 4.82 | 0 | 0 | 0 | 0 |
| Isohexane feed rate (g/min) | 56.7 | 56.7 | 56.7 | 56.7 | 56.7 |
| Catalyst #2 feed rate (mol/min) | 1.168E−07 | 1.868E−07 | 1.635E−07 | 1.401E−07 | 1.168E−07 |
| TNOA feed rate (mol/min) | 3.703E−06 | 3.703E−06 | 3.703E−06 | 3.703E−06 | 3.703E−06 |
| Yield (g/min) | 19.5 | 15.7 | 16.5 | 17.3 | 16.0 |
| Conversion (%) | 66.4% | 55.4% | 57.6% | 59.7% | 54.6% |
| Catalyst efficiency (kg polymer/kg catalyst) | 194,874 | 98,269 | 118,040 | 144,422 | 160,262 |
| MFR (g/10 min) | 56.93 | 32.43 | 28.51 | 33.13 | 29.45 |
| Mn_DRI (g/mol) | 48,118 | 55,907 | 53,270 | 57,267 | 51,575 |
| Mw_DRI (g/mol) | 93,367 | 107,848 | 107,020 | 106,761 | 101,880 |
| Mz_DRI (g/mol) | 149,329 | 173,953 | 172,597 | 173,119 | 165,267 |

TABLE 2-continued

| | | | | | |
|---|---|---|---|---|---|
| MWD (—) | 1.94 | 1.93 | 2.01 | 1.86 | 1.98 |
| Mn_LS (g/mol) | 42,689 | 54,305 | 48,967 | 50,839 | 48,150 |
| Mw_LS (g/mol) | 76,362 | 86,620 | 86,378 | 86,425 | 83,419 |
| Mz_LS (g/mol) | 118,881 | 125,431 | 130,241 | 125,945 | 123,575 |
| $g'_{vis}$ (—) | 1.20 | 1.27 | 1.26 | 1.24 | 1.23 |
| Tg (° C.) | −22.3 | −15.2 | −17.7 | −24.0 | −22.1 |
| Ethylene content (wt %) | 11.7% | 7.6% | 9.3% | 11.7% | 12.6% |
| Diad and triad sequence distributions ($^{13}$C NMR) | | | | | |
| EEE | 0.005 | 0.003 | 0.003 | 0.004 | 0.004 |
| EEP | 0.024 | 0.012 | 0.016 | 0.023 | 0.031 |
| PEP | 0.126 | 0.091 | 0.108 | 0.125 | 0.142 |
| EPE | 0.037 | 0.020 | 0.025 | 0.037 | 0.047 |
| EPP | 0.208 | 0.165 | 0.186 | 0.207 | 0.224 |
| PPP | 0.600 | 0.709 | 0.662 | 0.604 | 0.552 |
| EE | 0.017 | 0.009 | 0.011 | 0.015 | 0.020 |
| EP + PE | 0.279 | 0.200 | 0.234 | 0.277 | 0.317 |
| PP | 0.704 | 0.792 | 0.755 | 0.708 | 0.664 |
| Tacticity diad and triads | | | | | |
| mm(PP + EP) | 3.31% | 3.10% | 2.95% | 2.66% | 2.71% |
| rr (PP + EP) | 75.38% | 76.02% | 76.74% | 77.68% | 78.17% |
| r (PP + EP) | 86.03% | 86.46% | 86.89% | 87.51% | 87.73% |
| Propylene run # | 14.0 | 10.2 | 11.8 | 14.0 | 15.9 |
| Regio defect (mol %) | 0.971 | 0.988 | 0.886 | 0.959 | 0.896 |
| $r_1r_2$ (—) | 0.63 | 0.68 | 0.59 | 0.57 | 0.52 |

Example G45 to G59 were made by following the same procedure used for producing Examples of G1 to G20 except that the catalyst used was di(para-triethylsilylphenyl)methylene(2,7-di-tert-butylfluorenyl)(cyclopentadienyl)zirconium dimethyl (Catalyst #2). This catalyst was preactivated with N,N-dimethylanilinium tetrakis(heptafluoro-2-naphthyl) borate (activator B). The detailed process conditions and some characterization data are listed in Table 3. Both catalyst and TONA feed rate can be adjusted to achieve the targeted conversion.

TABLE 3

| Example # | G45 | G46 | G47 | G48 | G49 |
|---|---|---|---|---|---|
| Polymerization temperature (° C.) | 60 | 70 | 110 | 60 | 70 |
| Ethylene feed rate (g/min) | 1.36 | 1.36 | 1.36 | 1.36 | 1.36 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #2 feed rate (mol/min) | 1.168E−07 | 1.401E−07 | 3.736E−07 | 1.297E−07 | 1.557E−07 |
| TNOA feed rate (mol/min) | 3.703E−06 | 3.703E−06 | 3.703E−06 | 3.703E−06 | 3.703E−06 |
| Yield (g/min) | 9.4 | 10.4 | 14.2 | 10.7 | 10.9 |
| Conversion (%) | 33.1% | 36.6% | 50.2% | 37.6% | 38.4% |
| Catalyst efficiency (kg polymer/kg catalyst) | 93,838 | 86,399 | 44,509 | 96,050 | 81,698 |
| MFR (g/10 min) | 8.83 | 13.39 | >800 | 6.75 | 13.46 |
| Mn_DRI (g/mol) | 75,219 | 65,320 | 24,566 | 78,764 | 66,579 |
| Mw_DRI (g/mol) | 142,331 | 127,709 | 47,406 | 153,718 | 127,142 |
| Mz_DRI (g/mol) | 224,882 | 207,708 | 75,538 | 245,016 | 206,147 |
| MWD (—) | 1.89 | 1.96 | 1.93 | 1.95 | 1.91 |
| Mn_LS (g/mol) | 63,812 | 60,383 | 26,215 | 74,135 | 60,107 |
| Mw_LS (g/mol) | 115,595 | 101,356 | 40,220 | 124,465 | 101,149 |
| Mz_LS (g/mol) | 170,718 | 144,550 | 60,393 | 181,435 | 144,562 |
| $g'_{vis}$ (—) | 1.26 | 1.25 | 1.09 | 1.29 | 1.26 |
| Tg (° C.) | −23.1 | −21.7 | −24.5 | −21.4 | −20.0 |
| Ethylene content (wt %) | 12.6% | 12.2% | 12.6% | 11.6% | 11.2% |
| Diad and triad sequence distributions ($^{13}$C NMR) | | | | | |
| EEE | 0.006 | 0.006 | 0.003 | 0.004 | 0.005 |
| EEP | 0.028 | 0.028 | 0.020 | 0.023 | 0.026 |
| PEP | 0.134 | 0.129 | 0.102 | 0.124 | 0.126 |
| EPE | 0.042 | 0.040 | 0.024 | 0.036 | 0.038 |
| EPP | 0.213 | 0.203 | 0.186 | 0.204 | 0.198 |
| PPP | 0.577 | 0.594 | 0.665 | 0.609 | 0.606 |
| EE | 0.020 | 0.020 | 0.013 | 0.015 | 0.018 |
| EP + PE | 0.297 | 0.285 | 0.229 | 0.274 | 0.276 |
| PP | 0.683 | 0.695 | 0.758 | 0.711 | 0.705 |
| Tacticity diad and triads | | | | | |
| mm(PP + EP) | 2.56% | 2.91% | 6.33% | 2.63% | 2.56% |
| rr (PP + EP) | 85.20% | 83.06% | 60.62% | 86.30% | 83.91% |
| r (PP + EP) | 91.32% | 90.07% | 77.15% | 91.83% | 90.67% |
| Propylene run # | 14.9 | 14.1 | 11.8 | 13.8 | 13.8 |

TABLE 3-continued

| | | | | | |
|---|---|---|---|---|---|
| Regio defect (mol %) | 1.074 | 1.324 | 1.224 | 0.817 | 1.240 |
| $r_1r_2$ (—) | 0.63 | 0.69 | 0.75 | 0.58 | 0.67 |

| Example # | G50 | G51 | G52 | G53 | G54 |
|---|---|---|---|---|---|
| Polymerization temperature (° C.) | 80 | 90 | 100 | 110 | 70 |
| Ethylene feed rate (g/min) | 1.36 | 1.36 | 1.36 | 1.36 | 1.47 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #2 feed rate (mol/min) | 1.816E−07 | 2.076E−07 | 3.113E−07 | 4.151E−07 | 1.816E−07 |
| TNOA feed rate (mol/min) | 3.703E−06 | 3.703E−06 | 3.703E−06 | 3.703E−06 | 3.703E−06 |
| Yield (g/min) | 11.2 | 10.8 | 12.0 | 11.6 | 12.5 |
| Conversion (%) | 39.5% | 38.1% | 42.4% | 41.0% | 44.1% |
| Catalyst efficiency (kg polymer/kg catalyst) | 72,071 | 60,824 | 45,147 | 32,662 | 80,670 |
| MFR (g/10 min) | 29.54 | 77.96 | 238.53 | >300 | 14.13 |
| Mn_DRI (g/mol) | 51,934 | 44,450 | 30,104 | 24,929 | 63,118 |
| Mw_DRI (g/mol) | 103,305 | 84,389 | 62,269 | 51,450 | 129,798 |
| Mz_DRI (g/mol) | 164,729 | 135,020 | 99,125 | 83,731 | 213,962 |
| MWD (—) | 1.99 | 1.90 | 2.07 | 2.06 | 2.06 |
| Mn_LS (g/mol) | 49,175 | 47,085 | 32,410 | 26,121 | 53,252 |
| Mw_LS (g/mol) | 84,705 | 69,693 | 52,260 | 40,117 | 105,650 |
| Mz_LS (g/mol) | 128,832 | 98,947 | 76,747 | 56,915 | 156,965 |
| $g'_{vis}$ (—) | 1.24 | 1.15 | 1.12 | 1.07 | 1.27 |
| Tg (° C.) | −19.6 | −24.8 | −24.1 | −28.7 | −19.7 |
| Ethylene content (wt %) | 11.1% | 12.6% | 12.9% | 13.7% | 10.9% |
| Diad and triad sequence distributions ($^{13}$C NMR) | | | | | |
| EEE | 0.005 | 0.004 | 0.004 | 0.005 | 0.004 |
| EEP | 0.025 | 0.027 | 0.024 | 0.028 | 0.023 |
| PEP | 0.119 | 0.123 | 0.115 | 0.116 | 0.119 |
| EPE | 0.033 | 0.037 | 0.029 | 0.034 | 0.032 |
| EPP | 0.201 | 0.204 | 0.199 | 0.203 | 0.197 |
| PPP | 0.618 | 0.604 | 0.630 | 0.615 | 0.625 |
| EE | 0.017 | 0.018 | 0.016 | 0.018 | 0.016 |
| EP + PE | 0.264 | 0.276 | 0.255 | 0.265 | 0.261 |
| PP | 0.719 | 0.706 | 0.729 | 0.717 | 0.723 |
| Tacticity diad and triads | | | | | |
| mm(PP + EP) | 2.79% | 3.41% | 5.19% | 5.79% | 2.38% |
| rr (PP + EP) | 80.23% | 75.06% | 67.19% | 62.38% | 83.69% |
| r (PP + EP) | 88.72% | 85.82% | 81.00% | 78.29% | 90.65% |
| Propylene run # | 13.3 | 13.9 | 12.9 | 13.5 | 13.1 |
| Regio defect (mol %) | 1.111 | 1.345 | 1.270 | 1.406 | 1.000 |
| $r_1r_2$ (—) | 0.70 | 0.66 | 0.72 | 0.74 | 0.66 |

| Example # | G55 | G56 | G57 | G58 | G59 |
|---|---|---|---|---|---|
| Polymerization temperature (° C.) | 70 | 70 | 90 | 90 | 90 |
| Ethylene feed rate (g/min) | 1.47 | 1.47 | 1.47 | 1.47 | 1.47 |
| Propylene feed rate (g/min) | 27 | 27 | 27 | 27 | 27 |
| H2 feed rate (cc/min) | 1.21 | 2.41 | 0 | 1.21 | 2.41 |
| Isohexane feed rate (g/min) | 56.7 | 56.7 | 56.7 | 56.7 | 56.7 |
| Catalyst #2 feed rate (mol/min) | 1.816E−07 | 1.816E−07 | 2.076E−07 | 2.076E−07 | 2.076E−07 |
| TNOA feed rate (mol/min) | 3.703E−06 | 3.703E−06 | 3.703E−06 | 3.703E−06 | 3.703E−06 |
| Yield (g/min) | 14.4 | 15.9 | 11.9 | 13.8 | 14.8 |
| Conversion (%) | 50.4% | 55.9% | 42.0% | 48.5% | 52.1% |
| Catalyst efficiency (kg polymer/kg catalyst) | 92,323 | 102,305 | 67,179 | 77,597 | 83,362 |
| MFR (g/10 min) | 17.19 | 23.84 | 91.84 | 107.60 | 133.63 |
| Mn_DRI (g/mol) | 60,602 | 61,173 | 43,925 | 40,361 | 40,987 |
| Mw_DRI (g/mol) | 124,362 | 120,140 | 85,850 | 81,559 | 79,997 |
| Mz_DRI (g/mol) | 202,399 | 196,158 | 140,798 | 129,751 | 128,687 |
| MWD (—) | 2.05 | 1.96 | 1.95 | 2.02 | 1.95 |
| Mn_LS (g/mol) | 56,462 | 56,279 | 40,748 | 37,280 | 36,402 |
| Mw_LS (g/mol) | 100,074 | 94,523 | 69,408 | 66,691 | 64,462 |
| Mz_LS (g/mol) | 149,897 | 137,619 | 101,738 | 99,327 | 96,179 |
| $g'_{vis}$ (—) | 1.28 | 1.28 | 1.19 | 1.21 | 1.22 |
| Tg (° C.) | −19.1 | −19.8 | −23.0 | −18.3 | −20.4 |
| Ethylene content (wt %) | 10.0% | 9.0% | 11.4% | 10.4% | 9.6% |
| Diad and triad sequence distributions ($^{13}$C NMR) | | | | | |
| EEE | 0.003 | 0.003 | 0.004 | 0.004 | 0.003 |
| EEP | 0.017 | 0.015 | 0.026 | 0.020 | 0.019 |
| PEP | 0.108 | 0.100 | 0.125 | 0.111 | 0.108 |
| EPE | 0.024 | 0.021 | 0.035 | 0.027 | 0.026 |

TABLE 3-continued

| | | | | | |
|---|---|---|---|---|---|
| EPP | 0.185 | 0.177 | 0.210 | 0.195 | 0.190 |
| PPP | 0.663 | 0.684 | 0.600 | 0.643 | 0.654 |
| EE | 0.012 | 0.011 | 0.017 | 0.014 | 0.013 |
| EP + PE | 0.233 | 0.217 | 0.278 | 0.245 | 0.238 |
| PP | 0.756 | 0.772 | 0.705 | 0.740 | 0.749 |
| Tacticity diad and triads | | | | | |
| mm(PP + EP) | 2.85% | 2.74% | 3.70% | 3.85% | 4.03% |
| rr (PP + EP) | 82.44% | 81.57% | 74.51% | 73.18% | 72.51% |
| r (PP + EP) | 89.79% | 89.42% | 85.40% | 84.66% | 84.24% |
| Propylene run # | 11.6 | 11.0 | 14.0 | 12.5 | 12.1 |
| Regio defect (mol %) | 0.838 | 0.985 | 1.082 | 1.170 | 1.172 |
| $r_1r_2$ (—) | 0.65 | 0.69 | 0.61 | 0.70 | 0.67 |

The polymerization for Examples M1 to M8 listed in Table 4 were carried out using a solution process in a 28-liter continuous stirred-tank reactor (autoclave reactor). The autoclave reactor was equipped with an agitator, a pressure controller, and insulation to prevent heat loss. The reactor temperature was controlled by controlling the catalyst feed rates and heat removal was provided by feed chilling. All solvents and monomers were purified over beds of alumina and molecular sieves. The reactor was operated liquid full and at a pressure of 11.03 MPa. Isohexane was used as a solvent. It was fed into the reactor using a turbine pump and its flow rate was controlled by a mass flow controller downstream. The compressed, liquefied propylene feed was controlled by a mass flow controller. Hydrogen (if used) was fed to the reactor through a thermal mass flow controller. Ethylene feed was also controlled by a mass flow controller. The ethylene, propylene and hydrogen (if used) were mixed into the isohexane steam at separate addition points via a manifold. A 3 wt % mixture of tri-n-octylaluminum in isohexane was also added to the manifold through a separate line (used as a scavenger) and the combined mixture of monomers, scavenger, and solvent was fed into the reactor through a single line.

The catalyst used for polymerization of Examples #M1 to # M7 was di(para-triethylsilylphenyl)methylene(2,7-di-tert-butylfluorenyl)(cyclopentadienyl)zirconium dimethyl (catalyst #2). This catalyst was preactivated with N,N-dimethylanilinium tetrakis(heptafluoro-2-naphthyl) borate (activator B) at a molar ratio of about 1:1 in 4 liters of toluene. In Example M8, di(para-triethylsilylphenyl)methylene(2,7-di-tert-butylfluorenyl)(cyclopentadienyl)zirconium dimethyl (catalyst #2) was premixed with N,N-dimethylanilinium tetrakis(pentafluorophenyl)borate (activator A) at a molar ratio of about 1:1 in 4 liters of toluene. After the solids dissolved, with stirring, the catalyst solution was charged into an ISCO pump and metered into the reactor. The catalyst feed rate was controlled along with the monomer feed rates and reaction temperature, as shown in Table 4.

The polymers produced are also described in Table 4. The reactor product stream was treated with trace amounts of methanol to halt the polymerization. The mixture was then freed from solvent via a low-pressure flash separation, treated with Irganox™ 1076 then subjected to a devolatilizing extruder process. The dried polymer was then pelletized.

TABLE 4

| Polymerization Summary using a 28-liter autoclave reactor | | | | |
|---|---|---|---|---|
| Example # | M1 | M2 | M3 | M4 |
| Polymerization temperature (° C.) | 70 | 70 | 70 | 70 |
| Ethylene feed rate (g/min) | 6.67 | 6.67 | 6.67 | 6.67 |
| Propylene feed rate (g/min) | 291 | 291 | 291 | 278 |
| Isohexane feed rate (g/min) | 1598.3 | 1598.5 | 1598.2 | 1598.5 |
| Catalyst #2 feed rate (mol/min) | 3.79E−07 | 4.55E−07 | 6.30E−07 | 1.00E−06 |
| Yield (g/min) | 89.0 | 90.5 | 93.3 | 96.0 |
| Catalyst efficiency (kg poly/kg | 455,271 | 385,617 | 287,118 | 186,119 |
| Ethylene conversion (%) | 75.6 | 87.1 | 81.3 | 85.3 |
| Propylene conversion (%) | 28.7 | 28.9 | 30.1 | 29.4 |
| MFR (g/10 min) | 227.5 | 141.2 | 61.8 | 30.8 |
| Mn_DRI (g/mol) | 31,307 | 36,667 | 39,568 | 53,757 |
| Mw_DRI (g/mol) | 59616 | 69497 | 85693 | 101809 |
| Mz_DRI (g/mol) | 92345 | 110011 | 140566 | 161511 |
| MWD (—) | 1.90 | 1.90 | 2.17 | 1.89 |
| Mn_LS (g/mol) | 28656 | 32451 | 31704 | 48581 |
| Mw_LS (g/mol) | 47,277 | 53,203 | 63,265 | 80,131 |
| Mz_LS (g/mol) | 69853 | 74744 | 91950 | 117057 |
| $g'_{vis}$ (—) | 1.303 | 1.305 | 1.323 | 1.334 |
| Ethylene content (wt %) | 7.7 | 7.5 | 7.3 | 6.8 |
| Tg (° C.) | −16.6 | −15.6 | −15.6 | −14.5 |
| Diad and triad sequence distributions ($^{13}C$ NMR) | | | | |
| [EEE] | 0.004 | 0.003 | 0.007 | 0.010 |
| [EEP] | 0.012 | 0.012 | 0.013 | 0.012 |
| [PEP] | 0.095 | 0.091 | 0.091 | 0.086 |
| [EPE] | 0.020 | 0.018 | 0.019 | 0.013 |
| [EPP] | 0.170 | 0.163 | 0.169 | 0.157 |
| [PPP] | 0.700 | 0.713 | 0.701 | 0.723 |

TABLE 4-continued

| Polymerization Summary using a 28-liter autoclave reactor | | | | |
|---|---|---|---|---|
| [EE] | 0.010 | 0.009 | 0.014 | 0.016 |
| [PP] | 0.785 | 0.795 | 0.786 | 0.802 |
| [EP] | 0.206 | 0.197 | 0.201 | 0.184 |
| Tacticity diad and triads | | | | |
| mm %$^a$ (PP + EP) | 2.7 | 2.7 | 2.2 | 3.3 |
| rr %$^a$ (PP + EP) | 81.6 | 81.7 | 82.7 | 80.8 |
| r %$^a$ (PP + EP) | 89.5 | 89.5 | 90.3 | 88.8 |
| Propylene Run # | 10.5 | 10.0 | 10.4 | 9.2 |
| Regio defect (mol %) | 0.82 | 0.86 | 0.93 | 0.93 |
| $r_1r_2$ (—) | 0.74 | 0.74 | 1.05 | 1.52 |
| Example # | M5 | M6 | M7 | M8 |
| Polymerization temperature (° C.) | 70 | 65 | 65.8 | 65.0 |
| Ethylene feed rate (g/min) | 7.69 | 9.61 | 9.61 | 6.52 |
| Propylene feed rate (g/min) | 285 | 345 | 375 | 313 |
| Isohexane feed rate (g/min) | 1612.8 | 1286.5 | 1282.7 | 1030.3 |
| Catalyst #2 feed rate (mol/min) | 3.19E−06 | 4.55E−07 | 1.62E−06 | 3.22E−06 |
| Yield (g/min) | 97.0 | 115.0 | 127 | 90.0 |
| Catalyst efficiency (kg poly/kg | 58952 | 490011 | 151988 | 323480 |
| Ethylene conversion (%) | 89.1 | 85.8 | 81.3 | 93.7 |
| Propylene conversion (%) | 30.7 | 30.7 | 30.1 | 26.4 |
| MFR (g/10 min) | 16.0 | 17.9 | 12.0 | 39.3 |
| Mn_DRI (g/mol) | 64,640 | 60,770 | 57,420 | 48154 |
| Mw_DRI (g/mol) | 123513 | 118448 | 187020 | 95190 |
| Mz_DRI (g/mol) | 200228 | 187020 | 206410 | 148110 |
| MWD (—) | 1.91 | 1.95 | 3.26 | 1.98 |
| Mn_LS (g/mol) | 58069 | 55504 | 57695 | 43149 |
| Mw_LS (g/mol) | 95,668 | 92,556 | 102,288 | 74498 |
| Mz_LS (g/mol) | 137732 | 136162 | 152628 | 108422 |
| $g'_{vis}$ (—) | 1.316 | 1.344 | 1.303 | 1.314 |
| Ethylene content by FTIR (wt %) | 7.4 | 8.0 | 7.56 | 7.48 |
| Tg (° C.) | −15.6 | −16.5 | −15.4 | −14.9 |
| Diad and triad sequence distributions ($^{13}C$ NMR) | | | | |
| [EEE] | 0.007 | 0.007 | 0.004 | 0.004 |
| [EEP] | 0.010 | 0.012 | 0.010 | 0.012 |
| [PEP] | 0.091 | 0.096 | 0.094 | 0.093 |
| [EPE] | 0.016 | 0.020 | 0.019 | 0.018 |
| [EPP] | 0.169 | 0.173 | 0.173 | 0.167 |
| [PPP] | 0.706 | 0.692 | 0.700 | 0.705 |
| [EE] | 0.012 | 0.013 | 0.009 | 0.010 |
| [PP] | 0.791 | 0.779 | 0.787 | 0.789 |
| [EP] | 0.197 | 0.209 | 0.205 | 0.201 |
| Tacticity diad and triads | | | | |
| mm %$^a$ (PP + EP) | 2.5 | 2.6 | 2.7 | 2.6 |
| rr %$^a$ (PP + EP) | 81.5 | 82.1 | 83.2 | 83.2 |
| r %$^a$ (PP + EP) | 89.5 | 89.8 | 90.3 | 90.3 |
| Propylene Run # | 10.1 | 10.7 | 10.6 | 10.2 |
| Regio defect (mol %) | 0.73 | 0.88 | 0.88 | 0.84 |
| $r_1r_2$ (—) | 0.98 | 0.93 | 0.68 | 0.78 |

The polymer produced in Example M8 was pelletized into spherical shapes (pellet size of circa 26 pellets/gram). The pellets were subjected to stability test. The pellet stability test was conducted in the oven with air ventilation under 40° C. and 1 psig pressure for 90 days. Approximately 35 grams of samples were placed in 100 ml glass beakers with a customized weight on top such that the applied pressure was 1 psig on the top surface of the pellets. The pellets were poured out of the glass beaker after 90 days and well dispersed individual pellets were observed.

A set of comparative examples are listed in Table 5. Example C1 to C22 were made by following the same procedure used for producing Examples of G1 to G20 except that (1) diphenylmethylene(2,7-di-tert-butylfluorenyl)(cyclopentadienyl)zirconium dimethyl (Catalyst #1) and N,N-dimethylanilinium tetrakis(pentafluorophenyl) borate (activator A) were used in Examples C1 to C6; (2) di(para-triethylsilylphenyl)methylene(2,7-di-tert-butylfluorenyl)(cyclopentadienyl)zirconium dimethyl (Catalyst #2) and N,N-dimethylanilinium tetrakis(pentafluorophenyl) borate (activator A) were used in Examples C7 to C20. The detailed process conditions and some characterization data are listed in Table 5. Both catalyst and TONA feed rate can be adjusted to achieve the targeted conversion.

TABLE 5

| Example # | C1 | C2 | C3 | C4 | C5 |
|---|---|---|---|---|---|
| Polymerization temperature (° C.) | 60 | 60 | 70 | 70 | 70 |
| Ethylene feed rate (g/min) | 0.23 | 0.45 | 0.23 | 0.45 | 0.68 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #1 feed rate (mol/min) | 1.723E−07 | 1.379E−07 | 1.723E−07 | 1.723E−07 | 1.379E−07 |
| TNOA feed rate (mol/min) | 7.385E−06 | 7.385E−06 | 7.385E−06 | 7.385E−06 | 7.385E−06 |
| Yield (g/min) | 9.21 | 9.31 | 6.71 | 8.13 | 9.74 |
| Conversion (%) | 33.8% | 33.9% | 24.7% | 29.9% | 35.5% |
| Catalyst efficiency (kg polymer/kg catalyst) | 103,604 | 130,819 | 75,530 | 91,451 | 136,900 |
| MFR (g/10 min) | 0.76 | 1.22 | 2.80 | 3.13 | 3.70 |
| Mn_DRI (g/mol) | 148,337 | 162,615 | 110,635 | 109,037 | 106,068 |
| Mw_DRI (g/mol) | 330,135 | 312,457 | 231,854 | 224,737 | 216,423 |
| Mz_DRI (g/mol) | 575,681 | 512,782 | 380,505 | 373,992 | 356,796 |
| MWD (—) | 2.23 | 1.92 | 2.10 | 2.06 | 2.04 |
| Mn_LS (g/mol) | 130,017 | 142,054 | 93,017 | 90,020 | 87,332 |
| Mw_LS (g/mol) | 234,600 | 227,291 | 172,510 | 159,421 | 160,951 |
| Mz_LS (g/mol) | 345,986 | 323,759 | 268,740 | 232,253 | 242,207 |
| $g'_{vis}$ (—) | 1.462 | 1.434 | 1.446 | 1.409 | 1.384 |
| Tc (° C.) | 47.92 | 40.11 | 60.66 | — | — |
| Tm (° C.) | 104.86 | 91.86 | 93.98 | — | — |
| Tg (° C.) | −5.15 | −7.76 | −5.34 | −4.55 | −9.89 |
| Heat of fusion (J/g) | 26.08 | 6.07 | 6.38 | — | — |
| Ethylene content (wt %) | 1.4% | 3.4% | 1.8% | 1.8% | 2.8% |
| Diad and triad sequence distributions ($^{13}C$ NMR) | | | | | |
| EEE | 0.001 | 0.003 | 0.001 | 0.002 | 0.002 |
| EEP | 0.005 | 0.008 | 0.006 | 0.005 | 0.005 |
| PEP | 0.023 | 0.048 | 0.022 | 0.024 | 0.046 |
| EPE | −0.001 | 0.007 | −0.004 | 0.001 | 0.004 |
| EPP | 0.046 | 0.089 | 0.053 | 0.051 | 0.090 |
| PPP | 0.927 | 0.846 | 0.921 | 0.916 | 0.854 |
| EE | 0.003 | 0.007 | 0.005 | 0.005 | 0.004 |
| EP + PE | 0.046 | 0.103 | 0.048 | 0.053 | 0.097 |
| PP | 0.950 | 0.891 | 0.948 | 0.942 | 0.899 |
| Tacticity diad and triads | | | | | |
| rrPP | 90.63% | 95.38% | 88.52% | 87.10% | 91.19% |
| rr (PP + EP) | 85.97% | 85.67% | 83.31% | 82.02% | 82.36% |
| r (PP + EP) | 91.44% | 91.36% | 90.09% | 89.21% | 89.59% |
| Propylene run # | 2.2 | 5.1 | 2.2 | 2.6 | 4.9 |
| Regio defect (mol %) | 0.44 | 0.70 | 0.50 | 0.54 | 0.47 |
| $r_1r_2$ (—) | 6.07 | 2.21 | 7.50 | 6.33 | 1.59 |

| Example # | C6 | C7 | C8 | C9 | C10 |
|---|---|---|---|---|---|
| Polymerization temperature (° C.) | 70 | 70 | 70 | 70 | 60 |
| Ethylene feed rate (g/min) | 0.68 | 0.23 | 0.45 | 0.68 | 0.23 |
| Propylene feed rate (g/min) | 27 | 27 | 27 | 27 | 27 |
| H2 feed rate (cc/min) | 2.41 | 0 | 0 | 0 | 0 |
| Isohexane feed rate (g/min) | 59.4 | 56.7 | 56.7 | 56.7 | 56.7 |
| Catalyst feed rate (mol/min) | 1.206E−07 | 2.335E−07 | 2.335E−07 | 2.024E−07 | 2.569E−07 |
| TNOA feed rate (mol/min) | 7.407E−06 | 3.703E−06 | 3.703E−06 | 3.703E−06 | 3.703E−06 |
| Yield (g/min) | 14.56 | 9.04 | 12.55 | 13.62 | 10.59 |
| Conversion (%) | 52.6% | 33.2% | 45.7% | 49.2% | 38.9% |
| Catalyst efficiency (kg polymer/kg catalyst) | 234,076 | 45,202 | 62,765 | 78,552 | 48,106 |
| MFR (g/10 min) | 10.35 | 8.98 | 10.92 | 10.95 | 2.69 |
| Mn_DRI (g/mol) | 64,482 | 88,131 | 80,781 | 76,162 | 99,096 |
| Mw_DRI (g/mol) | 153,917 | 161,769 | 152,504 | 148,781 | 205,799 |
| Mz_DRI (g/mol) | 220,852 | 258,864 | 245,327 | 238,957 | 335,678 |
| MWD (—) | 2.11 | 1.84 | 1.89 | 1.95 | 2.08 |
| Mn_LS (g/mol) | 55,095 | 80,023 | 65,517 | 64,703 | 85,505 |
| Mw_LS (g/mol) | 109,901 | 128,032 | 116,026 | 114,072 | 155,516 |
| Mz_LS (g/mol) | 166,145 | 187,494 | 168,065 | 165,247 | 230,557 |
| $g'_{vis}$ (—) | 1.366 | 1.369 | 1.362 | 1.35 | 1.446 |
| Tc (° C.) | — | — | — | — | 59.76 |
| Tm (° C.) | — | — | — | — | 97.5 |
| Tg (° C.) | −35.1 | −9.65 | −13.07 | −9.41 | −4.99 |
| Heat of fusion (J/g) | — | — | — | — | 14.17 |
| Ethylene content (wt %) | 4.8% | 4.3% | 4.0% | 4.5% | 1.7% |

TABLE 5-continued

| Diad and triad sequence distributions ($^{13}C$ NMR) | | | | | |
|---|---|---|---|---|---|
| EEE | 0.002 | 0.001 | 0.002 | 0.002 | 0.001 |
| EEP | 0.004 | 0.003 | 0.006 | 0.005 | 0.002 |
| PEP | 0.057 | 0.025 | 0.040 | 0.056 | 0.020 |
| EPE | 0.005 | 0.000 | 0.004 | 0.006 | 0.000 |
| EPP | 0.107 | 0.056 | 0.081 | 0.109 | 0.049 |
| PPP | 0.825 | 0.916 | 0.868 | 0.822 | 0.928 |
| EE | 0.004 | 0.002 | 0.005 | 0.004 | 0.002 |
| EP + PE | 0.117 | 0.054 | 0.087 | 0.119 | 0.046 |
| PP | 0.879 | 0.944 | 0.908 | 0.877 | 0.953 |
| Tacticity diad and triads | | | | | |
| mm(PP + EP) | 3.54% | 3.29% | 3.17% | 3.05% | 2.69% |
| rr (PP + EP) | 80.60% | 80.79% | 80.06% | 80.21% | 85.11% |
| r (PP + EP) | 88.53% | 88.75% | 88.44% | 88.58% | 91.21% |
| Propylene run # | 5.9 | 2.8 | 4.4 | 6.0 | 2.4 |
| Regio defect (mol %) | 0.46 | 0.80 | 1.00 | 0.94 | 0.73 |
| $r_1r_2$ (—) | 1.00 | 3.03 | 2.32 | 1.12 | 3.34 |

| Example # | C11 | C12 | C13 | C14 | C15 |
|---|---|---|---|---|---|
| Polymerization temperature (° C.) | 70 | 80 | 90 | 60 | 70 |
| Ethylene feed rate (g/min) | 0.23 | 0.23 | 0.23 | 0.45 | 0.45 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #2 feed rate (mol/min) | 2.569E−07 | 2.569E−07 | 2.569E−07 | 2.569E−07 | 3.503E−07 |
| TNOA feed rate (mol/min) | 3.703E−06 | 3.703E−06 | 3.703E−06 | 3.703E−06 | 3.703E−06 |
| Yield (g/min) | 11.55 | 10.55 | 10.17 | 11.43 | 13.51 |
| Conversion (%) | 42.4% | 38.8% | 37.4% | 41.6% | 49.2% |
| Catalyst efficiency (kg polymer/kg catalyst) | 52,503 | 47,958 | 46,220 | 51,946 | 45,020 |
| MFR (g/10 min) | 7.84 | 25.72 | 103.06 | 3.24 | 7.95 |
| Mn_DRI (g/mol) | 79,051 | 59,161 | 44,967 | 106,446 | 78,464 |
| Mw_DRI (g/mol) | 158,369 | 117,538 | 85,040 | 205,091 | 162,783 |
| Mz_DRI (g/mol) | 263,774 | 192,583 | 132,577 | 339,387 | 272,842 |
| MWD (—) | 2.00 | 1.99 | 1.89 | 1.93 | 2.07 |
| Mn_LS (g/mol) | 69,719 | 53,799 | 37,614 | 87,683 | 67,609 |
| Mw_LS (g/mol) | 118,367 | 90,007 | 67,193 | 153,177 | 121,499 |
| Mz_LS (g/mol) | 172,659 | 135,186 | 102,815 | 226,528 | 177,249 |
| $g'_{vis}$ (—) | 1.386 | 1.337 | 1.295 | 1.407 | 1.36 |
| Tg (° C.) | −6.26 | −7.03 | −13.09 | −11.36 | −12.63 |
| Ethylene content (wt %) | 2.1% | 2.1% | 4.3% | 4.5% | 4.4% |
| Diad and triad sequence distributions ($^{13}C$ NMR) | | | | | |
| EEE | 0.001 | 0.001 | 0.001 | 0.001 | 0.001 |
| EEP | 0.002 | 0.002 | 0.003 | 0.003 | 0.003 |
| PEP | 0.019 | 0.021 | 0.025 | 0.044 | 0.038 |
| EPE | −0.001 | 0.000 | 0.001 | 0.004 | 0.003 |
| EPP | 0.047 | 0.054 | 0.061 | 0.086 | 0.077 |
| PPP | 0.932 | 0.922 | 0.910 | 0.862 | 0.878 |
| EE | 0.002 | 0.002 | 0.003 | 0.003 | 0.003 |
| EP + PE | 0.042 | 0.050 | 0.057 | 0.092 | 0.081 |
| PP | 0.955 | 0.948 | 0.940 | 0.905 | 0.917 |
| Tacticity diad and triads | | | | | |
| mm(PP + EP) | 3.08% | 3.85% | 4.71% | 2.69% | 3.01% |
| rr (PP + EP) | 80.99% | 75.68% | 69.72% | 84.63% | 80.97% |
| r (PP + EP) | 88.96% | 85.91% | 82.50% | 90.97% | 88.98% |
| Propylene run # | 2.3 | 2.7 | 3.1 | 4.7 | 4.1 |
| Regio defect (mol %) | 0.75 | 0.79 | 1.06 | 0.86 | 0.94 |
| $r_1r_2$ (—) | 4.41 | 3.06 | 2.99 | 1.23 | 1.48 |

| Example # | C16 | C17 | C18 | C19 | C20 |
|---|---|---|---|---|---|
| Polymerization temperature (° C.) | 80 | 90 | 110 | 110 | 110 |
| Ethylene feed rate (g/min) | 0.45 | 0.45 | 0.23 | 0.45 | 1.36 |
| Propylene feed rate (g/min) | 27 | 27 | 27 | 27 | 27 |
| Isohexane feed rate (g/min) | 56.7 | 56.7 | 56.7 | 56.7 | 56.7 |
| Catalyst #2 feed rate (mol/min) | 3.503E−07 | 3.503E−07 | 2.569E−07 | 3.503E−07 | 3.736E−07 |
| TNOA feed rate (mol/min) | 3.703E−06 | 3.703E−06 | 3.703E−06 | 3.703E−06 | 3.703E−06 |
| Yield (g/min) | 13.53 | 11.94 | 5.52 | 6.21 | 13.32 |
| Conversion (%) | 49.3% | 43.5% | 20.3% | 22.6% | 47.0% |
| Catalyst efficiency (kg polymer/kg catalyst) | 45,087 | 39,787 | 25,087 | 20,689 | 41,619 |
| MFR (g/10 min) | 37.14 | 129.20 | | | |

TABLE 5-continued

| | | | | | |
|---|---|---|---|---|---|
| Mn_DRI (g/mol) | 55,498 | 44,337 | 18,815 | 22,123 | 22,143 |
| Mw_DRI (g/mol) | 118,914 | 87,229 | 41,973 | 48,819 | 43,056 |
| Mz_DRI (g/mol) | 198,014 | 139,468 | 67,333 | 79,426 | 68,230 |
| MWD (—) | 2.14 | 1.97 | 2.23 | 2.21 | 1.94 |
| Mn_LS (g/mol) | 50,970 | 42,527 | 21,261 | 24,086 | 20,739 |
| Mw_LS (g/mol) | 89,612 | 68,404 | 34,671 | 40,332 | 36,779 |
| Mz_LS (g/mol) | 134,553 | 100,138 | 53,757 | 61,648 | 55,415 |
| $g'_{vis}$ (—) | 1.334 | 1.27 | 1.162 | 1.135 | 1.082 |
| Tg (° C.) | −10.16 | −12.63 | −13.88 | −17.76 | −26.07 |
| Ethylene content (wt %) | 3.7% | 4.1% | 6.1% | 9.3% | 13.8% |
| Diad and triad sequence distributions ($^{13}$C NMR) | | | | | |
| EEE | 0.003 | 0.002 | 0.002 | 0.002 | 0.004 |
| EEP | 0.002 | 0.004 | 0.004 | 0.011 | 0.020 |
| PEP | 0.039 | 0.043 | 0.040 | 0.074 | 0.105 |
| EPE | 0.003 | 0.004 | 0.003 | 0.012 | 0.025 |
| EPP | 0.080 | 0.091 | 0.091 | 0.145 | 0.188 |
| PPP | 0.873 | 0.856 | 0.860 | 0.756 | 0.660 |
| EE | 0.004 | 0.004 | 0.004 | 0.008 | 0.014 |
| EP + PE | 0.083 | 0.095 | 0.091 | 0.163 | 0.233 |
| PP | 0.913 | 0.901 | 0.905 | 0.829 | 0.753 |
| Tacticity diad and triads | | | | | |
| mm(PP + EP) | 4.21% | 4.58% | 7.01% | 7.10% | 6.62% |
| rr (PP + EP) | 73.01% | 69.42% | 58.20% | 58.96% | 59.21% |
| r (PP + EP) | 84.40% | 82.42% | 75.60% | 75.93% | 76.30% |
| Propylene run # | 4.3 | 4.9 | 4.9 | 8.4 | 11.8 |
| Regio defect (mol %) | 1.54 | 1.21 | 1.08 | 1.22 | 1.14 |
| $r_1r_2$ (—) | 2.27 | 1.55 | 1.87 | 0.99 | 0.76 |

Table 6 lists the commercially available Vistamaxx™ polymers available from ExxonMobil Chemical Company as reference materials. Vistamaxx™ polymers are isotactic-rich propylene-ethylene copolymers. CV1 to CV4 are Vistamaxx™ 3000, Vistamax™ 6102, Vistamaxx™ 6502 and Vistamaxx™ 3588 FL, respectively.

TABLE 6

| Data on commercially available Vistamaxx ™ polymers available from ExxonMobil Chemical Company | | | | |
|---|---|---|---|---|
| Example # | CV1 | CV2 | CV3 | CV4 |
| MFR (g/10 min) | 8.0 | 3.0 | 45.0 | 8.0 |
| Mn_DRI (g/mol) | 130,155 | 141,880 | 67,537 | 120,948 |
| Mw_DRI (g/mol) | 205,601 | 232,806 | 123,473 | 217,992 |
| Mz_DRI (g/mol) | 301,544 | 330,087 | 191,062 | 322,352 |
| MWD (—) | 1.58 | 1.64 | 1.83 | 1.80 |
| Mn_LS (g/mol) | 113,671 | 127,606 | 60,760 | 113,482 |
| Mw_LS (g/mol) | 200,331 | 234,286 | 124,401 | 219,561 |
| Mz_LS (g/mol) | 313,966 | 376,384 | 205,052 | 353,780 |
| Ethylene content (wt %) | 11.0 | 16.0 | 13.0 | 4.0 |
| Tc (° C.) | 12.3 | — | — | 67.7 |
| Tm (° C.) | 62.0 | 102.7 | 56.0 | 106.2 |
| Tg (° C.) | −24.5 | −31.9 | −26.6 | −14.3 |
| Heat of fusion (J/g) | 25.9 | 19.7 | 20.1 | 54.7 |
| Diad and triad sequence distributions ($^{13}$C NMR) | | | | |
| EEE | 0.0044 | 0.0095 | 0.008 | 0.002 |
| EEP | 0.0282 | 0.0596 | 0.045 | 0.008 |
| PEP | 0.1133 | 0.1378 | 0.126 | 0.056 |
| EPE | 0.0310 | 0.0600 | 0.043 | 0.008 |
| EPP | 0.2060 | 0.2219 | 0.217 | 0.107 |
| PPP | 0.6171 | 0.5111 | 0.560 | 0.820 |
| EE | 0.019 | 0.039 | 0.031 | 0.006 |
| PP | 0.720 | 0.622 | 0.669 | 0.874 |
| EP | 0.261 | 0.339 | 0.300 | 0.122 |
| Tacticity diad and triads | | | | |
| mm (PP + EP) | 67.9% | 59.2% | 59.4% | 80.0% |
| rr (PP + EP) | 7.3% | 11.4% | 10.8% | 4.2% |
| Propylene Run # | 13.4 | 17.1 | 15.2 | 6.2 |
| Regio defect (mol %) | 0.63 | 0.67 | 0.84 | 0.78 |
| $r_1r_2$ (—) | 0.78 | 0.85 | 0.91 | 1.42 |

FIG. 1 shows the [PPP] from $^{13}$C NMR vs Mw,LS from GPC for syndiotactic polypropylene-based ethylene-propylene copolymers according to the present disclosure and non-syndio-rich EP Vistamaxx™ reference samples listed in Table 6, respectively. At similar MW, syndiotactic polypropylene-based ethylene-propylene copolymers according to the present disclosure show higher [PPP] values as compared to the reference samples.

Figure 2:
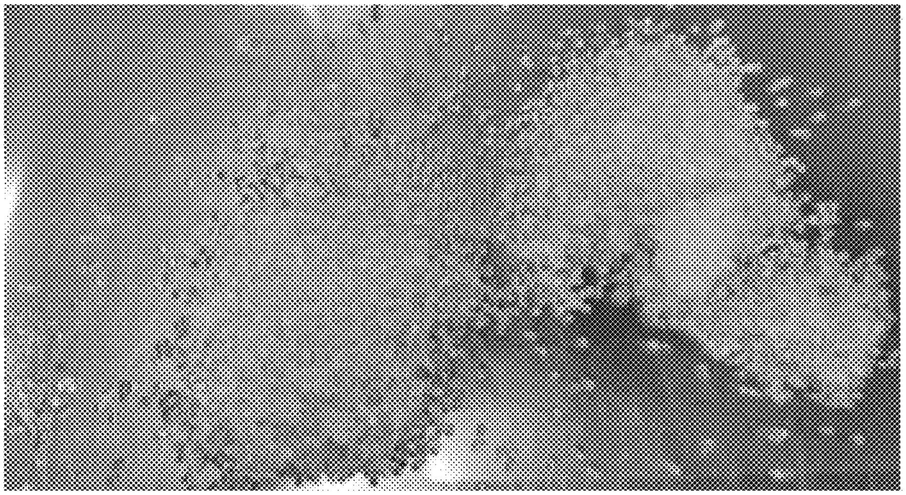
FIG. 2 shows, the inventive sample M8 shows good pellet stability for inventive sample M8 after aging in the oven at 40° C. and 1 psig for 3 months. The pellets remain as well dispersed individual pellets.

FIG. 2. is a picture of sample M8 right after being removed from the oven. Sample M8 shows good pellet stability after aging in the oven at 40° C. and under 1 psig pressure for 90 days. The sample was placed in a beaker with a customized weight on top such that the pressure was 1 psi above atmospheric pressure. The pellets remained as individual pellets after being takin out of the oven after 90 days.

Figure 3:
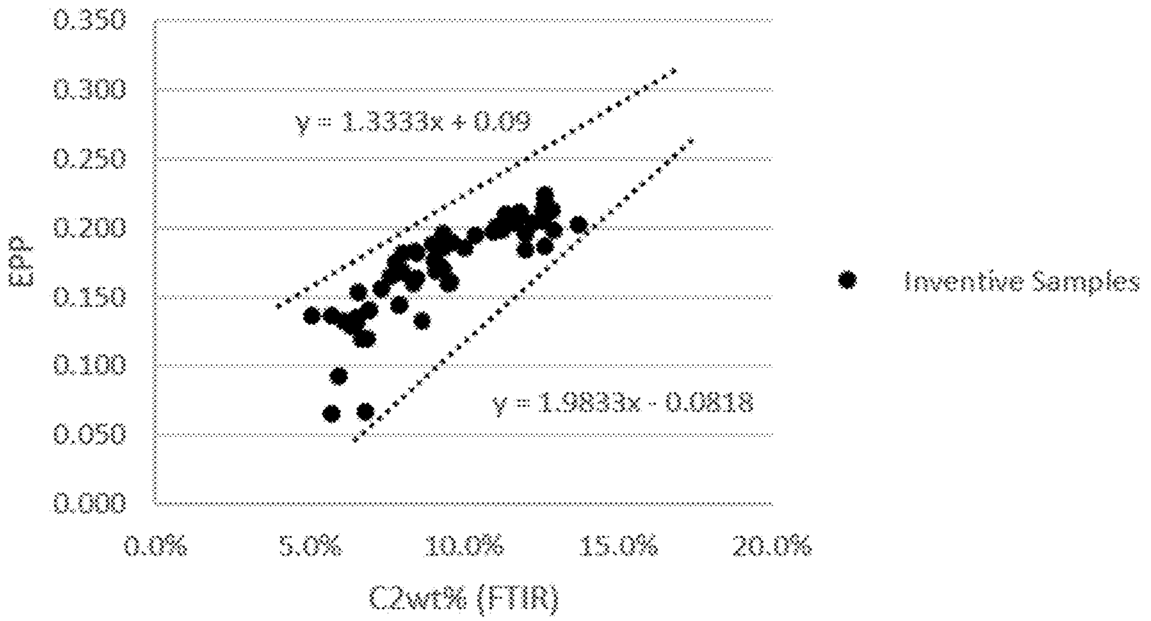
FIG. 3 shows the ethylene content (C2 wt %) from FTIR and [EPP] from $^{13}C$ NMR for syndiotactic polypropylene-based ethylene-propylene copolymers according to the present disclosure.

FIG. 3 shows the C2 wt % from FTIR and [EPP] from $^{13}C$ NMR for syndiotactic polypropylene-based ethylene-propylene copolymers according to the present disclosure. The two trend lines establishes the relationship of C2 wt % from FTIR and [EPP] from $^{13}C$ NMR for our inventive syndiotactic polypropylene-based ethylene-propylene copolymers.

Figure 4:
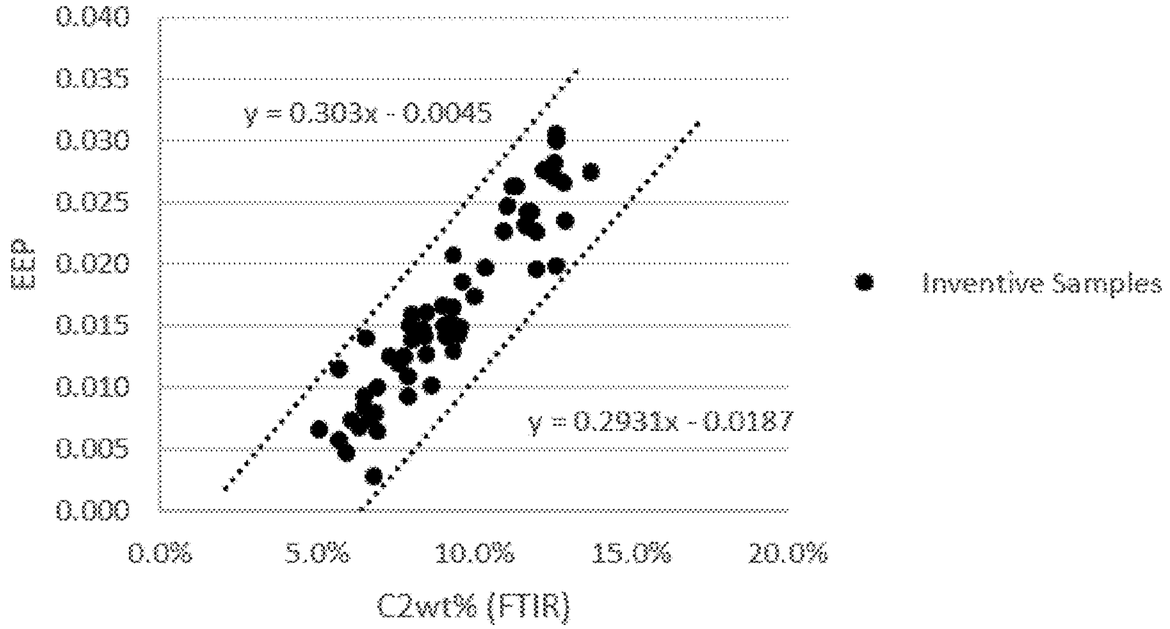
FIG. 4 shows the ethylene content (C2 wt %) from FTIR and [EEP] from $^{13}$C NMR for syndiotactic polypropylene-based ethylene-propylene copolymers according to the present disclosure.

FIG. 4 shows the C2 wt % from FTIR and [EEP] from $^{13}C$ NMR for syndiotactic polypropylene-based ethylene-propylene copolymers according to the present disclosure. The two trend lines establishes the relationship of C2 wt % from FTIR and [EEP] from $^{13}C$ NMR for our inventive syndiotactic polypropylene-based ethylene-propylene copolymers.

Figure 5:
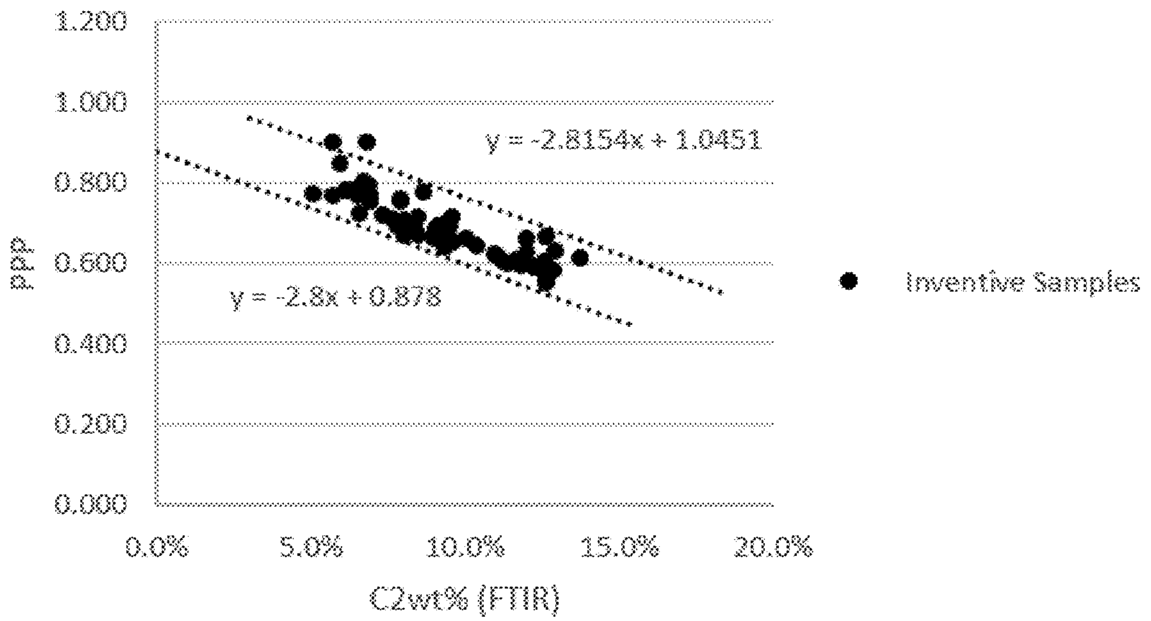
FIG. 5 shows the ethylene content (C2 wt %) from FTIR and [PPP] from $^{13}$C NMR for syndiotactic polypropylene-based ethylene-propylene copolymers according to the present disclosure.

FIG. 5 shows the C2 wt % from FTIR and [PPP] from $^{13}C$ NMR for syndiotactic polypropylene-based ethylene-propylene copolymers according to the present disclosure. The two trend lines establishes the relationship of C2 wt % from FTIR and [PPP] from $^{13}C$ NMR for our inventive syndiotactic polypropylene-based ethylene-propylene copolymers.

Figure 6:
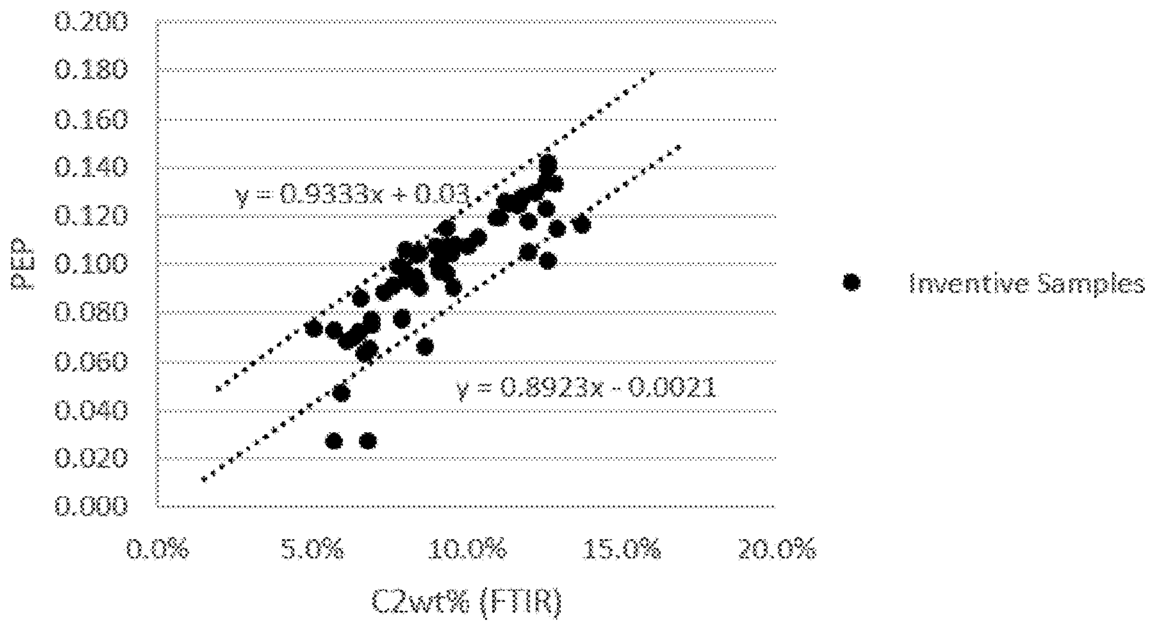
FIG. 6 shows the ethylene content (C2 wt %) from FTIR and [PEP] from $^{13}$C NMR for syndiotactic polypropylene-based ethylene-propylene copolymers according to the present disclosure.

FIG. 6 shows the ethylene content from FTIR and [PEP] from $^{13}C$ NMR for syndiotactic polypropylene-based ethylene-propylene copolymers according to the present disclosure. The two trend lines establishes the relationship of ethylene content from FTIR and [PEP] from $^{13}C$ NMR for our inventive syndiotactic polypropylene-based ethylene-propylene copolymers.

Figure 7:
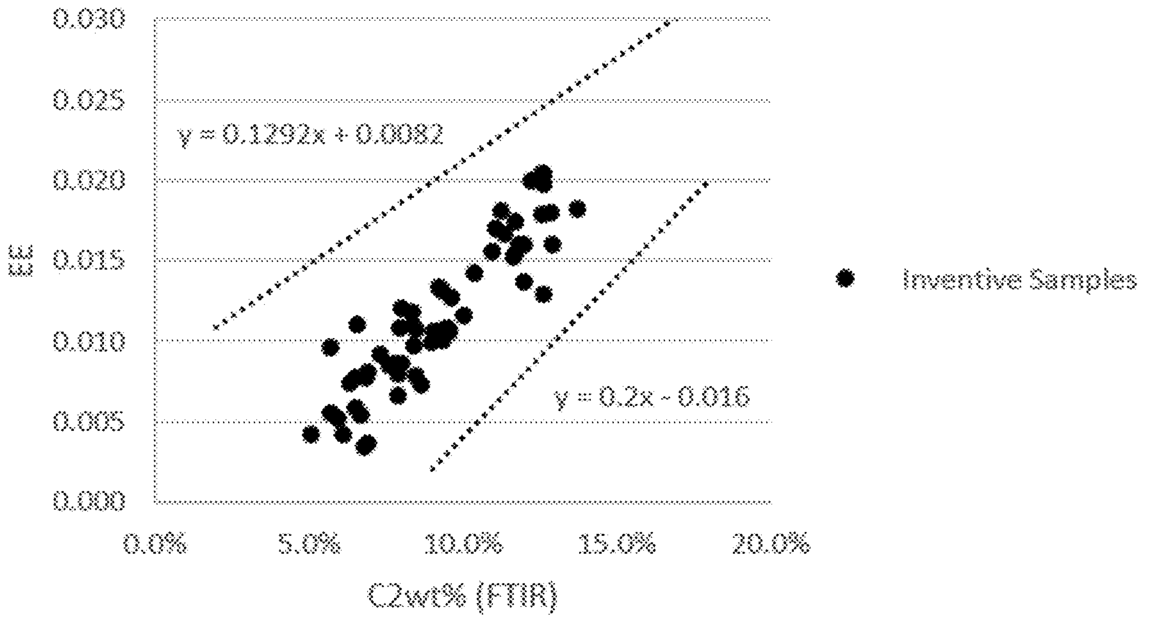
FIG. 7 shows the ethylene content (C2 wt %) from FTIR and [EE] from $^{13}$C NMR for syndiotactic polypropylene-based ethylene-propylene copolymers according to the present disclosure.

FIG. 7 shows the C2 wt % from FTIR and [EE] from $^{13}C$ NMR for syndiotactic polypropylene-based ethylene-propylene copolymers according to the present disclosure. The two trend lines establishes the relationship of C2 wt % from FTIR and [EE] from $^{13}C$ NMR for our inventive syndiotactic polypropylene-based ethylene-propylene copolymers.

Figure 8:
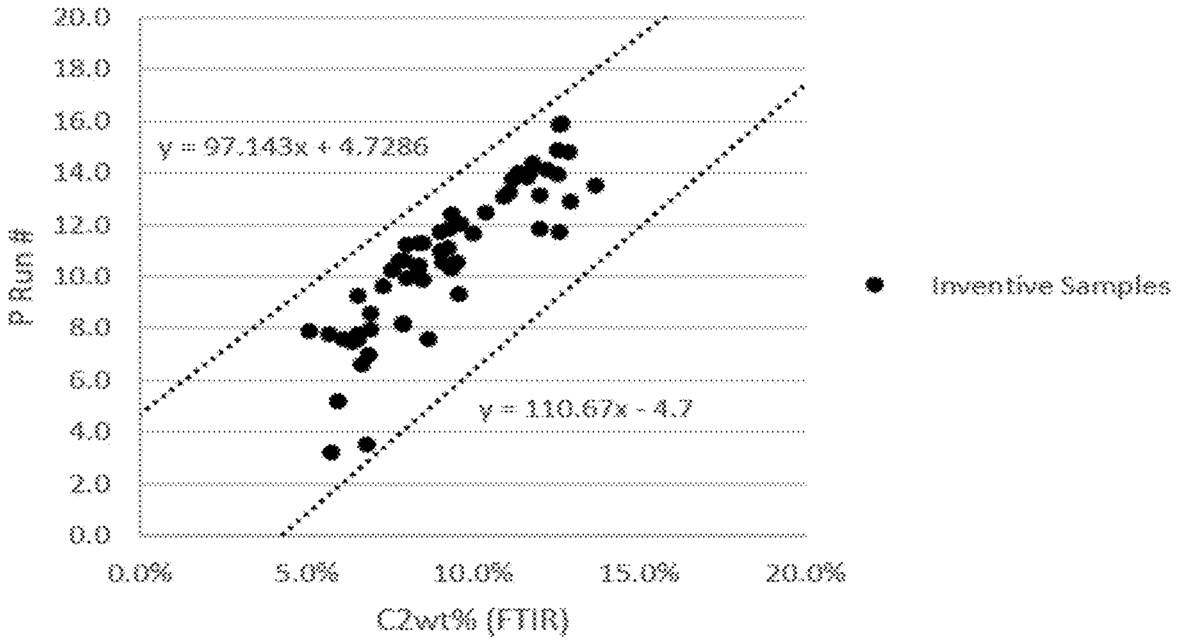
FIG. 8 shows the ethylene content (C2 wt %) from FTIR and propylene run # from $^{13}$C NMR for syndiotactic polypropylene-based ethylene-propylene copolymers according to the present disclosure.

FIG. 8 shows the C2 wt % from FTIR and propylene run # from $^{13}C$ NMR for syndiotactic polypropylene-based ethylene-propylene copolymers according to the present disclosure. The two trend lines establishes the relationship of C2 wt % from FTIR and propylene run # from $^{13}C$ NMR for our inventive syndiotactic polypropylene-based ethylene-propylene copolymers.

Figure 9:
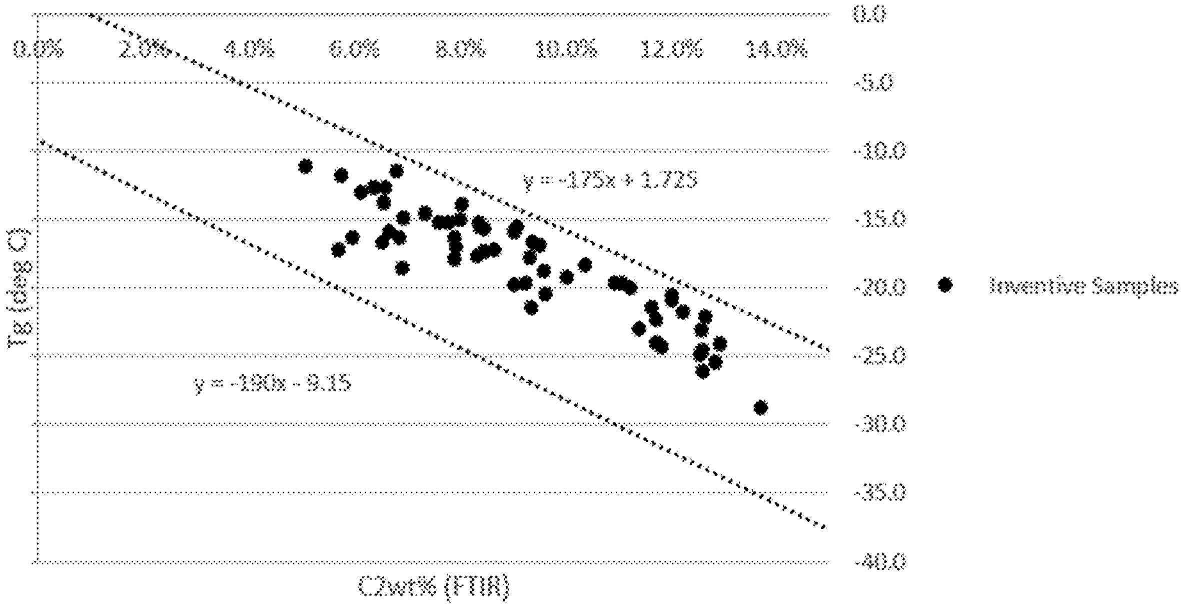
FIG. 9 shows the ethylene content (C2 wt %) from FTIR and glass transition temperature ($T_g$) from DSC for syndiotactic polypropylene-based ethylene-propylene copolymers according to the present disclosure.

FIG. 9 shows the C2 wt % from FTIR and glass transition temperature $T_g$ from DSC for syndiotactic polypropylene-based ethylene-propylene copolymers according to the present disclosure. The two trend lines establishes the relationship of C2 wt % from FTIR and Tg from DSC for our inventive syndiotactic polypropylene-based ethylene-propylene copolymers.

Figure 10:
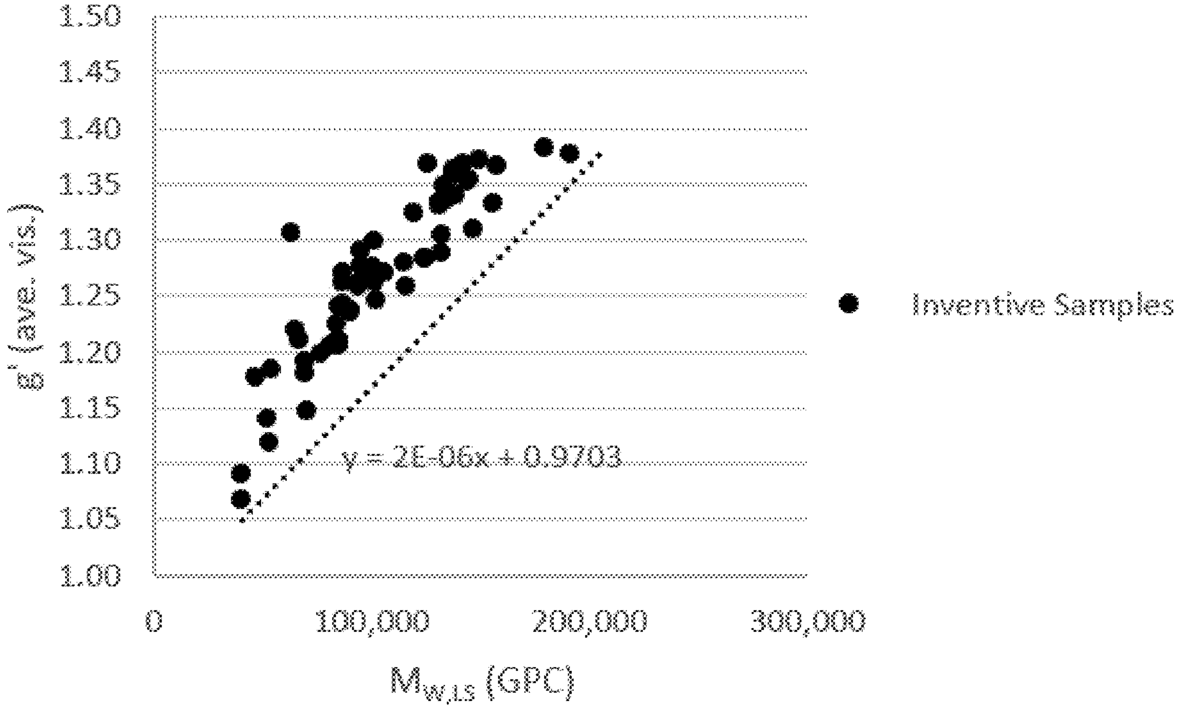
FIG. 10 shows the $g'_{vis}$ and $M_{W,LS}$ from GPC for syndiotactic polypropylene-based ethylene-propylene copolymers according to the present disclosure.

FIG. 10 shows the $g'_{vis}$ and $M_{W,LS}$ from GPC for syndiotactic polypropylene-based ethylene-propylene copolymers according to the present disclosure. The two trend lines establishes the relationship of $g'_{vis}$ from GPC and weight-averaged MW from light scattering from GPC for our inventive syndiotactic polypropylene-based ethylene-propylene copolymers.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The terms "a" and "the" as used herein are understood to encompass the plural as well as the singular.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art. While the foregoing is directed to embodiments of the present disclosure, other and further embodiments of the disclosure may be devised without departing from the basic scope thereof, and the scope thereof is determined by the claims that follow.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

What is claimed is:

1. A process to produce syndiotactic propylene copolymers comprising contacting in a homogeneous phase propylene and ethylene with a catalyst system comprising activator and catalyst compound; and obtaining a syndiotactic propylene copolymers comprising (a) from 85 to 95 weight % of propylene, based upon the weight of the polymer; (b) 60 to 90% rr triads; (c) Mw (LS) of 10 to 250 kg/mol; and (d) no substantial melting peak, wherein the heat of fusion of the peak is 5 J/g or less as determined by differential scanning calorimetry at a scan rate of 10° C./min (ASTM D3418-03), wherein the catalyst system comprises a catalyst compound represented by formula (1a);

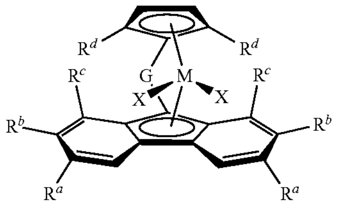

(1a)

wherein:

M is zirconium:

G is di(para-triethylsilylphenyl)methylene or diphenylmethylene;

each $R^d$, $R^a$ and $R^c$ is hydrogen;

each $R^b$ is methyl, ethyl, propyl, or butyl; and each X is, independently, methyl or chloro.

2. The process of claim 1, wherein the process occurs at a temperature of from about 50° C. to about 110° C., at a pressure in the range of from about 1 MPa to about 14 MPa.

3. The process of claim 1, wherein the process occurs at a temperature of from about 50° C. to about 110° C., at a pressure in the range of from about 3 MPa to about 14 MPa.

4. The process of claim 1, wherein the process occurs at a polymerization temperature of TP1 or higher, wherein TP1=0.9*EXP(−0.005*rr), where the unit of TP1 is ° C., and rr is triad tacticity index measured using $^{13}C$ NMR.

5. The process of claim 1, wherein the polymerization is conducted in a solution process at a pressure of 9 MPa or higher and at a temperature from about 50° C. to about 120° C., and with catalyst efficiency of 50,000 kg of polymer per kg of catalyst or more.

6. The process of claim 1, wherein the polymerization is conducted in a solution process at a pressure of 9 MPa or higher and with a molar ratio of ethylene feed to propylene feed from about 0.01 to about 0.2 and with catalyst efficiency of 50,000 kg of polymer per kg of catalyst or more.

7. The process of claim 1, wherein X is methyl, G is di(para-triethylsilylphenyl)methylene, and each $R^d$, $R^a$ and $R^c$ are hydrogen, and each $R^b$ is tert-butyl.

8. The process of claim 1, wherein the activator is selected from one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, tri(n-butyl)ammonium tetrakis (perfluoronaphthyl)borate, N-methyl-4-nonadecyl-N-octadecylanilinium [tetrakis(perfluorophenyl)borate], di(hydrogenated tallow)methylamonium tetrakis(perfluorophenyl) borate, di(hydrogenated tallow)methylamonium tetrakis (perfluoronaphthyl)borate, dioctadecylmethylammonium tetrakis(perfluorophenyl)borate, and dioctadecylmethylammonium tetrakis(perfluoronaphthyl)borate.

* * * * *